United States Patent
Yi et al.

(10) Patent No.: US 12,401,474 B2
(45) Date of Patent: *Aug. 26, 2025

(54) DETERMINATION OF SPATIAL FILTER FOR TRANSMISSIONS

(71) Applicant: Ofinno, LLC, Reston, VA (US)

(72) Inventors: Yunjung Yi, Vienna, VA (US);
Jonghyun Park, Syosset, NY (US);
Esmael Hejazi Dinan, McLean, VA (US); Ali Cagatay Cirik, Chantilly, VA (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/510,131

(22) Filed: Nov. 15, 2023

(65) Prior Publication Data

US 2024/0089050 A1    Mar. 14, 2024

Related U.S. Application Data

(63) Continuation of application No. 18/202,563, filed on May 26, 2023, now Pat. No. 11,824,807, which is a (Continued)

(51) Int. Cl.
*H04W 72/04* (2023.01)
*H04L 5/00* (2006.01)
(Continued)

(52) U.S. Cl.
CPC ....... *H04L 5/0048* (2013.01); *H04W 74/0833* (2013.01)

(58) Field of Classification Search
CPC ............ H04L 5/0048; H04L 5/0023; H04L 5/0094; H04L 5/0098; H04L 5/0053; H04W 74/0833; H04W 74/0836; H04W 74/0838
(Continued)

(56) References Cited

U.S. PATENT DOCUMENTS 11,824,807 B2 *  11/2023  Yi ..................... H04L 5/0053
2021/0153186 A1    5/2021  Zhou et al.
(Continued)

FOREIGN PATENT DOCUMENTS

CN    114765784 A    7/2022
CN    116018834 A    4/2023
(Continued)

OTHER PUBLICATIONS

ZTE (R1-1717424, "Discussion on beam management", Oct. 9-13, 2017) (Year: 2017).*
3GPP TS 38.212 V16.4.0 (Dec. 2020); Technical Specification; 3rd Generation Partnership Project; Technical Specification Group Radio Access Network; NR; Multiplexing and channel coding; (Release 16).
(Continued)

*Primary Examiner* — Maharishi V Khirodhar
(74) *Attorney, Agent, or Firm* — Matthew Fernandez; Kavon Nasabzadeh; Jacob L. Mangan

(57) ABSTRACT

A wireless device receives one or more configuration parameters indicating a plurality of transmission configuration indicator (TCI) states for uplink transmissions. The wireless device transmits, for a random access procedure, a physical uplink shared channel (PUSCH) transmission with a spatial filter. The wireless device receives a medium access control control element (MAC CE) indicating activation of more than one TCI state of the plurality of TCI states. The wireless device transmits, with the spatial filter used during the random access procedure, one or more uplink signals before receiving a downlink control information (DCI) indicating a TCI state from the more than one TCI state.

20 Claims, 29 Drawing Sheets

Related U.S. Application Data continuation of application No. PCT/US2022/016717, filed on Feb. 17, 2022.

(60) Provisional application No. 63/150,853, filed on Feb. 18, 2021.

(51) Int. Cl.
*H04W 74/0833* (2024.01)
*H04W 76/00* (2018.01)
*H04W 88/08* (2009.01)

(58) Field of Classification Search
USPC .......................................................... 370/329
See application file for complete search history.

(56) References Cited

U.S. PATENT DOCUMENTS

| | | | |
|---|---|---|---|
| 2021/0168813 A1 | 6/2021 | Raghavan et al. | |
| 2022/0200680 A1* | 6/2022 | Farag | H04W 72/23 |
| 2022/0311579 A1 | 9/2022 | Zhang et al. | |
| 2022/0407656 A1 | 12/2022 | Matsumura et al. | |
| 2022/0417964 A1 | 12/2022 | Matsumura et al. | |
| 2023/0101444 A1 | 3/2023 | Yuan et al. | |
| 2023/0224895 A1* | 7/2023 | Matsumura | H04W 72/23 370/329 |

FOREIGN PATENT DOCUMENTS

| | | |
|---|---|---|
| EP | 3 961 936 A1 | 3/2022 |
| WO | 2021/166245 A1 | 8/2021 |
| WO | 2021/203315 A1 | 10/2021 |
| WO | 2022/024301 A1 | 2/2022 |
| WO | 2022/031117 A1 | 2/2022 |
| WO | 2022/067635 A1 | 4/2022 |

OTHER PUBLICATIONS

3GPP TS 38.213 V16.4.0 (Dec. 2020); Technical Specification; 3rd Generation Partnership Project; Technical Specification Group Radio Access Network; NR; Physical layer procedures for control; (Release 16).
3GPP TS 38.214 V16.3.0 (Sep. 2020); Technical Specification; 3rd Generation Partnership Project; Technical Specification Group Radio Access Network; NR; Physical layer procedures for data; (Release 16).
3GPP TS 38.331 V16.3.1 (Jan. 2021); Technical Specification; 3rd Generation Partnership Project; Technical Specification Group Radio Access Network; NR; Radio Resource Control (RRC) protocol specification; (Release 16).
R1-2100044; 3GPP TSG RAN WG1 Meeting #104-e; e-Meeting, Jan. 25-Feb. 5, 2021; Agenda Item: 8.1.1; Source: Futurewei; Title: Enhancement on multi-beam operation; Document for: Discussion and decision.
R1-2100063; 3GPP TSG RAN WG1 #104-e; e-Meeting, Jan. 25-Feb. 5, 2021; Agenda Item: 8.1.1; Source: InterDigital, Inc.; Title: Discussions on Rel-17 beam management; Document for: Discussion and Decision.
R1-2100118; 3GPP TSG RAN WG1 #104-e; e-Meeting, Jan. 25-Feb. 5, 2021; Source: OPPO; Title: Enhancements on Multi-Beam Operation; Agenda Item: 8.1.1; Document for: Discussion and Decision.
R1-2100208; 3GPP TSG RAN WG1 Meeting #104-e; E-meeting, Jan. 25-Feb. 5, 2021; Agenda Item: 8.1.1; Source: Huawei, HiSilicon; Title: Enhancements on multi-beam operation; Document for: Discussion and Decision.
R1-2100273; 3GPP TSG RAN WG1#104-e; e-Meeting, Jan. 25-Feb. 5, 2021; Agenda Item: 8.1.1; Source: Lenovo, Motorola Mobility; Title: Enhancements on Multi-beam Operation; Document for: Discussion.
R1-2100285; 3GPP TSG RAN WG1 Meeting #104-e; e-Meeting, Jan. 25-Feb. 5, 2021; Source: ZTE; Title: Enhancements on Multi-beam Operation; Agenda Item: 8.1.1; Document for: Discussion and Decision.
R1-2100343; 3GPP TSG RAN WG1 #104-e; e-Meeting, Jan. 25-Feb. 5, 2021; Source: CATT; Title: Enhancements on multi-beam operation; Agenda Item: 8.1.1; Document for: Discussion and Decision.
R1-2100421; 3GPP TSG RAN WG1 #104-e; e-Meeting, Jan. 25-Feb. 5, 2021; Source: vivo; Title: Further discussion on multi beam enhancement; Agenda Item: 8.1.1; Document for: Discussion and Decision.
R1-2100534; 3GPP TSG RAN WG1 Meeting #104-e; E-meeting, Jan. 25-Feb. 5, 2021; Agenda Item: 8.1.1—Enhancements on Multi-beam Operation; Source: Fraunhofer IIS, Fraunhofer HHI; Title: Enhancements on multi-beam operation; Document for: Decision.
R1-2100588; 3GPP TSG RAN WG1 #104-e; e-Meeting, Jan. 25-Feb. 5, 2021; Agenda Item: 8.1.1; Source: MediaTek Inc.; Title: Enhancement on multi-beam operation; Document for: Discussion and Decision.
R1-2100618; 3GPP TSG RAN WG1 #104-e; e-Meeting, Jan. 25-Feb. 5, 2021; Agenda item: 8.1.1; Source: LG Electronics; Title: Enhancements on Multi-beam Operation; Document for: Discussion and Decision.
R1-2100636; 3GPP TSG RAN WG1 #104-e; e-Meeting, Jan. 25-Feb. 5, 2021; Source: Intel Corporation; Title: Enhancements to Multi-Beam Operation; Agenda item: 8.1.1; Document for: Discussion and Decision.
R1-2100779; 3GPP TSG RAN WG1 #104e; e-Meeting, Jan. 25-Feb. 5, 2021; Agenda Item: 8.1.1; Source: AT&T; Title: Enhancements on Multi-Beam Operations; Document for: Discussion.
R1-2100783; 3GPP TSG RAN WG1 #104-e; e-Meeting, Jan. 25-Feb. 5, 2021; Agenda Item: 8.1.1; Source: Spreadtrum Communications; Title: Enhancements on Multi-beam Operation; Document for: Discussion and decision.
R1-2100844; 3GPP TSG RAN WG1#104e; E-meeting, Jan. 25-Feb. 5, 2021; Agenda Item: 8.1.1; Source: Sony; Title: Further enhancement on multi-beam operation; Document for: Discussion.
R1-2100964; 3GPP TSG RAN WG1 #104-e; e-Meeting, Jan. 25-Feb. 5, 2021; Agenda Item: 8.1.1; Source: Asia Pacific Telecom, FGI; Title: Discussion on Enhancements for Multi-beam Operation; Document for: Discussion.
R1-2101005; 3GPP TSG RAN WG1 #104-e; e-Meeting, Jan. 25-Feb. 5, 2021; Agenda item: 8.1.1; Source: Nokia, Nokia Shanghai Bell; Title: Enhancements on Multi-beam Operation; Document for: Discussion and Decision.
R1-2101032; 3GPP TSG RAN WG1 #104-e; e-Meeting, Jan. 25-Feb. 5, 2021; Source: CMCC; Title: Enhancements on multi-beam operation; Agenda Item: 8.1.1; Document for: Discussion and Decision.
R1-2101092; 3GPP TSG RAN WG1 #104-e; e-Meeting, Jan. 25-Feb. 5, 2021; Agenda Item: 8.1.1; Source: Xiaomi; Title: Enhancements on multi-beam operation; Document for: Discussion and Decision.
R1-2101186; 3GPP TSG RAN WG1 #104-e; e-Meeting, Jan. 25-Feb. 5, 2021; Agenda item: 8.1.1; Source: Samsung; Title: Multi-beam enhancements; Document for: Discussion and Decision.
R1-2101313; 3GPP TSG-RAN WG1 Meeting #104-e; Online, Jan. 25-Feb. 5, 2021; Agenda Item: 8.1.1; Source: Ericsson; Title: Enhancements on Multi-beam Operation; Document for: Discussion.
R1-2101350; 3GPP TSG-RAN WG1 Meeting #103-e; e-Meeting, Jan. 25-Feb. 5, 2021; Agenda Item: 8.1.1; Source: Apple Inc.; Title: On Beam Management Enhancement; Document for: Discussion/Decision.
R1-2101414; 3GPP TSG-RAN WG1#104-e; e-Meeting, Jan. 25-Feb. 5, 2021; Agenda item: 8.1.1; Title: Multi-beam Enhancements; Source: Convida Wireless; Document for: Discussion.
R1-2101446; 3GPP TSG RAN WG1 Meeting #104-e; Jan. 25-Feb. 5, 2020; Agenda item: 8.1.1; Source: Qualcomm Incorporated; Title: Enhancements on Multi-beam Operation; Document for: Discussion/Decision.
R1-2101597; 3GPP TSG RAN WG1 #104-e; e-Meeting, Jan. 25-Feb. 5, 2021; Source: NTT Docomo, Inc; Title: Discussion on multi-beam operation; Agenda Item: 8.1.1; Document for: Discussion and Decision.

(56) References Cited

OTHER PUBLICATIONS

R1-2101644; 3GPP TSG RAN WG1 #104-e; e-Meeting, Jan. 25-Feb. 5, 2021; Source: TCL; Title: Enhancements on Multi-Beam Operation; Agenda Item: 8.1.1; Document for: Discussion and Decision.
R1-1802743; 3GPP TSG RAN WG1 Meeting #92; Athens, Greece, Feb. 26-Mar. 2, 2018; Source: Ericsson; Title: Remaining details on beam management; Agenda Item: 7.1.2.2.3; Document for: Discussion and Decision.
R1-2000926; 3GPP TSG RAN WG1 Meeting #100-e; e-Meeting, Feb. 24-Mar. 6, 2020; Source: NTT Docomo, Inc.; Title: Remaining issues on multi-beam operation; Agenda Item: 7.2.6.3; Document for: Discussion and Decision.
R1-2003819; 3GPP TSG RAN WG1 Meeting #101; e-Meeting, May 25-Jun. 5, 2020; Agenda Item: 7.2.6.2; Source: Lenovo, Motorola Mobility; Title: Remaining issues on multi-TRP/panel transmission; Document for: Discussion.
International Search Report and Written Opinion of the International Searching authority mailed May 24, 2022, in International Application No. PCT/US2022/016717.
R1-2001564; 3GPP TSG RAN WG1 Meeting #100bis-e; E-meeting, Apr. 20-Apr. 30, 2020; Agenda Item: 7.2.6.3; Source: Huawei, HiSilicon; Title: Remaining issues on multi-beam enhancements in R16; Document for: Discussion and Decision.

* cited by examiner

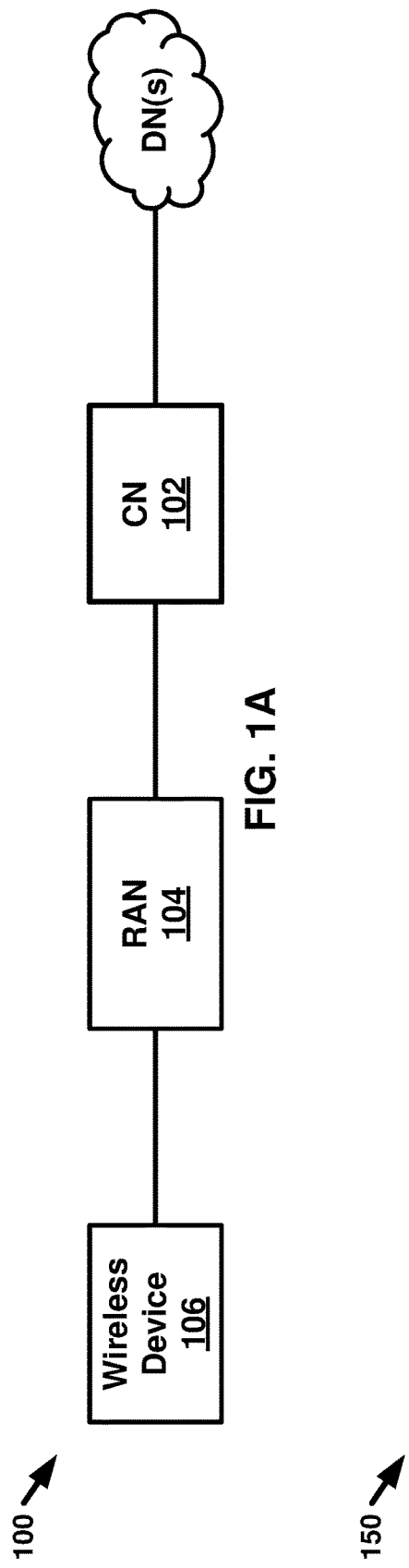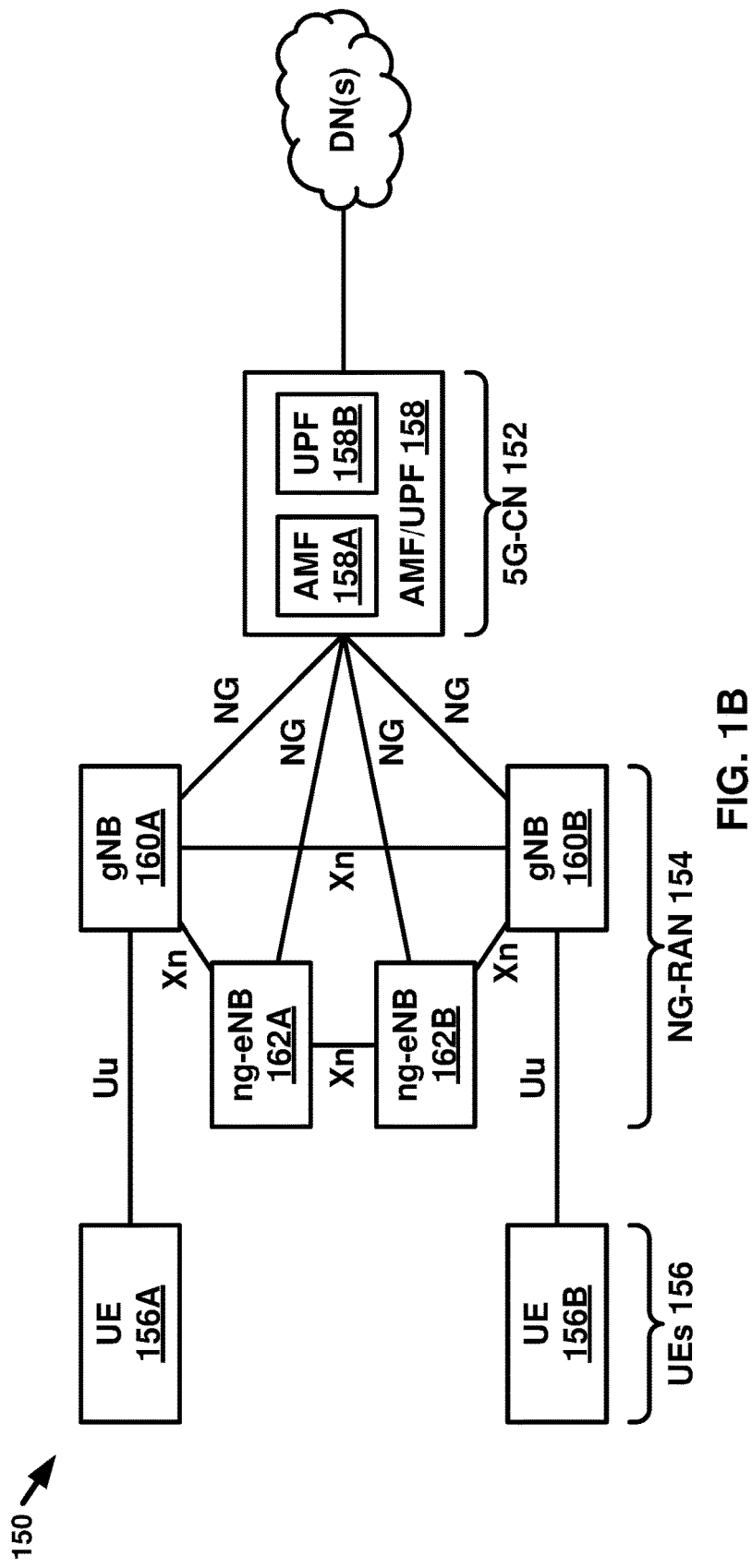

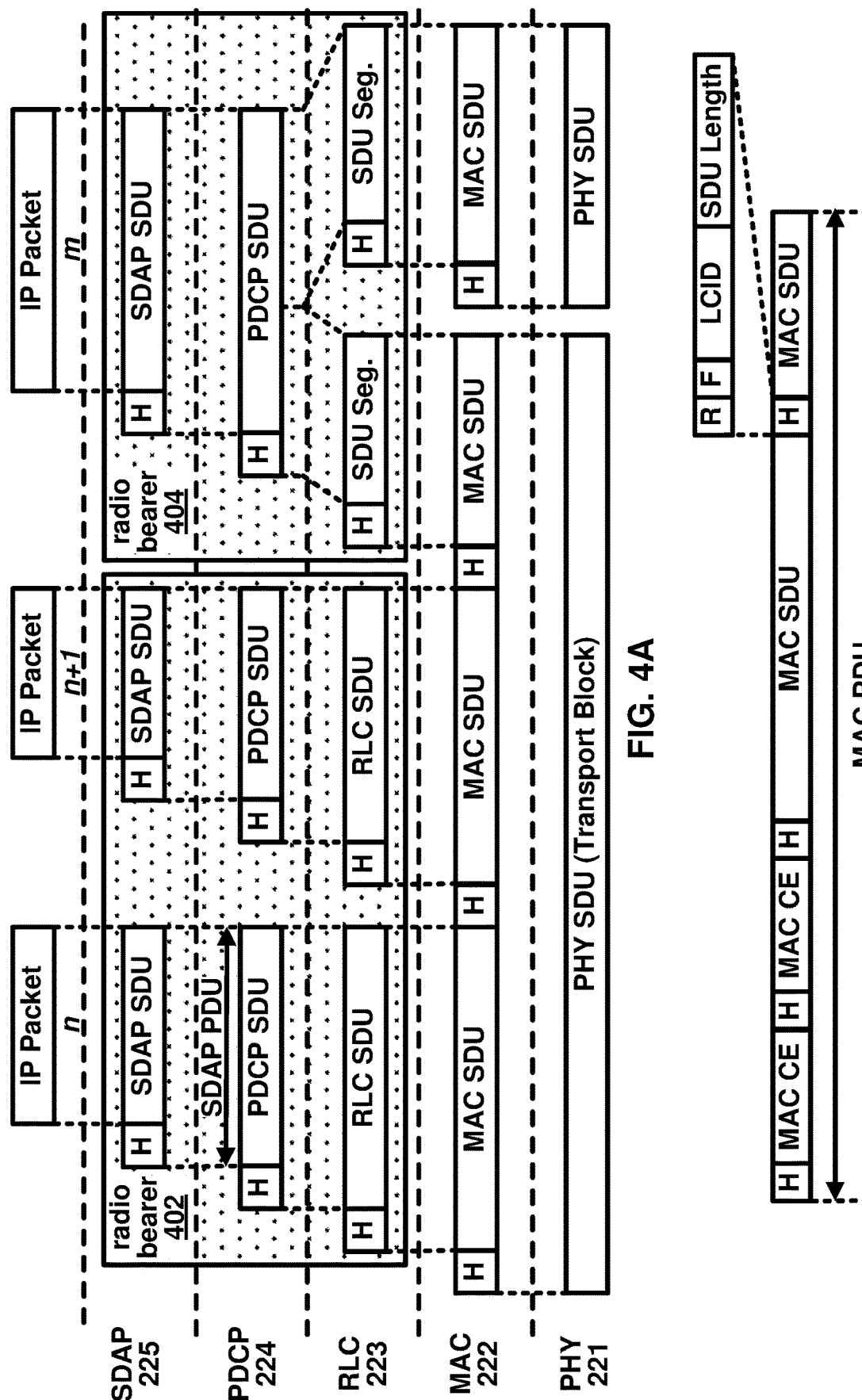

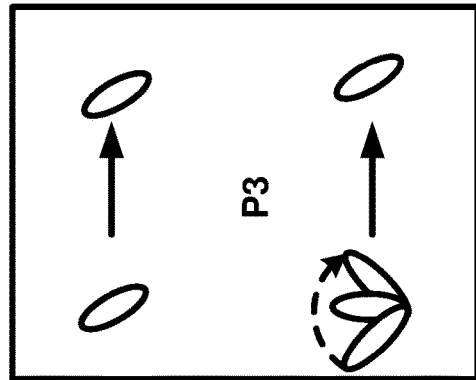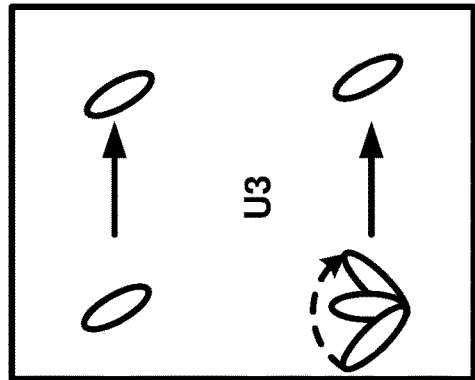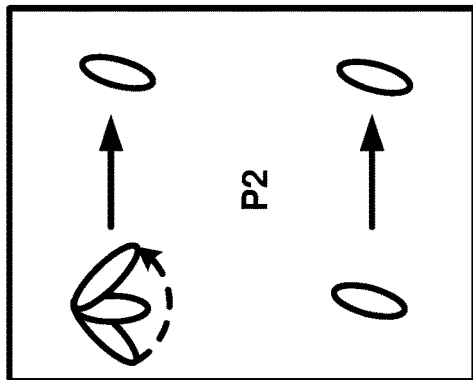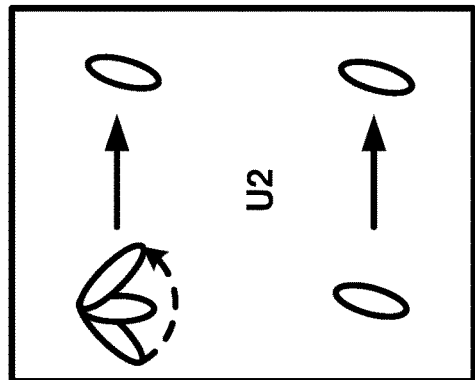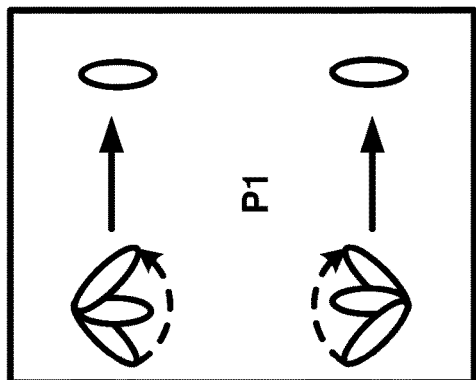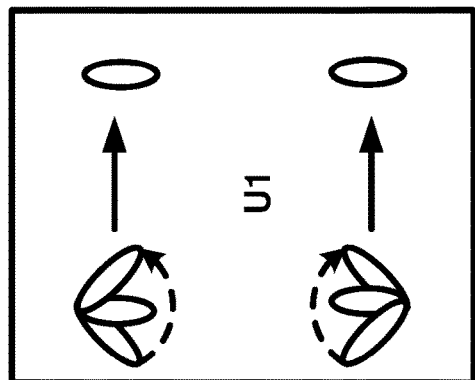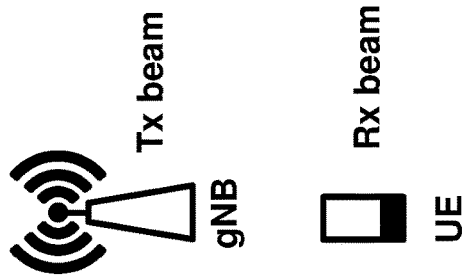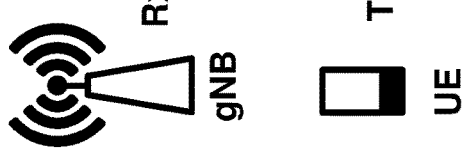
FIG. 12A
FIG. 12B

```
TCI-State ::=       SEQUENCE {
    tci-StateId         TCI-StateId,
    qcl-Type1           QCL-Info,
    qcl-Type2           QCL-Info
                        OPTIONAL,   -- Need R
    pathlossReferenceRS     PathlossReferenceRS-Config
                        OPTIONAL,   -- Need M
    ...
}

QCL-Info ::=        SEQUENCE {
    cell                ServCellIndex
                        OPTIONAL,   -- Need R
    bwp-Id              BWP-Id
                        OPTIONAL,   -- Cond CSI-RS-Indicated
    referenceSignal     CHOICE {
        csi-rs              NZP-CSI-RS-ResourceId,
        ssb                 SSB-Index
    },
    qcl-Type            ENUMERATED {typeA, typeB, typeC, typeD},
    ...
}
```

FIG. 22

DETERMINATION OF SPATIAL FILTER FOR TRANSMISSIONS

CROSS-REFERENCE TO RELATED APPLICATIONS

This application is a continuation of U.S. patent application Ser. No. 18/202,563, filed May 26, 2023, which is a continuation of International Application No. PCT/US2022/016717, filed Feb. 17, 2022, which claims the benefit of U.S. Provisional Application No. 63/150,853, filed Feb. 18, 2021, all of which are hereby incorporated by reference in their entireties.

BRIEF DESCRIPTION OF THE DRAWINGS

Examples of several of the various embodiments of the present disclosure are described herein with reference to the drawings.

FIGS. 1A and 1B illustrate example mobile communication networks in which embodiments of the present disclosure may be implemented.

FIG. 4A illustrates an example downlink data flow through the NR user plane protocol stack of FIG. 2A.

FIG. 4B illustrates an example format of a MAC subheader in a MAC PDU.

FIGS. 12A and 12B respectively illustrate examples of three downlink and uplink beam management procedures.

FIG. 22 illustrates a set of parameters of a TCI state as per an aspect of an example embodiment of the present disclosure.

DETAILED DESCRIPTION

Figure 2A:
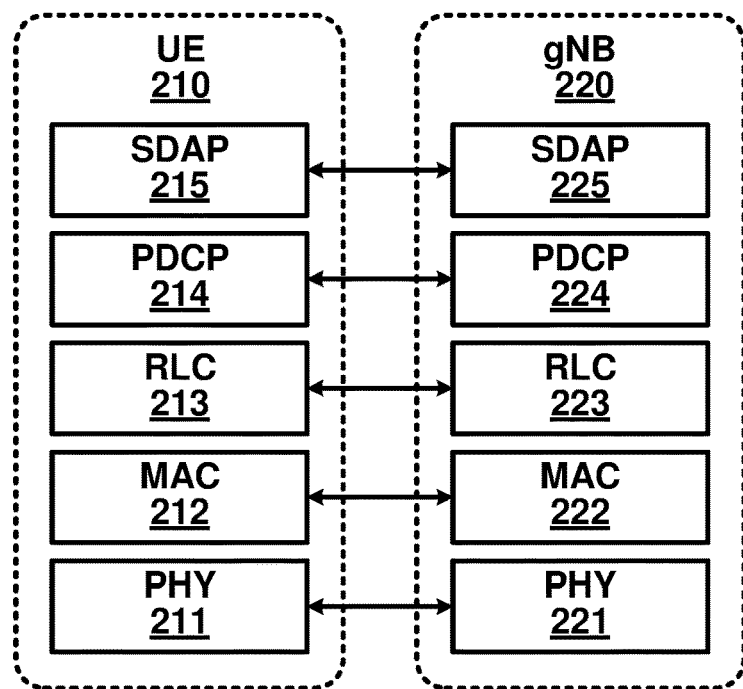
FIGS. 2A and 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNB s 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
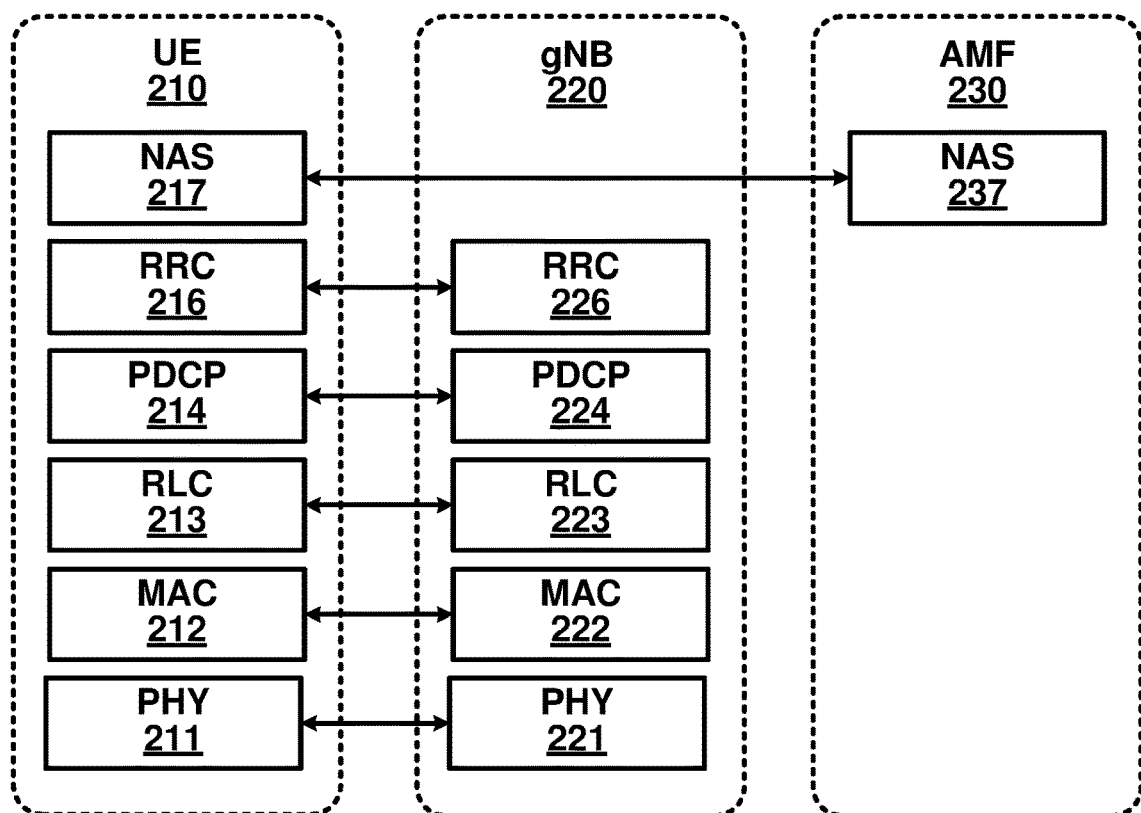

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
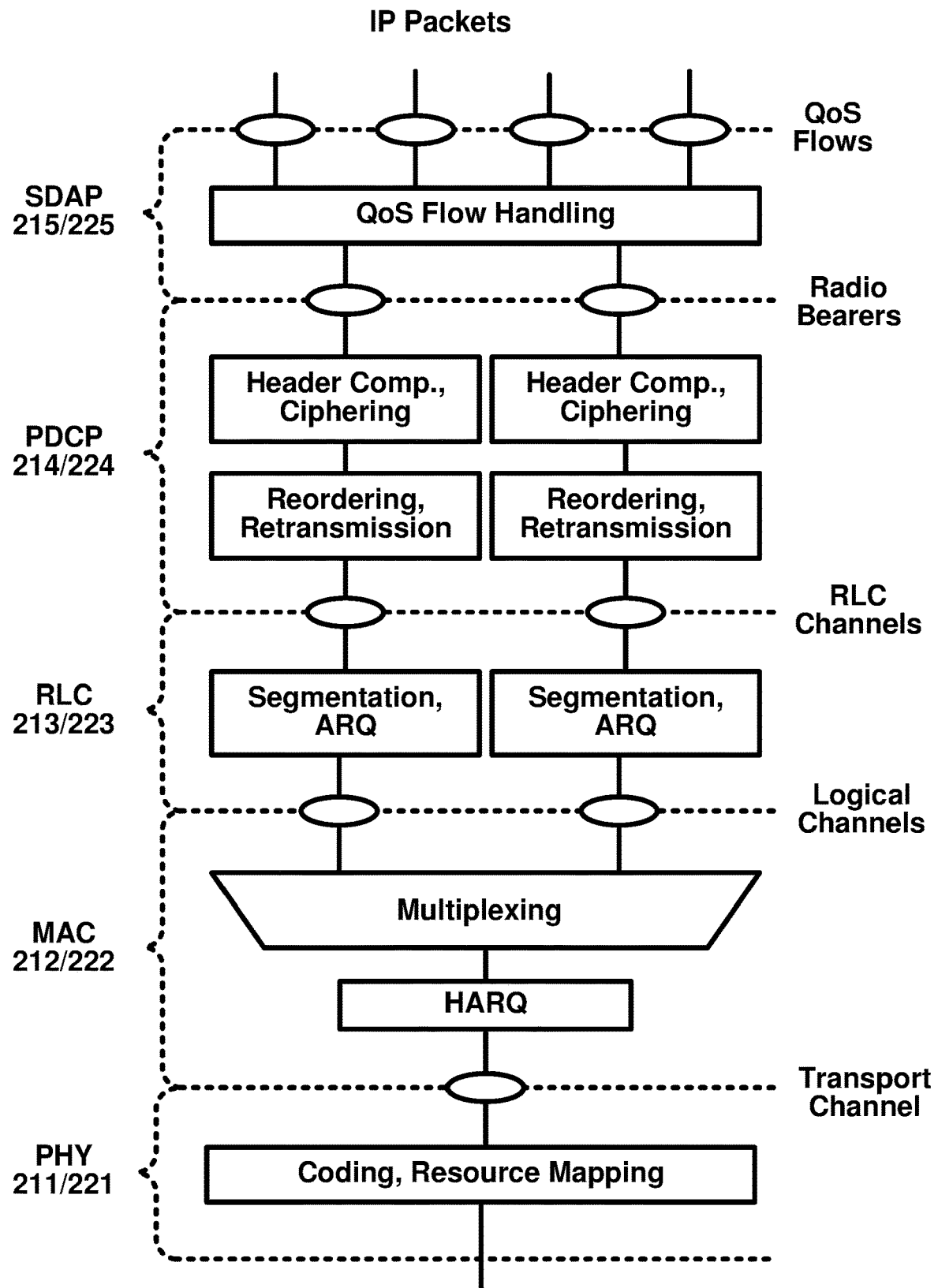
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer

404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 212 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
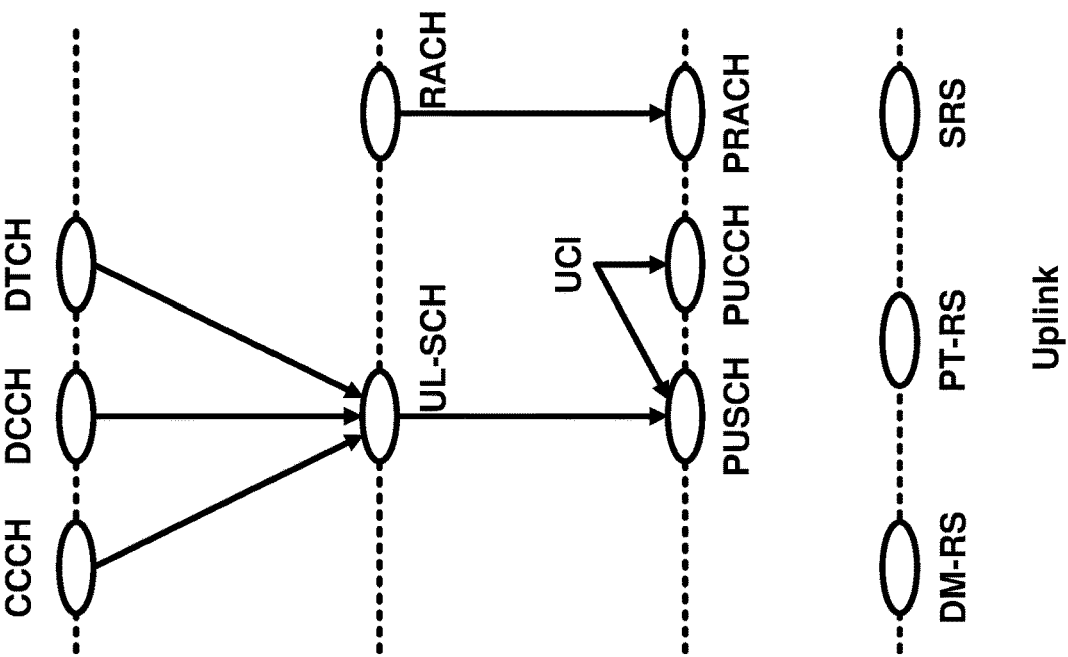
FIGS. 5A and 5B respectively illustrate a mapping between logical channels, transport channels, and physical channels for the downlink and uplink.
Figure 5A:
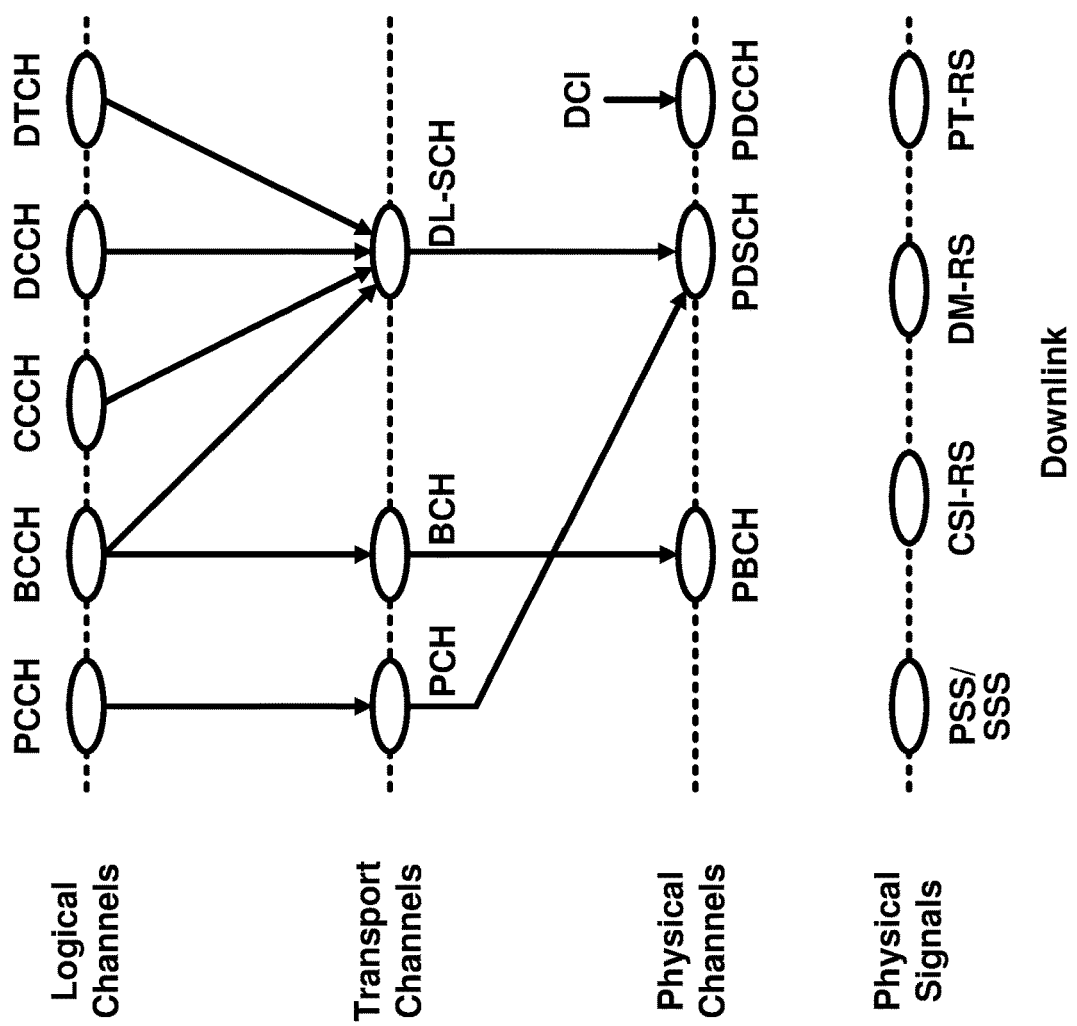

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

- a paging control channel (PCCH) for carrying paging messages used to page a UE whose location is not known to the network on a cell level;
- a broadcast control channel (BCCH) for carrying system information messages in the form of a master information block (MIB) and several system information blocks (SIBs), wherein the system information messages may be used by the UEs to obtain information about how a cell is configured and how to operate within the cell;
- a common control channel (CCCH) for carrying control messages together with random access;
- a dedicated control channel (DCCH) for carrying control messages to/from a specific the UE to configure the UE; and
- a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

- a paging channel (PCH) for carrying paging messages that originated from the PCCH;
- a broadcast channel (BCH) for carrying the MIB from the BCCH;
- a downlink shared channel (DL-SCH) for carrying downlink data and signaling messages, including the SIBs from the BCCH;
- an uplink shared channel (UL-SCH) for carrying uplink data and signaling messages; and
- a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
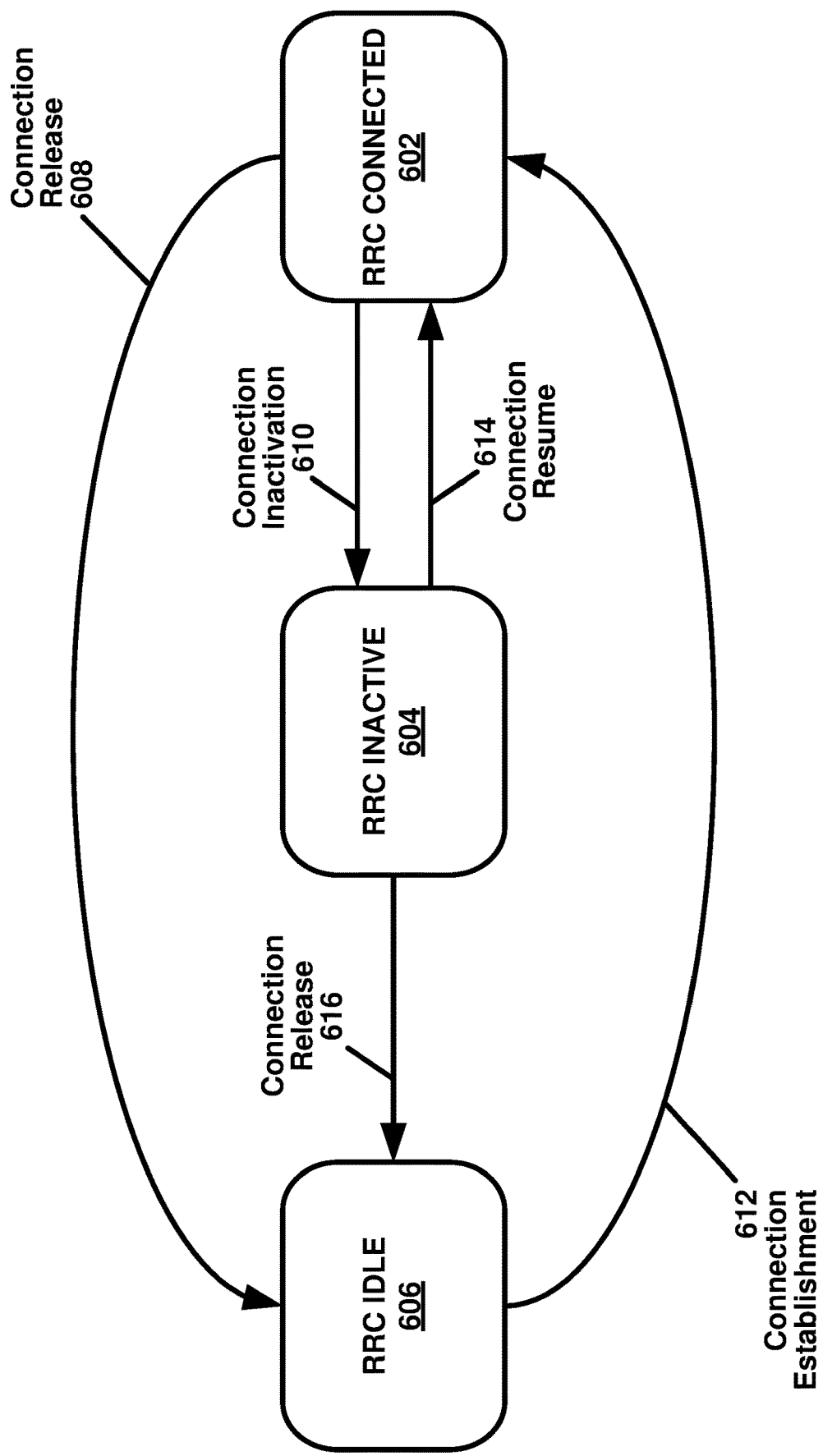
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
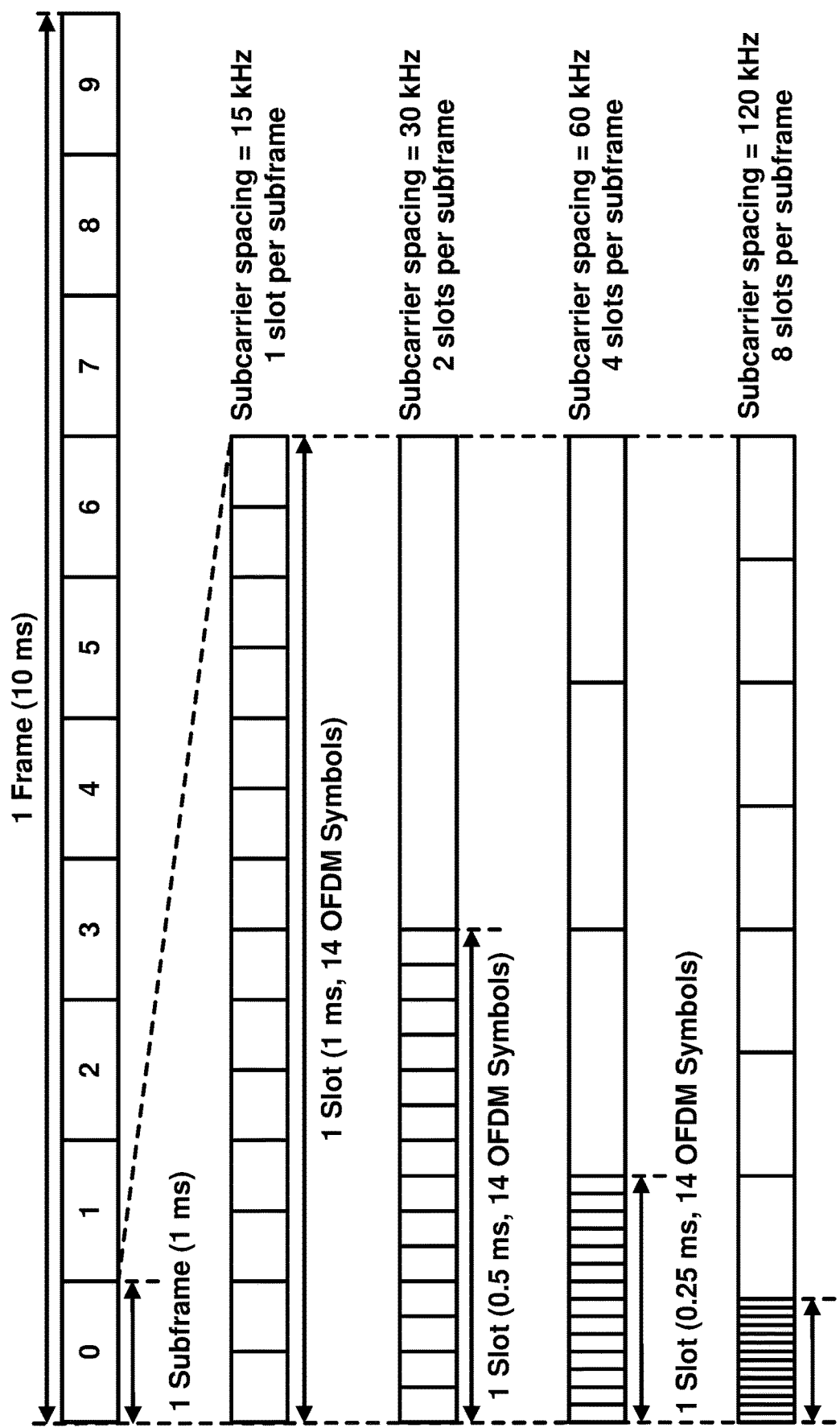
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
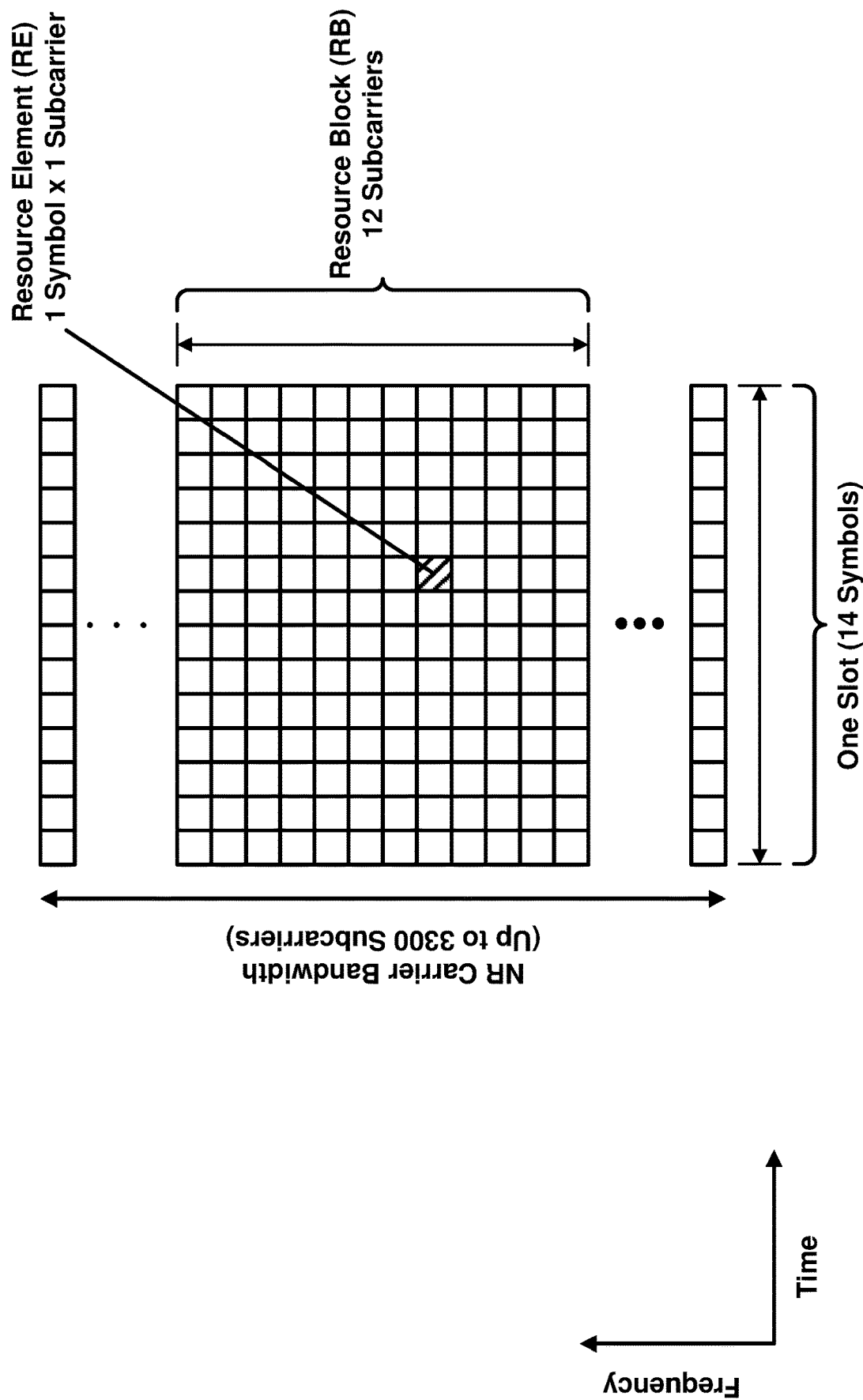
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
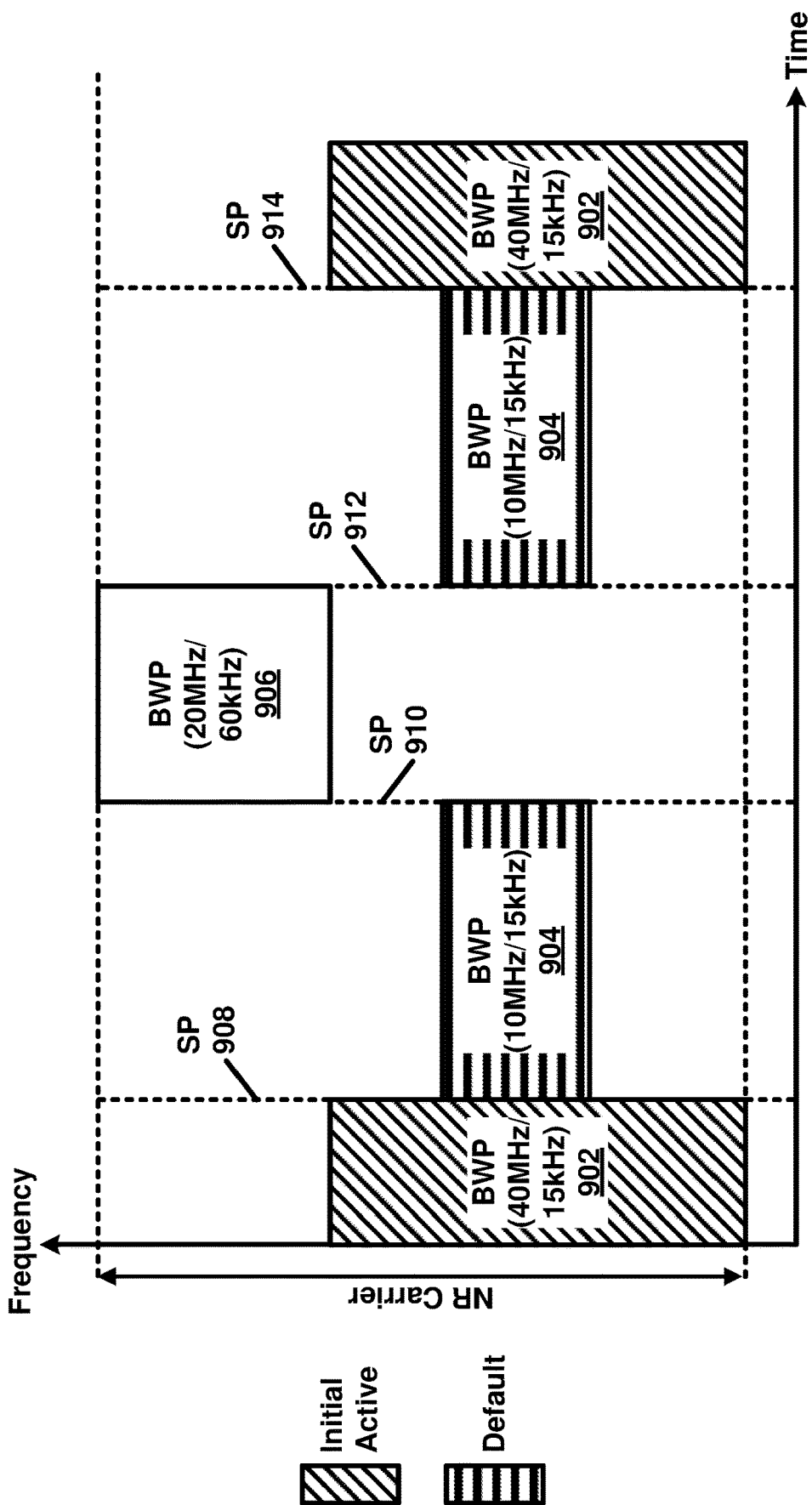
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
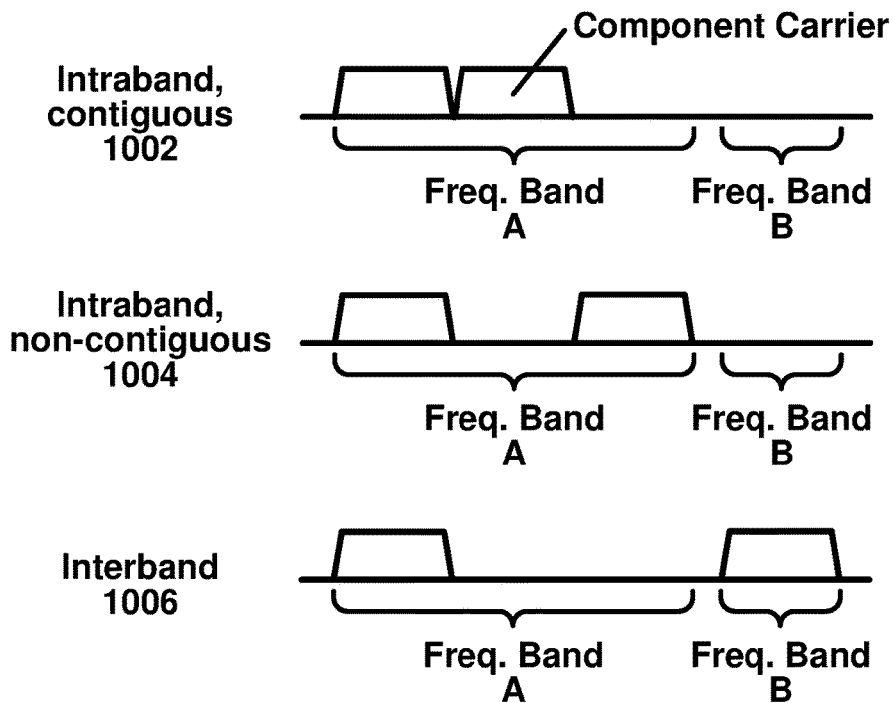
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
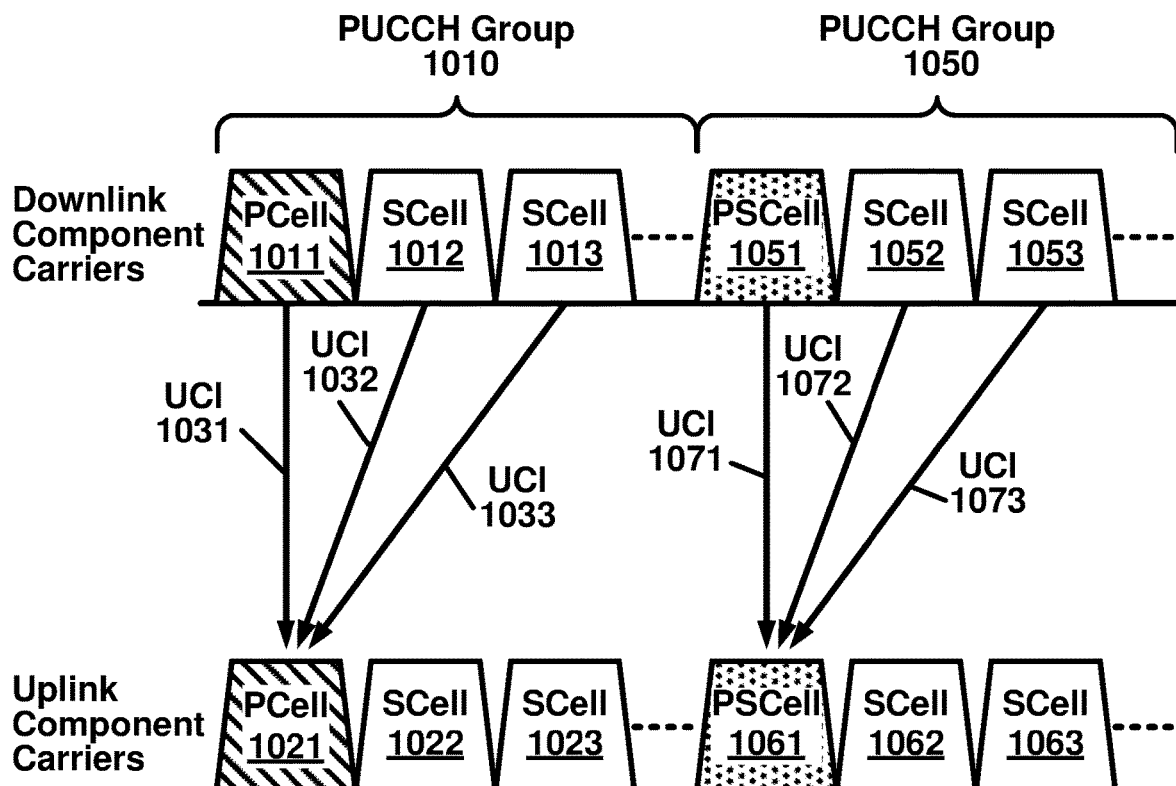
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
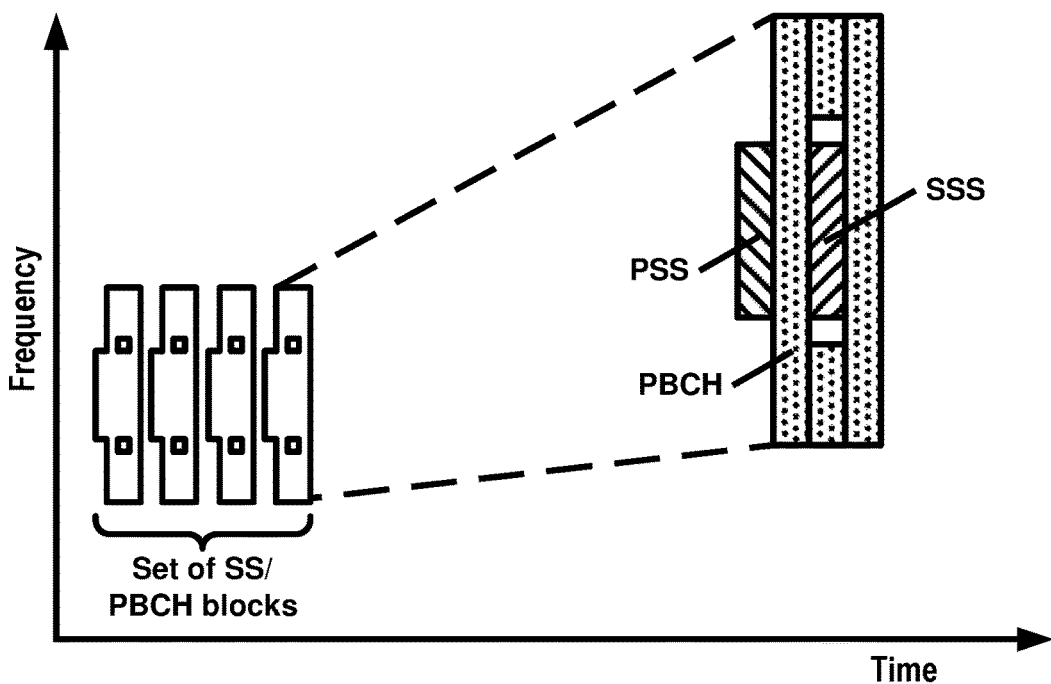
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB 1. The SIB1 may be decoded using parameters provided in the MIB. The PBCH may indicate an absence of SIB 1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RS s for channel estimation or any other suitable purpose. The base station may configure a UE with one or more of the same/similar CSI-RS s. The UE may measure the one or more CSI-RS s. The UE may estimate a downlink channel state and/or generate a CSI report based on the measuring of the one or more downlink CSI-RS s. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
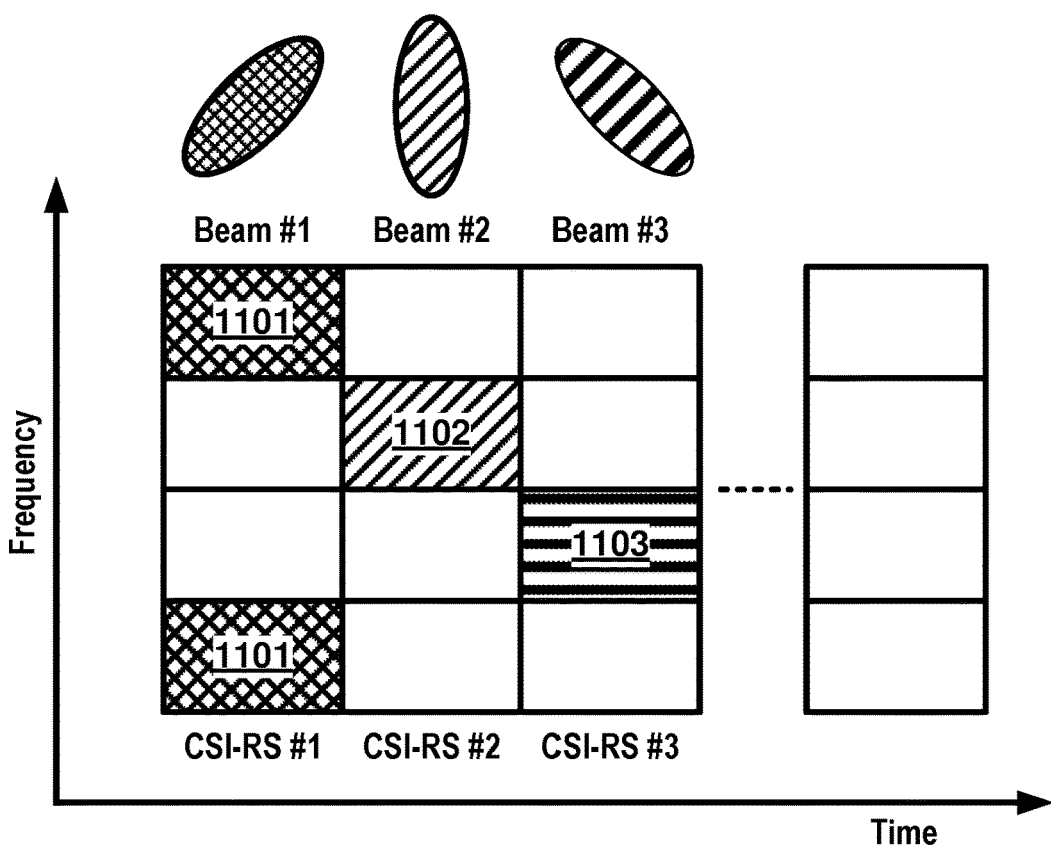
FIG. 11B illustrates an example of CSI-RS s that are mapped in the time and frequency domains.

FIG. 11B illustrates an example of channel state information reference signals (CSI-RS s) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RS s. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RS s such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RS s) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RS s of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
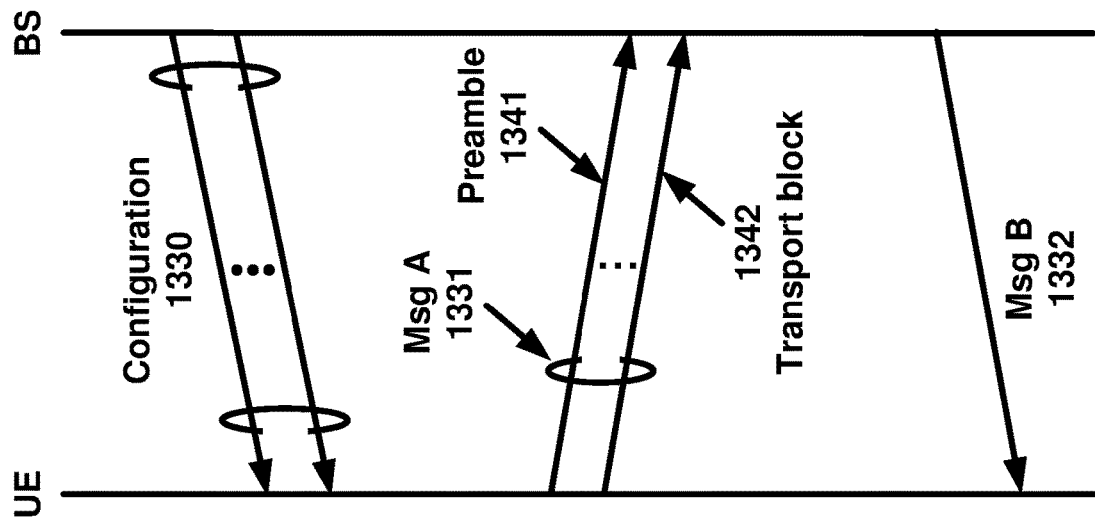
FIGS. 13A, 13B, and 13C respectively illustrate a four-step contention-based random access procedure, a two-step contention-free random access procedure, and another two-step random access procedure.
Figure 13B:
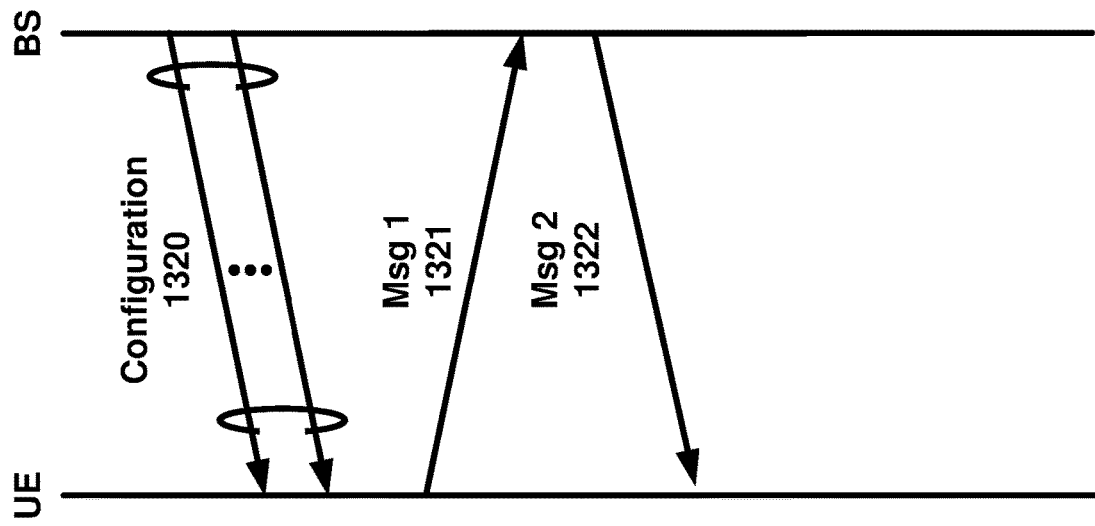
Figure 13A:
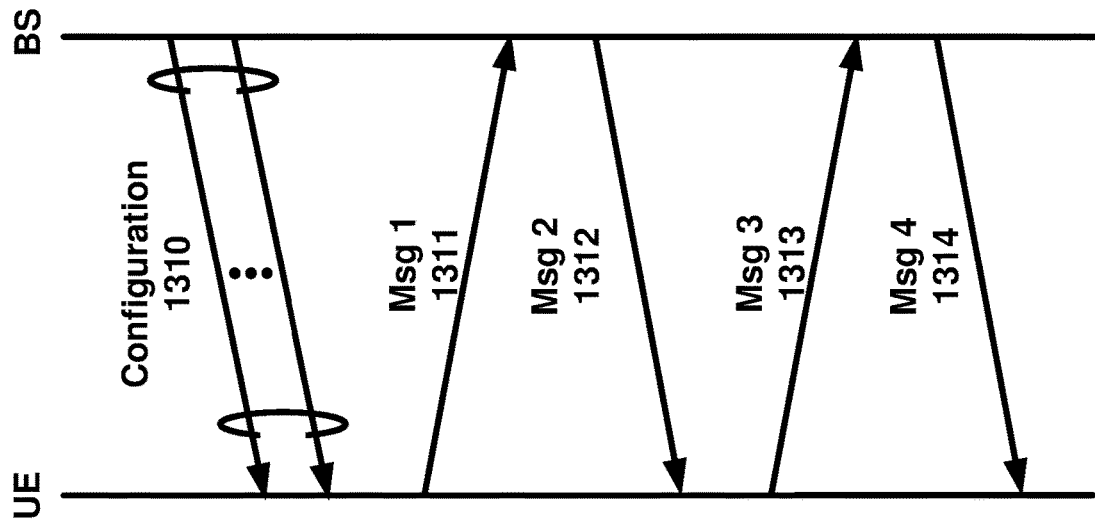

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RS s. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RS s) and determine at least one reference signal having an RSRP above an RSRP threshold (e.g., rsrp-ThresholdSSB and/or rsrp-ThresholdCSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RS s). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RS s) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8×ul_carrier_id, where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE;

and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
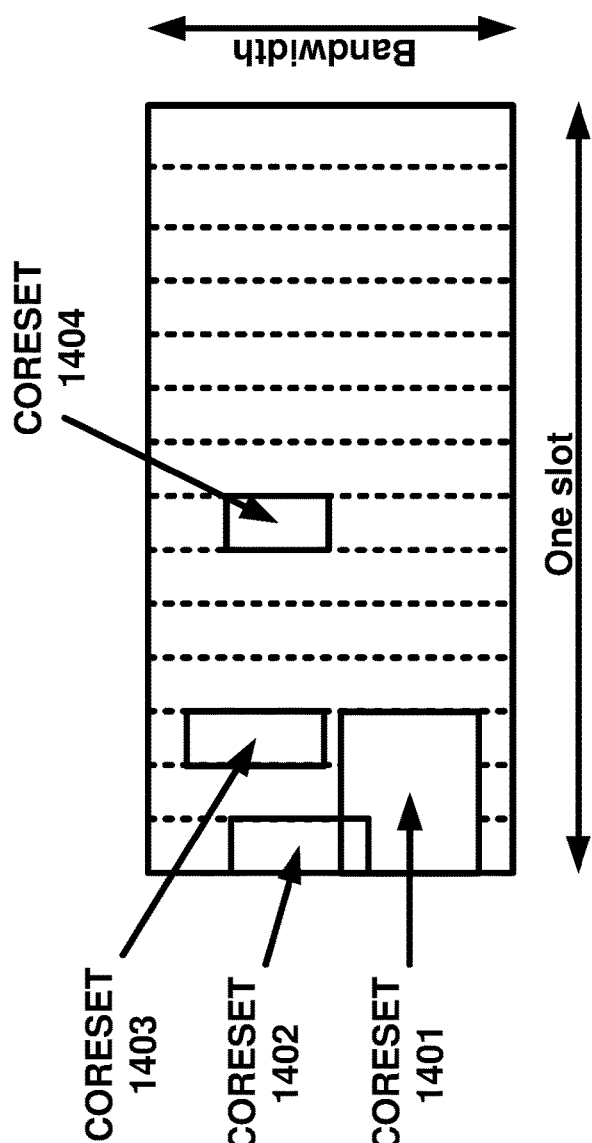
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
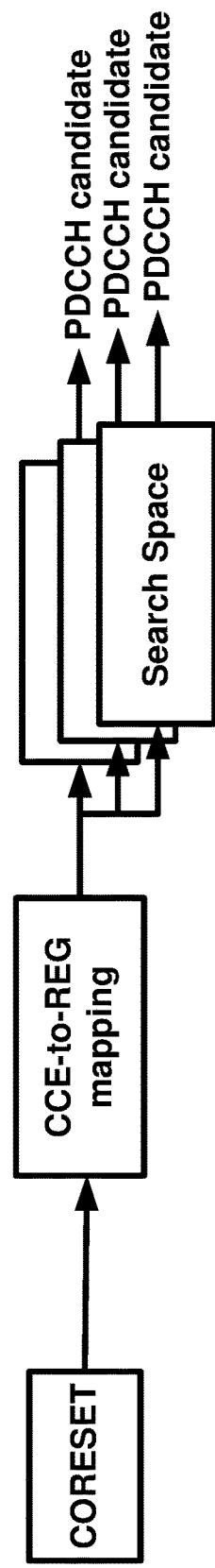
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
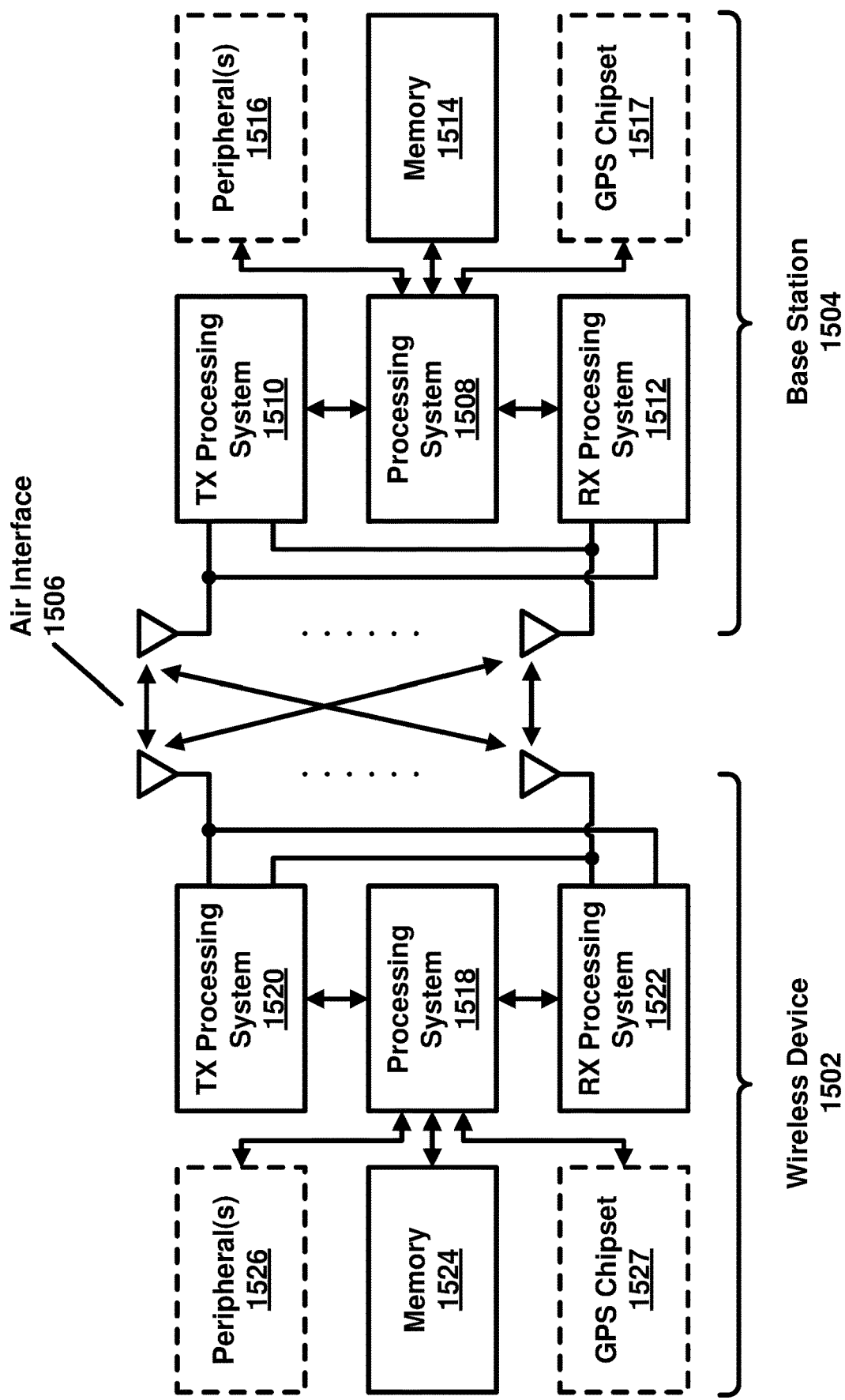
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

Figure 16A:
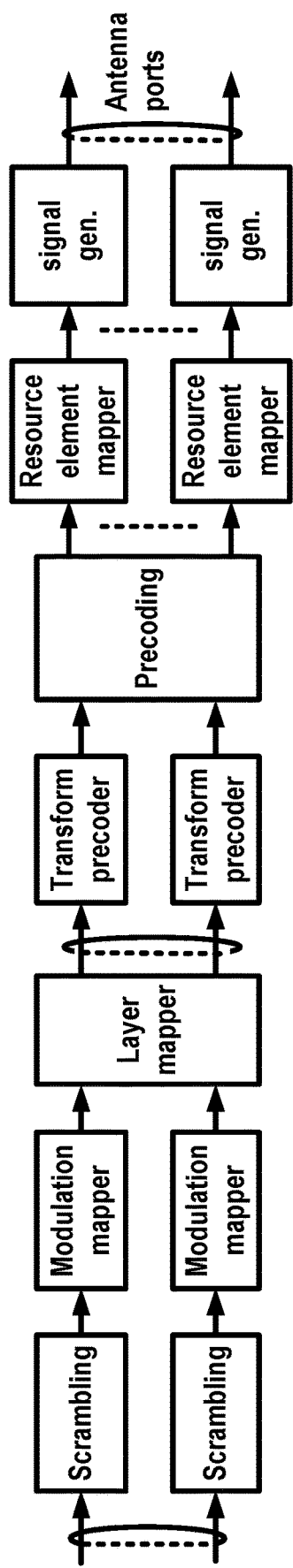
FIGS. 16A, 16B, 16C, and 16D illustrate example structures for uplink and downlink transmission.

FIG. 16A illustrates an example structure for uplink transmission. A baseband signal representing a physical uplink shared channel may perform one or more functions. The one or more functions may comprise at least one of:

scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

Figure 16D:
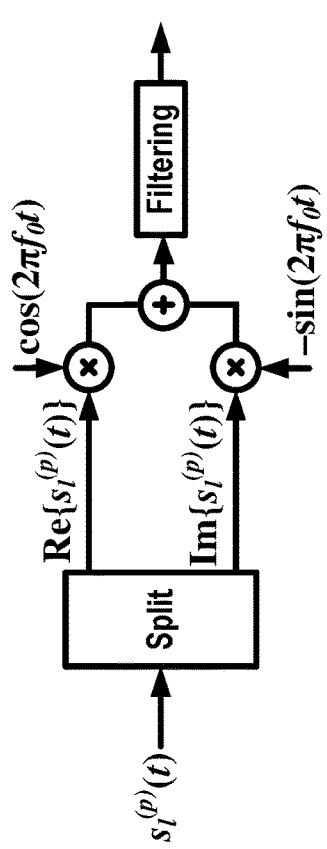
Figure 16C:
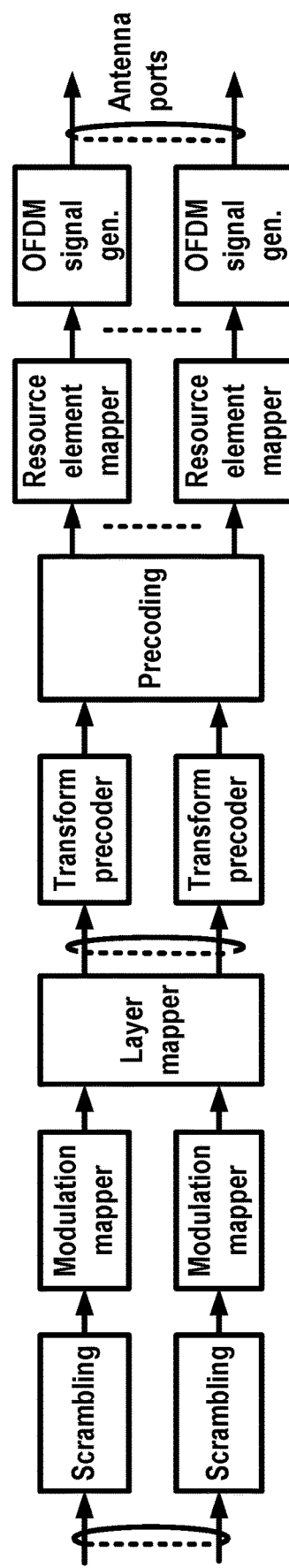
Figure 16B:
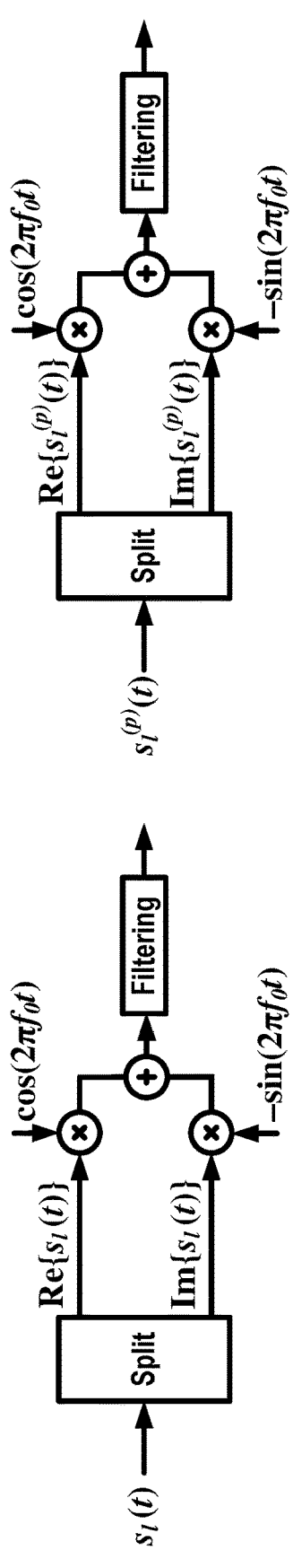

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission. A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
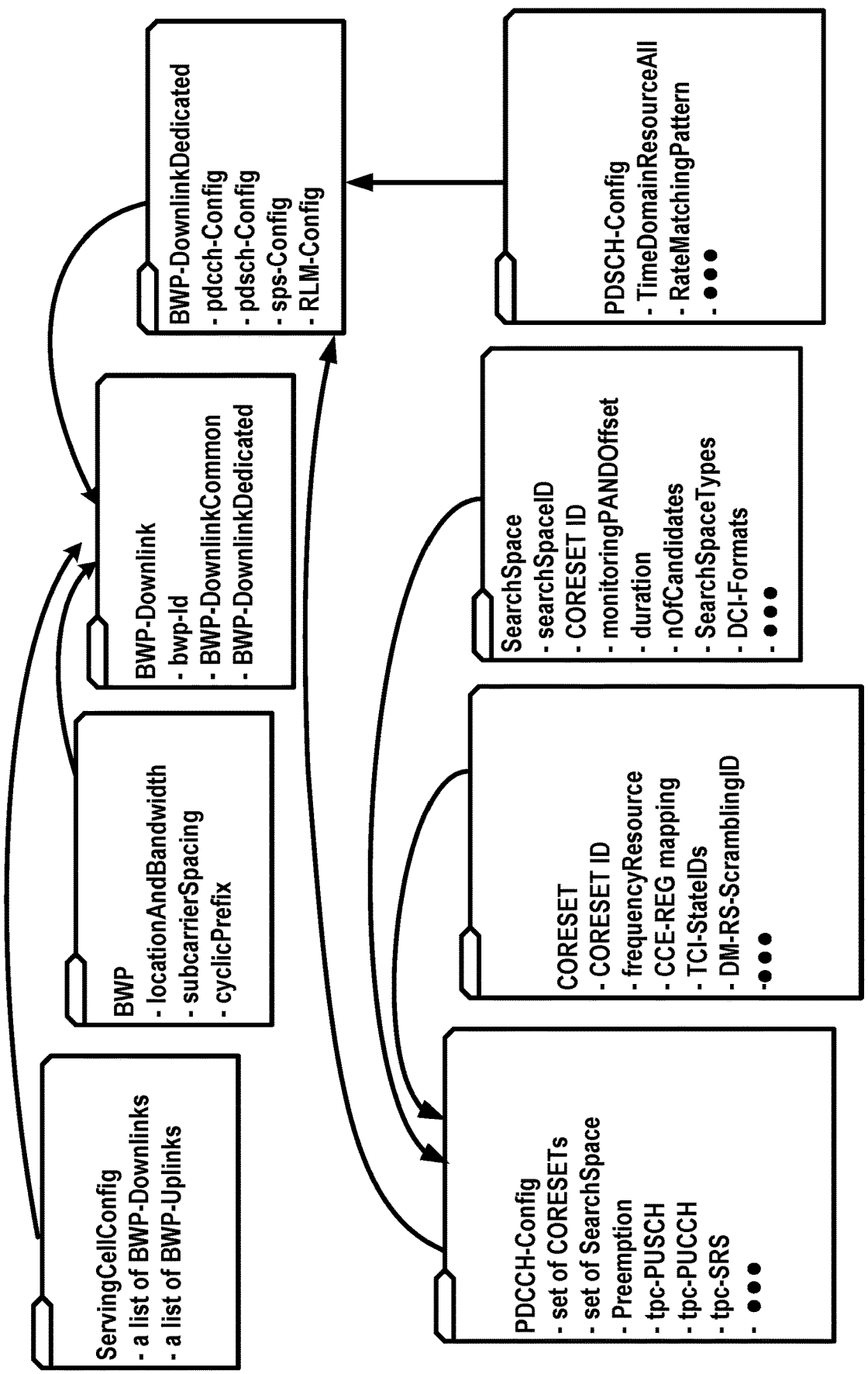
FIG. 17 illustrates configuration parameters for a wireless device to receive control and/or data from a base station as per an aspect of an example embodiment of the present disclosure.

FIG. 17 illustrates example configuration parameters for a wireless device to receive control and/or data from a base station. A wireless device may receive one or more radio resource control (RRC) messages comprising configuration parameters of a cell. The configuration parameters may comprise one or more parameters of a serving cell configuration (e.g., ServingCellConfig). The one or more parameters of the serving cell configuration may comprise one or more downlink bandwidth parts (e.g., a list of BWP-Downlinks). The one or more parameters of the serving cell configuration may comprise one or more uplink bandwidth parts (e.g., a list of BWP-Uplinks). A downlink bandwidth part (e.g., BWP-Downlink) and/or an uplink bandwidth part (e.g., BWP-Uplink) may comprise a bandwidth part index (e.g., bwp-Id), configuration parameters of a cell-common downlink bandwidth part (e.g., BWP-DownlinkCommon), and/or a UE-specific downlink bandwidth part (e.g., BWP-DownlinkDedicated). For example, the bandwidth part index (bwp-Id) may indicate a bandwidth part configuration. For example, an index of the bandwidth part is the bandwidth part index. The bandwidth part configuration may comprise a location and bandwidth information (locationAndBandwidth). The locationAndBandwidth may indicate a starting resource block (RB) of the bandwidth part and a bandwidth of the bandwidth part, based on a reference point (e.g., a pointA of a carrier/cell for the bandwidth part). The bandwidth part configuration may comprise a subcarrier spacing (e.g., subcarrierSpacing) and a cyclic prefix (e.g., cyclicPrefix). For example, the subcarrier spacing may be one of 15 kHz, 30 kHz, 60 kHz, 120 kHz, 240 kHz, 480 kHz, and 960 kHz. For example, the cyclic prefix may be one of a normal cyclic prefix and an extended cyclic prefix.

Configuration parameters of the cell-specific downlink bandwidth (e.g., BWP-DownlinkCommon) may indicate/comprise genericParameters, pdcch-ConfigCommon, and/or pdsch-ConfigCommon. For example, pdcch-ConfigCommon may comprise cell-specific parameters for receiving downlink control information (DCIs) via the cell-specific downlink bandwidth part (e.g., an initial BWP). For example, pdsch-ConfigCommon may comprise cell-specific parameters for receiving PDSCHs of transport blocks (TBs) via the cell-specific downlink bandwidth part. Configuration parameters of the UE-specific downlink bandwidth part (e.g., BWP-DownlinkDedicated) may comprise pdcch-Config, pdsch-Config, sps-Config, and/or radioLinkMonitoring-Config (e.g., RLM-Config). The configuration parameters may comprise sps-ConfigList and/or beamFailureRecovery-SCellConfig. For example, beamFailureRecoverySCellConfig may comprise reference signal parameters for beam failure recovery for secondary cells. For example, pdcch-Config may comprise parameters for receiving DCIs for the UE-specific downlink bandwidth part. For example, pdsch-Config may comprise parameters for receiving PDSCHs of TBs for the UE-specific downlink bandwidth part. For example, sps-Config may comprise parameters for receiving semi-persistent scheduling PDSCHs. The base station may configure a SPS for a BWP or a list of SPS for the BWP. For example, radioLinkMonitoringConfig may comprise parameters for radio link monitoring.

Configuration parameters of pdcch-Config may indicate/comprise at least one of a set of coresets, a set of search spaces, a downlink preemption (e.g., downlinkPreemption), a transmission power control (TPC) for PUSCH (e.g., tpc-PUSCH), a TPC for PUCCH and/or a TPC for SRS. The configuration parameters may comprise a list of search space switching groups (e.g., searchsSpaceSwitchingGroup), a search space switching timer (e.g., searchSpaceSwitching-Timer), an uplink cancellation, and/or a monitoring capability configuration (e.g., monitoringCapabilityConfig). The base station may configure the list of search space switching groups, where the wireless device may switch from a first search space group to a second search space group based on the search space switching timer or a rule, an indication, or an event. The base station may configure up to K (e.g., K=3) coresets for a BWP of a cell. The downlink preemption may indicate whether to monitor for a downlink preemption indication for the cell. The monitoring capability config may indicate whether a monitoring capability of the wireless device would be configured for the cell, where the capability is based on a basic capability or an advanced capability. The base station may configure up to M (e.g., M=10) search spaces for the BWP of the cell. The tpc-PUCCH, tpc-PUSCH, or tpc-SRS may enable and/or configure reception of TPC commands for PUCCH, PUSCH or SRS respectively. The uplink cancellation may indicate to monitor uplink cancellation for the cell.

Configuration parameters of pdcch-ConfigCommon may comprise a control resource set zero (e.g., controlResource-SetZeros), a common control resource set (e.g., common-ControlResourceSet), a search space zero (e.g., searchSpaceZero), a list of common search space (e.g., commonSearchSpaceList), a search space for SIB1 (e.g., searchSpaceSIB1), a search space for other SIBs (e.g., searchSpaceOtherSystemInformation), a search space for paging (e.g., pagingSearchSpace), a search space for random access (e.g., ra-SearchSpace), and/or a first PDCCH monitoring occasion. The control resource set zero may comprise parameters for a first coreset with an index value zero. The coreset zero may be configured for an initial bandwidth part of the cell. The wireless device may use the control resource set zero in a BWP of the cell, wherein the BWP is not the initial BWP of the cell based on one or more conditions. For example, a numerology of the BWP may be same as the numerology of the initial BWP. For example, the BWP may comprise the initial BWP. For example, the BWP may comprise the control resource set zero. The common control resource set may be an additional common coreset that may be used for a common search space (CSS) or a UE-specific search space (USS). The base station may configure a bandwidth of the common control resource set where the bandwidth is smaller than or equal to a bandwidth of the control resource set zero. The base station may configure the common control resource set such that it is contained within the control resource set zero (e.g., CORESET #0). The list of common search space may comprise one or more CSSs. The list of common search space may not comprise a search space with index zero (e.g., SS #0). The first PDCCH monitoring occasion may indicate monitoring occasion for paging occasion. The base station may configure a search space for monitoring DCIs for paging (e.g., paging-SearchSpace), for RAR monitoring (e.g., ra-SearchSpace), for SIB1 (e.g., searchSpaceSIB1) and/or for other SIBs than SIB1 (e.g., searchSpaceOtherSystemInformation). The search space with index zero (e.g., searchSpaceZero, SS #0) may be configured for the initial BWP of the cell. Similar to the coreset/CORESET #0, the SS #0 may be used in the BWP of the cell based on the one or more conditions.

Figure 18:
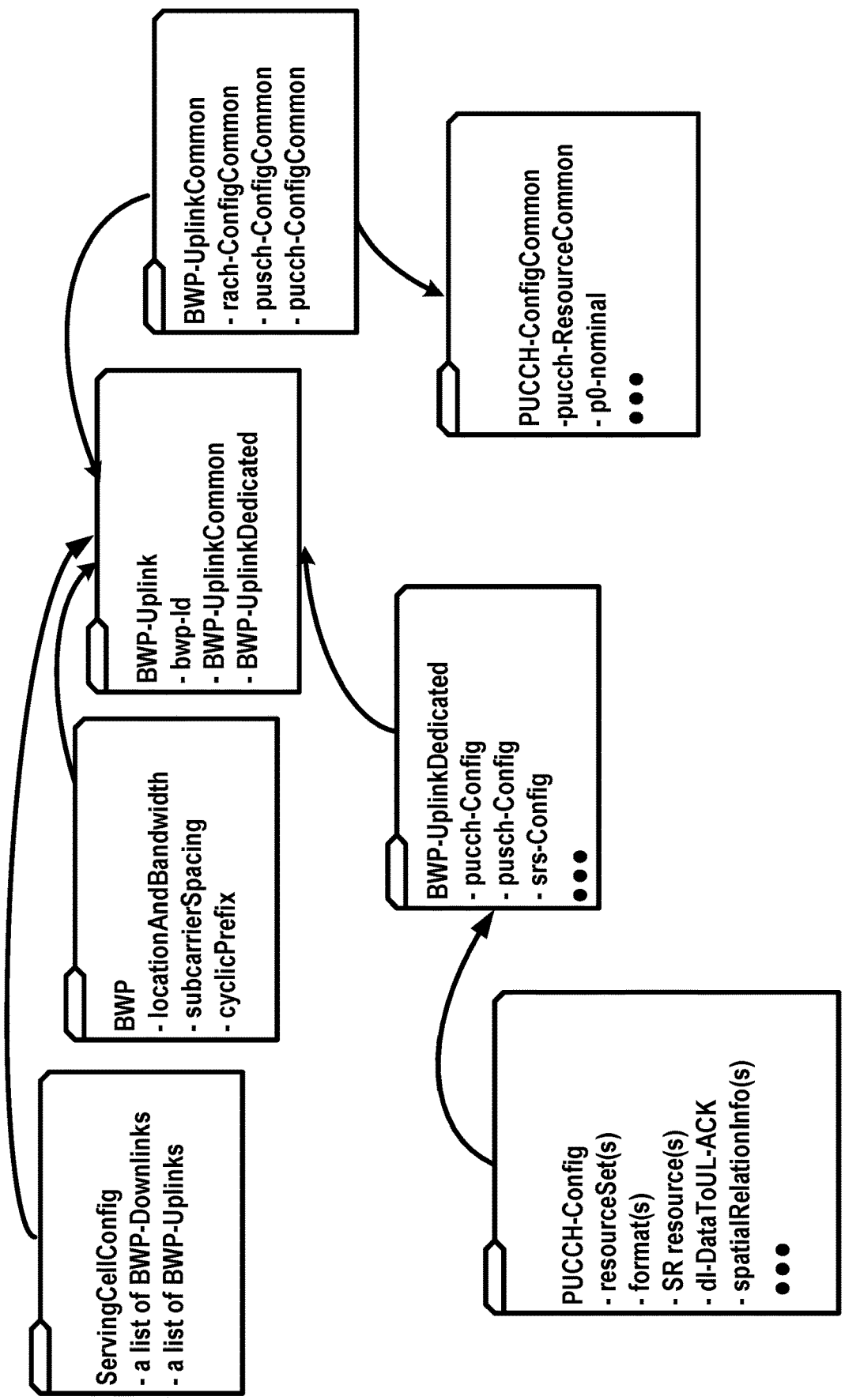
FIG. 18 illustrates configuration parameters for a wireless device to transmit control and/or data from a base station as per an aspect of an example embodiment of the present disclosure.

FIG. 18 illustrates example configuration parameters for a wireless device to transmit control and/or data from a base station. A wireless device may receive one or more radio resource control (RRC) messages comprising configuration parameters of a cell. The configuration parameters may comprise one or more parameters of a serving cell configuration (e.g., ServingCellConfig). The one or more parameters of the serving cell configuration may comprise one or more downlink bandwidth parts (e.g., a list of BWP-Downlinks). The one or more parameters of the serving cell configuration may comprise one or more uplink bandwidth parts (e.g., a list of BWP-Uplinks). An uplink BWP may comprise a bandwidth part index (bwp-id), one or more common uplink BWPs (e.g., configured via SIB/MIB, BWP-UplinkCommon), and/or one or more dedicated uplink BWPs (e.g., configured via RRC signaling, BWP-UplinkDedcated).

For example, configuration parameters of a cell-specific uplink bandwidth (e.g., BWP-UplinkCommon) may indicate/comprise rach-ConfigCommon, pusch-ConfigCommon and pucch-ConfigCommon. For example, pucch-Config-Common may comprise cell-specific parameters for transmitting uplink control information (UCIs) via the cell-specific uplink bandwidth part (e.g., initial UL BWP). For example, pusch-ConfigCommon may comprise cell-specific parameters for transmitting PUSCHs of transport blocks (TBs) via the cell-specific uplink bandwidth part. Configuration parameters of the UE-specific uplink bandwidth part (e.g., BWP-UplinkDedicated) may comprise pucch-Config, pusch-Config, srs-Config. For example, pucch-Config may comprise one or more PUCCH resource sets, one or more PUCCH formats (format), one or more scheduling request (SR) resources, one or more values for an offset between a PDSCH to a PUCCH or a HARQ-ACK feedback corresponding to the PDSCH (e.g., dl-DataToUL-ACK), and/or spatial domain filter parameters (spatialRelationInfo).

A base station may transmit one or more RRC messages comprising a list of one or more TCI-state configurations (e.g., a mother set of TCI states) for a PDSCH-Config. The base station may configure the one or more TCI-states to determine RX parameters to receive a downlink data for a BWP of a cell. One or more TCI-states configured in the mother set of TCI states may be configured to a set of TCI-states for a CORESET. When a gNB configures more than one TCI-states in a CORESET, the gNB may further active a TCI-state for the CORESET. A wireless device may support up to M active TCI-states where M may be different based on a UE capability.

A TCI-state may comprise parameters for configuring a quasi col-location (QCL) relationship between one or more downlink reference signals and the DM-RS ports used of the PDSCH (and/or a PDCCH). QCL relationships may be configured by the base station using qcl-Type1 for the first downlink reference signal, and qcl-Type2 (optionally) for the second downlink reference signal. For example, different QCL-types may be considered to support various use cases and one of QLC-types may be indicated in each qcl-Type1 or qcl-Type2. For example, QCL-TypeA means that a downlink RS (e.g., CSI-RS, TRS) and DM-RS s of a PDSCH (and/or a PDCCH) may have similar properties in Doppler shift, Doppler spread, average delay and delay spread. For example, QCL-TypeB means that a downlink RS and DM-RS s of a PDSCH (and/or a PDCCH) may have similar properties in Doppler shift and Doppler spread. For example, QCL-TypeC means that a downlink RS and DM-RS s of a PDSCH (and/or a PDCCH) may have similar properties in Doppler shift and average delay. For example, QCL-TypeD means that a downlink RS and DM-RS s of a PDSCH (and/or a PDCCH) may have similar properties in spatial RX parameters (e.g., spatial domain filter parameter, spatial domain filter). QCL-TypeD may be used between a gNB and a wireless device to determine one analog beam (e.g., a beam) from one or more analog beams (e.g., beams). A wireless device may determine its spatial RX parameters to receive a downlink analog beam (e.g., beam) based on a QCL-TypeD property configured in a TCI-state.

In an example, a TCI-state may comprise an identifier of the TCI-state (e.g., tci-StateId) and at least one QCL info (e.g., qcl-Type 1 and/or qcl-Type 2). A QCL info may indicate/comprise a serving cell index (ServCellIndex), a BWP id (BWP-Id), an index of a reference signal (e.g., between CSI-RS or SSB), and a QCL type (e.g., typeA, type B, typeC, and typeD). The reference signal may be used to determine spatial domain filter parameters (e.g., spatial domain filter) related to the TCI-state used for receiving downlink signals and/or transmitting uplink signals. The wireless device may receive a downlink channel based on the TCI-state. The wireless device may use/refer the reference signal and the QCL type to determine a quasi co-location relationship between the reference signal and a DM-RS of the downlink channel (e.g., PDCCH or PDSCH).

In an example, a base station and a wireless device may support a first mode (e.g., first TCI indication mechanism, a first spatial domain filter parameter (e.g., spatial filter parameter) update mechanism, a first type, a separate beam update mechanism) to update and/or apply a TCI state for a downlink channel or an uplink channel. For example, the following shows an example of the first mode to determine a TCI state of a PDSCH. In response to receiving the one or more RRC messages of the TCI-states (e.g., a mother set of TCI states) initially (e.g., RRC configuration of TCI-states first time) until the wireless device may receive the one or more MAC CE commands to activating a subset of TCI-states from the mother set of TCI states, the wireless device may assume that DM-RS ports of a PDSCH of a serving cell are QCL-ed with an SSB used in an initial access procedure with respect to QCL-Type A and QCL-TypeD if applicable. Based on the one or more MAC CE commands to activate a subset of TCI-states, the wireless device may apply one TCI state from the activated TCI-states for DM-RS ports of a PDSCH of the serving cell. A wireless device may receive an RRC message indicating tci-PresentInDCI is enabled for a CORESET carrying a DCI comprising a resource assignment for a downlink PDSCH. In response to enabled tci-PresentInDCI, the wireless device may expect the DCI field 'Transmission Configuration Indication' in a first DCI comprising a resource assignment based on one or more first DCI formats (e.g., DCI format 1_1). The wireless device may not expect the DCI field 'Transmission Configuration Indication' in a second DCI comprising a resource assignment based on one or more second DCI formats (e.g., DCI format 1_0). A wireless device may determine QCL information of DM-RS ports of a PDSCH based on at least:

in response to tci-PresentInDCI being enabled for a first CORESET carrying a first DCI comprising a resource assignment for a first PDSCH;

the first DCI indicating K0, a timing offset between a PDCCH and its corresponding PDSCH, that is larger than or equal to a Threshold-Sched-Offset, determining TCI information based on the indicated TCI state by the first DCI;

otherwise (e.g., K0 is smaller than the Threshold-Sched-Offset), determining QCL/TCI information (e.g., a default TCI state) based on one or more CORESETs within an active BWP of the serving cell where the one or more CORESETs are monitored by the wireless device in the latest slot and the index of the one or more CORESETs; selecting a lowest indexed CORESET from the one or more CORESETs and determining the QCL/TCI information based on a QCL/TCI state of the lowest indexed CORESET;

in response to tci-PresentInDCI not being enabled for a second CORESET carrying a second DCI comprising a resource assignment for a first PDSCH or a third DCI is based on the one or more second DCI formats (e.g., DCI format 1_0):

the second DCI indicating K0, a timing offset between a PDCCH and its corresponding PDSCH, that is larger than or equal to a Threshold-Sched-Offset, determining QCL/TCI information based on the QCL/TCI state of the second CORESET;

otherwise (e.g., K0 is smaller than the Threshold-Sched-Offset), determining QCL/TCI information (e.g., a default TCI state) based on one or more CORESETs within an active BWP of the serving cell where the one or more CORESETs are monitored by the wireless device in the latest slot and the index of the one or more CORESETs; selecting a lowest indexed CORESET from the one or more CORESETs and determining the QCL/TCI information based on a QCL/TCI state of the lowest indexed CORESET.

A wireless device may receive one or more MAC CE commands indicating up to K (e.g., K=8) TCI sates from the RRC configured TCI states (e.g., the mother set of TCI states) to one or more codepoints of a DCI field 'Transmission Configuration Indication' (if present). One or more DCI formats (e.g., DCI format 1_1) may carry the DCI field 'Transmission Configuration Indication'. In an example, the wireless device may transmit a HARQ-ACK corresponding to a PDSCH in slot n. The PDSCH may comprise/carry the activation command. In response to the transmitting the HARQ-ACK in the slot n, the wireless device may apply the mapping between the one or more TCI-states and the one or more codepoints of the DCI field "Transmission Configuration Indication" starting from slot $n+3N^{sub\ frame,\mu}_{slot}+1$.

Figure 19:
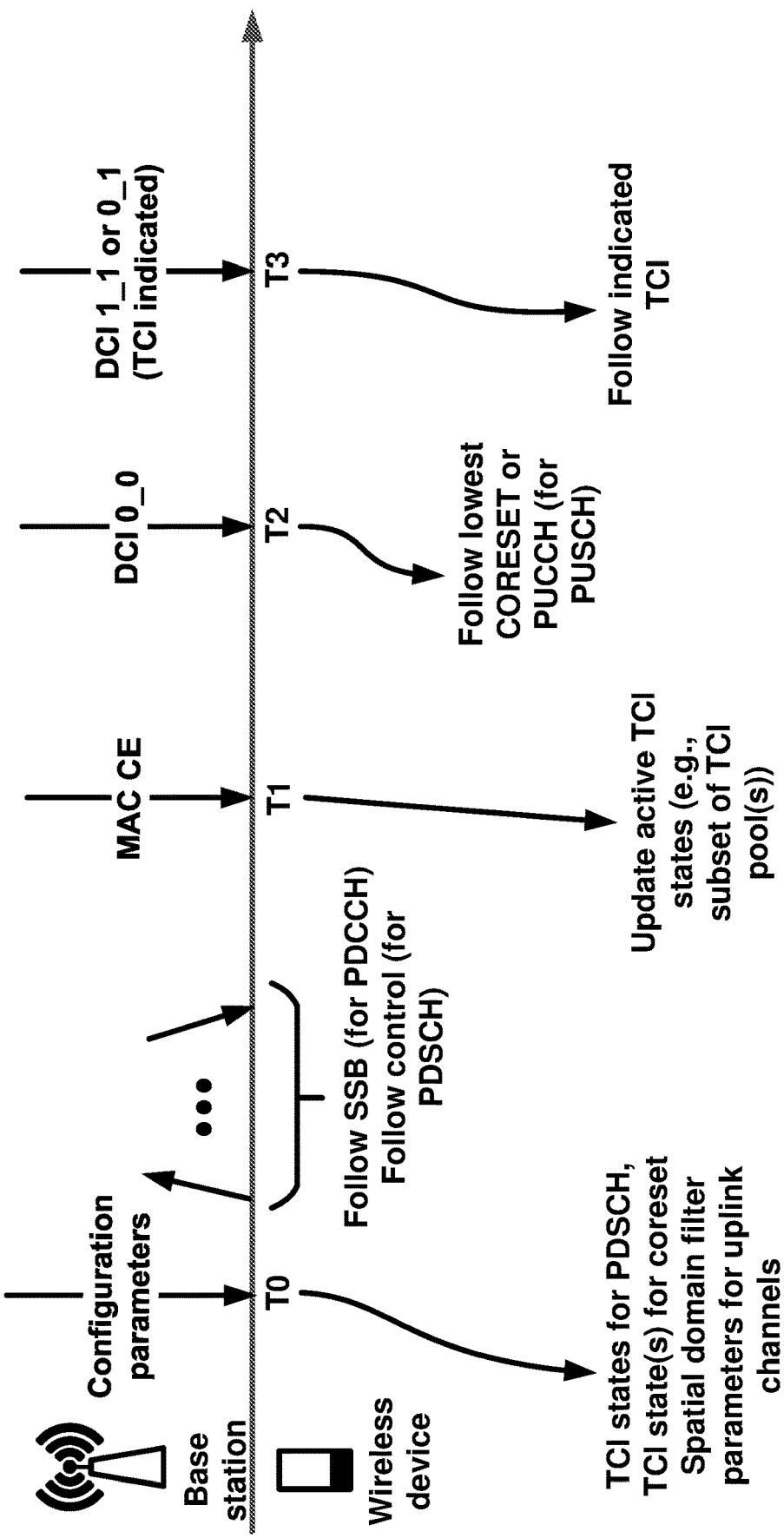
FIG. 19 illustrates a first mode of TCI state update mechanism as per an aspect of an example embodiment of the present disclosure.

FIG. 19 illustrates an example embodiment of the first mode to update and/or apply a TCI state for a downlink channel or an uplink channel. The base station may transmit one or more RRC messages comprising/indicating configuration parameters. The configuration parameters may comprise one or more TCI states for a CORESET. The configuration parameters may comprise/indicate one or more second TCI states for data channel such as PDSCH. The configuration parameters may comprise spatial domain filter parameters for uplink data and/or uplink control channels. The wireless device may receive the one or more RRC messages at a time T0.

After the wireless device receives an initial higher layer configuration of one or more TCI-states at the time T0 and before a reception of an activation command via a MAC-CE at a time T1, the wireless device may determine a TCI-state of a PDCCH or a coreset based on a SS/PBCH block via an initial access procedure. For example, the SS/PBCH block is a SS/PBCH block selected for a random access procedure which occurs during the initial access procedure. For example, the SS/PBCH block is a SS/PBCH block with a best/good signal quality (e.g., a signal quality of the SS/PBCH block exceeds a threshold). The wireless device may determine QCL-TypeA properties based on the SS/PBCH block. The wireless device may determine QCL-TypeD properties based on the SS/PBCH block. The wireless device may determine a TCI state of a PDSCH based on a PDCCH or a coreset scheduling the PDCCH, where the TCI state of the PDSCH is same as a second TCI state of the PDCCH or the coreset.

Between T0 and T1, the wireless device may determine a spatial domain filter parameter (or a TCI state) of a PUSCH via a cell based on a spatial domain filter parameter (or a TCI state) of a PUCCH resource with a lowest index among one or more configured PUCCH resources if the one or more PUCCH resources are configured for the cell. The wireless device may determine a spatial domain filter parameter (or a TCI state) of a PUSCH via a cell based on a TCI state) of a coreset with a lowest index among one or more coresets of the cell when default beam pathloss for PUSCH is enabled. The wireless device may determine a TCI state of a PUSCH based on an SRS resource indicator (SRI) associated with the PUSCH. The wireless device may determine a spatial domain filter parameter of a PUCCH based on a most recent random access procedure (e.g., a spatial domain filter parameter used for a preamble transmission for the most recent random access procedure). The most recent random access procedure may be performed for an initial access process or Reconfiguration with sync procedure (e.g., handover) or beam failure recovery procedure or an uplink synchronization.

The wireless device may receive an activation MAC CE at the time T1. The activation MAC CE may activate one or more TCI states for receiving PDSCHs. The activation MAC CE may activate a TCI state for a CORESET. In response to receiving the MAC CE activating the one or more TCI states for receiving PDSCHs, the wireless device may activate the one or more TCI states. The base station may transmit a DCI (e.g., based on DCI format 1_1) comprising a TCI state (or a TCI state code point) that indicating one TCI of the one or more TCI states. The wireless device may receive a PDSCH based on the DCI via the indicated TCI state. Similarly, a second DCI (e.g., based on DCI format 0_1) may indicate an SRI indicating a spatial domain filter parameter. The wireless device may transmit a PUSCH based on the second DCI via the indicated SRI.

The wireless device may receive a DCI based on a fallback DCI format (e.g., DCI format 1_0 or 0_0). The wireless device may determine a spatial domain filter parameter or a TCI state for a scheduled data reception or transmission based on a rule. For example, for a PDSCH, the wireless device may follow a coreset or a DCI scheduling the PDSCH. For example, for a PUSCH, the wireless device may follow a TCI state of a lowest coreset or a TCI state or a spatial domain filter parameter of a lowest indexed PUCCH. In FIG. 19, the wireless device receives a first DCI (e.g., DCI 0_0), based on a fallback DCI format (e.g., DCI format 1_0 or a DCI format 0_0), scheduling a PUSCH of a cell. The wireless device determines a spatial domain filter parameter of the PUSCH based on a lowest indexed coreset of the cell. In FIG. 19, the wireless device receives a second DCI (e.g., DCI 1_1 or DCI 0_1), based on a non-fallback DCI format (e.g., DCI format 1_1 or DCI format 0_1), scheduling a PDSCH or a PUSCH, the wireless device may determine a TCI state or a spatial domain filter parameter of the PDSCH or the PUSCH based on the DCI if TCI is indicated by the DCI.

In an example, a wireless device may monitor one or more CORESETs (or one or more search spaces) within/in an active BWP (e.g., active downlink BWP) of a serving cell in one or more slots. In an example, the monitoring the one or more CORESETs within/in the active BWP of the serving cell in the one or more slots may comprise monitoring at least one CORESET within/in the active BWP of the serving cell in each slot of the one or more slots. In an example, a latest slot of the one or more slots may occur latest in time. In an example, the wireless device may monitor, within/in the active BWP of the serving cell, one or more second CORESETs of the one or more CORESETs in the latest slot. In response to the monitoring the one or more second CORESETs in the latest slot and the latest slot occurring latest in time, the wireless device may determine the latest slot. In an example, each CORESET of the one or more second CORESETs may be identified by a CORESET specific index (e.g., indicated by a higher layer CORESET-ID). In an example, a CORESET specific index of a CORESET of the one or more secondary CORESETs may be the lowest among the CORESET specific indices of the one or more second CORESETs. In an example, the wireless device may monitor a search space associated with the CORESET in the latest slot. In an example, in response to the CORESET specific index of the CORESET being the lowest and the monitoring the search space associated with the CORESET in the latest slot, the wireless device may select the CORESET of the one or more secondary CORESETs.

In an example, when the offset between the reception of the DCI in the CORESET and the PDSCH scheduled by the DCI is lower than the threshold (e.g., Threshold-Sched-Offset), the wireless device may perform a default PDSCH RS selection. In an example, in the default PDSCH RS selection, the wireless device may assume that one or more DM-RS ports of the PDSCH of a serving cell are quasi co-located with one or more RSs in a TCI-state with respect to one or more QCL type parameter(s). The one or more RSs in the TCI-state may be used for PDCCH quasi co-location indication of the (selected) CORESET of the one or more second CORESETs.

In an example, a wireless device may receive a DCI via a PDCCH in a CORESET. In an example, the DCI may schedule a PDSCH. In an example, an offset between a reception of the DCI and the PDSCH may be less than a threshold (e.g., Threshold-Sched-Offset). A first QCL type (e.g., 'QCL-TypeD', etc.) of one or more DM-RS ports of the PDSCH may be different from a second QCL type (e.g., 'QCL-TypeD', etc.) of one or more second DM-RS ports of the PDCCH. In an example, the PDSCH and the PDCCH may overlap in at least one symbol. In an example, in response to the PDSCH and the PDCCH overlapping in at least one symbol and the first QCL type being different from the second QCL type, the wireless device may prioritize a reception of the PDCCH associated with the coreset. In an example, the prioritizing may apply to an intra-band CA case (when the PDSCH and the CORESET are in different component carriers). In an example, the prioritizing the reception of the PDCCH may comprise receiving the PDSCH with the second QCL type of one or more second DM-RS ports of the PDCCH. In an example, the prioritizing the reception of the PDCCH may comprise overwriting the first QCL type of the one or more DM-RS ports of the PDSCH with the second QCL type of the one or more second DM-RS ports of the PDCCH. In an example, the prioritizing the reception of the PDCCH may comprise assuming a spatial QCL of the PDCCH (e.g., the second QCL type), for the simultaneous reception of the PDCCH and PDSCH, on the PDSCH. In an example, the prioritizing the reception of the PDCCH may comprise applying a spatial QCL of the PDCCH (e.g., the second QCL type), for the simultaneous reception of the PDCCH and PDSCH, on the PDSCH. In an example, the prioritizing the reception of the PDCCH may comprise receiving the PDCCH and not receiving the PDSCH.

In an example, none of the configured TCI-states may contain a QCL type (e.g., 'QCL-TypeD'). In response to the none of the configured TCI-states containing the QCL type, the wireless device may obtain the other QCL assumptions from the indicated TCI-states for its scheduled PDSCH irrespective of the time offset between the reception of the DCI and the corresponding PDSCH.

In an example, a base station may configure a wireless device with one or more sounding reference signal (SRS) resource sets by a higher layer parameter SRS-ResourceSet. In an example, for an SRS resource set of the one or more SRS resource sets, the base station may configure the wireless device with one or more SRS resources by a higher layer parameter SRS-Resource. In an example, the wireless device may indicate a maximum value of a number of the one or more SRS resources to the base station (e.g., by SRS capability). In an example, the base station may configure an applicability of the SRS resource set by a higher layer parameter usage in the higher layer parameter SRS-ResourceSet.

In an example, when the higher layer parameter usage is set to 'BeamManagement', the wireless device may transmit, at a given time instant, one SRS resource of the one or more SRS resources in each SRS resource set (e.g., simultaneously). In an example, the wireless device may determine that the one SRS resource of the one or more SRS resources in each SRS resource set may have the same time domain behavior in a same BWP (e.g., uplink BWP). In an example, in response to the determining, the wireless device may transmit the one SRS resource of the one or more SRS resources in each SRS resource set in the same BWP simultaneously.

In an example, when the higher layer parameter usage is set to 'BeamManagement', the wireless device may transmit, at a given time instant, only one SRS resource in each of the one or more SRS resource sets (e.g., simultaneously). In an example, the wireless device may determine that the only one SRS resource in each of the one or more SRS resource sets may have the same time domain behavior in a same BWP (e.g., uplink BWP). In an example, in response to the determining, the wireless device may transmit the only one SRS resource in each of the one or more SRS resource sets in the same BWP simultaneously.

In an example, when the higher layer parameter usage is set to 'BeamManagement', the wireless device may transmit, at a given time instant, one SRS resource in each of one or more SRS resource sets simultaneously. In an example, the wireless device may determine that the one SRS resource in each of the one or more SRS resource sets may have the same time domain behavior in a same BWP (e.g., uplink BWP). In an example, in response to the determining, the wireless device may transmit the one SRS resource in each of the one or more SRS resource sets in the same BWP simultaneously.

In an example, the one or more SRS resource sets may comprise a first SRS resource set and a second SRS resource set. In an example, the first SRS resource set may comprise one or more first SRS resources. The one or more first SRS resources may comprise a first SRS resource and a second SRS resource. In an example, the second SRS resource set may comprise one or more second SRS resources. The one or more second SRS resources may comprise a third SRS resource and a fourth SRS resource.

In an example, a first time domain behavior of the first SRS resource and a third time domain behavior of the third SRS resource may be the same in a BWP. In an example, when the higher layer parameter usage is set to 'BeamManagement', the wireless device may transmit, in a given time instant in the BWP, the first SRS resource of the first SRS resource set and the third SRS resource of the second SRS resource set simultaneously, in response to the first time domain behavior of the first SRS resource and the third time domain behavior of the third SRS resource being the same.

In an example, a first time domain behavior of the first SRS resource and a fourth time domain behavior of the fourth SRS resource may be different in a BWP. In an example, when the higher layer parameter usage is set to 'BeamManagement', the wireless device may not transmit, in a given time instant in the BWP, the first SRS resource of the first SRS resource set and the fourth SRS resource of the second SRS resource set simultaneously in response to the first time domain behavior of the first SRS resource and the fourth time domain behavior of the fourth SRS resource being different.

In an example, a second time domain behavior of the second SRS resource and a fourth time domain behavior of the fourth SRS resource may be the same in a BWP. In an example, when the higher layer parameter usage is set to 'BeamManagement', the wireless device may transmit, in a given time instant in the BWP, the second SRS resource of the first SRS resource set and the fourth SRS resource of the second SRS resource set simultaneously in response to the second time domain behavior of the second SRS resource and the fourth time domain behavior of the fourth SRS resource being the same.

In an example, a second time domain behavior of the second SRS resource and a third time domain behavior of the third SRS resource may be different in a BWP. In an example, when the higher layer parameter usage is set to 'BeamManagement', the wireless device may not transmit, in a given time instant in the BWP, the second SRS resource of the first SRS resource set and the third SRS resource of the second SRS resource set simultaneously in response to the second time domain behavior of the second SRS resource and the third time domain behavior of the third SRS resource being different.

In an example, the higher layer parameter SRS-Resource may configure, semi-statically, at least one of: an srs resource index (e.g., provided by a higher layer parameter srs-ResourceId) indicating a configuration of an SRS resource; a time domain behavior of the configuration of the SRS resource (e.g., indicated by a higher layer parameter resourceType); an SRS sequence ID (e.g., provided by a higher layer parameter sequenceId; and a configuration of a spatial relation between a reference RS and a target SRS. In an example, the base station may configure the wireless device with a higher layer parameter spatialRelationInfo. In an example, the higher layer parameter spatialRelationInfo may comprise an index (ID) of the reference RS. In an example, the time domain behavior of an SRS resource may be a periodic transmission, a semi-persistent transmission, or an aperiodic SRS transmission. In an example, a time domain behavior of an SRS resource may comprise a transmission periodicity, a transmission offset of the SRS resource, etc.

In an example, the wireless device may determine that a higher layer parameter servingCellId indicating a serving cell may be present in the higher layer parameter spatialRelationInfo. In response to the determining, the wireless device may determine that the reference RS may be a first RS (e.g., SS/PBCH block, CSI-RS) configured on the serving cell.

In an example, the wireless device may determine that a higher layer parameter uplinkBWP indicating an uplink BWP and a higher layer parameter servingCellId indicating a serving cell may be present in the higher layer parameter spatialRelationInfo. In an example, in response to the determining, the wireless device may determine that the reference RS may be a first RS (e.g., SRS) configured on the uplink BWP of the serving cell.

In an example, the base station may configure the target SRS on a serving cell. In an example, the wireless device may determine that a higher layer parameter servingCellId may be absent in the higher layer parameter spatialRelationInfo. In response to the determining, the wireless device may determine that the reference RS may be a first RS (e.g., SS/PBCH block, CSI-RS) configured on the serving cell.

In an example, the base station may configure the target SRS on a serving cell. In an example, the wireless device may determine that a higher layer parameter servingCellId is absent and a higher layer parameter uplinkBWP indicating an uplink BWP is present in the higher layer parameter spatialRelationInfo. In response to the determining, the wireless device may determine that the reference RS may be a first RS (e.g., SRS) configured on the uplink BWP the serving cell.

In an example, a wireless device may transmit PUSCH and SRS in a same slot. In response to the transmitting the PUSCH and SRS in the same slot, the base station may configure the wireless device to transmit the SRS after the transmission of the PUSCH (and the corresponding DM-RS).

In an example, a base station may configure a wireless device with one or more SRS resource configurations. In an example, a higher layer parameter resourceType in a higher layer parameter SRS-Resource may be set to "periodic".

In an example, the base station may configure the wireless device with a higher layer parameter spatialRelationInfo. The higher layer parameter spatialRelationInfo may comprise an ID of a reference RS (e.g., ssb-Index, csi-RS-Index, srs).

In an example, the reference RS may be a SS/PBCH block. In an example, the reference RS may be a CSI-RS (e.g., periodic CSI-RS, semi-persistent CSI-RS, aperiodic CSI-RS). In an example, the wireless device may use a spatial domain reception (Rx) filter to receive the reference RS. In an example, in response to the higher layer parameter spatialRelationInfo indicating the reference RS (e.g., by the ID of the reference RS) being the SS/PBCH block or the CSI-RS, the wireless device may transmit a target SRS resource with a spatial domain transmission (Tx) filter same as the spatial domain reception (Rx) filter. In an example, in response to the higher layer parameter spatialRelationInfo indicating the reference RS (e.g., by the ID of the reference RS), the wireless device may transmit a target SRS resource with the spatial domain Rx filter.

In an example, the reference RS may be an SRS (e.g., periodic SRS, semi-persistent SRS, aperiodic SRS). In an example, the wireless device may use a spatial domain transmission (Tx) filter to transmit the reference RS. In an example, in response to the higher layer parameter spatialRelationInfo indicating the reference RS (e.g., by the ID of the reference RS) being the SRS, the wireless device may transmit a target SRS resource with the spatial domain transmission (Tx) filter.

In an example, the base station may activate and deactivate one or more configured SRS resource sets (e.g., semi-persistent SRS resource sets) of a serving cell by sending an SP SRS Activation/Deactivation MAC CE. In an example, the one or more configured SRS resource sets may be initially deactivated upon configuration. In an example, the one or more configured SRS resource sets may be deactivated after a handover.

In an example, a base station may configure a wireless device with one or more SRS resource sets (e.g., semi-persistent SRS resource sets). In an example, a higher layer parameter resourceType in a higher layer parameter SRS-Resource may be set to "semi-persistent". In an example, the wireless device may receive, from the base station, an activation command (e.g., SP SRS Activation/Deactivation MAC CE) for an SRS resource set of the one or more SRS resource sets. In an example, a PDSCH may carry the activation command. In an example, the wireless device may transmit an HARQ-ACK for the PDSCH in a slot n. In an example, in response to the transmitting the HARQ-ACK for the PDSCH in the slot n, the wireless device may apply one or more assumptions/actions for an SRS transmission of the SRS resource set starting from the slot $n+3N^{subframe,\mu_{slot}}+1$. In an example, the activation command may comprise one or more spatial relation assumptions for one or more SRS resources of the SRS resource set. In an example, a first field (e.g., Resource IDi) in the activation command may comprise an identifier of a resource (e.g., SS/PBCH block, NZP CSI-RS, SRS) used for spatial relationship derivation for an SRS resource of the one or more SRS resources. In an example, the one or more spatial relation assumptions may be provided by a list of references to one or more reference signal IDs (e.g., SSB-Index, SRS-ResourceId, etc.), one per SRS resource of the (activated) SRS resource set. In an example, a spatial relation assumption of the one or more spatial relation assumption may be provided by a reference to an ID of a reference RS. In an example, the reference RS may be SS/PBCH block, NZP CSI-RS resource, or SRS.

In an example, a Resource Serving Cell ID field indicating a serving cell may be present in the activation command. In an example, the reference RS may be an SS/PBCH block resource or a NZP CSI-RS resource. In response to the Resource Serving Cell ID field being present and the reference RS being the SS/PBCH block resource or the NZP CSI-RS resource, the reference RS (e.g., SS/PBCH block, NZP CSI-RS resource) may be configured on the serving cell.

In an example, the base station may configure the (activated) SRS resource set on a serving cell. In an example, a Resource Serving Cell ID field may be absent in the activation command. In response to the Resource Serving Cell ID field being absent and the base station configuring the SRS resource set on the serving cell, the reference RS (e.g., SS/PBCH block, NZP CSI-RS resource) may be configured on the serving cell.

In an example, a Resource Serving Cell ID field indicating a serving cell and a Resource BWP ID field indicating an uplink BWP may be present in the activation command. In response to the Resource Serving Cell ID field and the Resource BWP ID field being present, the reference RS (e.g., SRS resource) may be configured on the uplink BWP of the serving cell.

In an example, the base station may configure the SRS resource set on an uplink BWP of a serving cell. In an example, a Resource Serving Cell ID field and a Resource BWP ID field may be absent in the activation command. In response to the Resource Serving Cell ID field and the Resource BWP ID field being absent and the SRS resource set being configured on the uplink BWP of the serving cell, the reference RS (e.g., SRS resource) may be configured on the uplink BWP of the serving cell.

In an example, the base station may configure an SRS resource in the (activated) SRS resource set with a higher layer parameter spatialRelationInfo. In response to the SRS resource, in the (activated) SRS resource set, being configured with the higher layer parameter spatialRelationInfo, the wireless device may assume that a reference RS (e.g., indicated by an ID of the reference RS) in the activation command overrides a second reference RS configured in the higher layer parameter spatialRelationInfo.

In an example, the wireless device may receive, from the base station, a deactivation command (e.g., SP SRS Activation/Deactivation MAC CE) for an (activated) SRS resource set of the one or more SRS resource sets. In an example, a PDSCH may carry the deactivation command. In an example, the wireless device may transmit an HARQ-ACK for the PDSCH in a slot n. In an example, in response to the transmitting the HARQ-ACK for the PDSCH in the slot n, the wireless device may apply one or more assumptions/actions for a cessation of an SRS transmission of the (deactivated) SRS resource set starting from the slot $n+3N^{subframe,\mu}_{slot}+1$.

In an example, a wireless device may activate a semi-persistent SRS resource configuration on an uplink BWP of a serving cell in response to receiving, from a base station, an activation command for the semi-persistent SRS resource configuration. In an example, the wireless device may not receive, from the base station, a deactivation command for the semi-persistent SRS resource configuration.

In an example, the uplink BWP may be an active uplink BWP of the serving cell. In an example, in response to the uplink BWP being the active uplink BWP of the serving cell and not receiving the deactivation command for the semi-persistent SRS resource configuration, the wireless device may consider the semi-persistent SRS resource configuration active. In an example, in response to the considering, the wireless device may transmit an SRS transmission, via the uplink BWP of the serving cell, according to the semi-persistent SRS resource configuration.

In an example, the uplink BWP may not be an active uplink BWP of the serving cell. In an example, the uplink BWP not being the active uplink BWP may comprise the uplink BWP being deactivated in the serving cell. In response to not receiving the deactivation command for the semi-persistent SRS resource configuration and the uplink BWP being deactivated, the wireless device may assume that the semi-persistent SRS configuration is suspended in the UL BWP of the serving cell. In an example, the semi-persistent SRS configuration being suspended in the UL BWP may comprise that the wireless device may reactivate the semi-persistent SRS configuration when the UL BWP becomes an active UL BWP of the serving cell.

In an example, a first SRS resource of an SRS resource set may have a first time domain behavior (e.g., periodic, semi-persistent, or aperiodic, etc.). In an example, a second SRS resource of the SRS resource set may have a second time domain behavior (e.g., periodic, semi-persistent, or aperiodic, etc.). In an example, in response to the first SRS resource and the second SRS resource being in the (same) SRS resource set, the wireless device may expect that the first time domain behavior and the second time behavior are the same. In an example, in response to the first SRS resource and the second SRS resource being in the (same) SRS resource set, the wireless device may not expect that the first time domain behavior and the second time behavior are different.

In an example, an SRS resource of an SRS resource set may have a first time domain behavior (e.g., periodic, semi-persistent, or aperiodic, etc.). In an example, the SRS resource set may have a second time domain behavior (e.g., periodic, semi-persistent, or aperiodic, etc.). In an example, in response to the SRS resource being associated with the SRS resource set, the wireless device may expect that the first time domain behavior and the second time behavior are the same. In an example, in response to the SRS resource and the SRS resource set being associated, the wireless device may not expect that the first time domain behavior and the second time behavior are different. In an example, the SRS resource being associated with the SRS resource set may comprise that the SRS resource set comprises the SRS resource. In an example, the SRS resource being associated with the SRS resource set may comprise that the SRS resource is an element of the SRS resource set.

In an example, a base station may configure a wireless device with a PUCCH on at least one first symbol on a carrier (e.g., SUL, NUL). In an example, the PUCCH may carry/comprise one or more CSI reports. In an example, the PUCCH may carry/comprise one or more L1-RSRP reports. In an example, the PUCCH may carry/comprise HARQ-ACK and/or SR. In an example, the base station may configure the wireless device with an SRS configuration on the carrier. In an example, the SRS configuration may be a semi-persistent SRS configuration. In an example, the SRS configuration may be a periodic SRS configuration. In an example, the wireless device may determine that the PUCCH and an SRS transmission of the SRS configuration overlap in at least one symbol. In an example, the wireless device may determine that the at least one first symbol of the PUCCH and at least one second symbol of the SRS transmission of the SRS configuration may overlap in the at least one symbol. In an example, in response to the determining, the wireless device may not perform the SRS transmission, on the carrier, on the at least one symbol.

In an example, a base station may configure a wireless device with a PUCCH on at least one first symbol on a carrier (e.g., SUL, NUL). In an example, the PUCCH may carry/comprise HARQ-ACK and/or SR. In an example, the base station may trigger an SRS configuration on the carrier. In an example, the SRS configuration may be an aperiodic SRS configuration. In an example, the wireless device may determine that the PUCCH and an SRS transmission of the SRS configuration overlap in at least one symbol. In an example, the wireless device may determine that the at least one first symbol of the PUCCH and at least one second symbol of the SRS transmission of the SRS configuration may overlap in the at least one symbol. In an example, in response to the determining, the wireless device may not perform the SRS transmission, on the carrier, on the at least one symbol.

In an example, the not performing the SRS transmission may comprise dropping the SRS transmission on the at least one symbol. In an example, the wireless device may perform the SRS transmission on at least one third symbol of the at least one second symbol. The at least one third symbol may not overlap with the at least one symbol.

In an example, a base station may configure a wireless device with a PUCCH on at least one first symbol on a carrier (e.g., SUL, NUL). In an example, the PUCCH may carry/comprise one or more semi-persistent CSI reports. In an example, the PUCCH may carry/comprise one or more periodic CSI reports. In an example, the PUCCH may carry/comprise one or more semi-persistent L1-RSRP reports. In an example, the PUCCH may carry/comprise one or more periodic L1-RSRP reports. In an example, the base station may trigger an SRS configuration on the carrier. In an example, the SRS configuration may be an aperiodic SRS configuration. In an example, the wireless device may determine that the PUCCH and an SRS transmission of the SRS configuration overlap in at least one symbol. In an example, the wireless device may determine that the at least one first symbol of the PUCCH and at least one second symbol of the SRS transmission of the SRS configuration being the aperiodic SRS configuration may overlap in the at least one symbol. In an example, in response to the determining, the wireless device may not transmit the PUCCH, on the carrier, on the at least one symbol.

In an example, in an intra-band carrier aggregation (CA) or in an inter-band CA band-band combination, a wireless device may not transmit an SRS and a PUCCH/PUSCH simultaneously. In an example, in response to not transmitting the SRS and the PUCCH/PUSCH simultaneously, a base station may not configure the wireless device with an SRS transmission from a first carrier and a PUCCH/PUSCH (e.g., PUSCH/UL DM-RS/UL PT-RS/PUCCH formats) in a second carrier in the same symbol. In an example, the first carrier may be different from the second carrier.

In an example, in an intra-band carrier aggregation (CA) or in an inter-band CA band-band combination, a wireless device may not transmit an SRS and a PRACH simultaneously.

In an example, in response to not transmitting the SRS and the PRACH simultaneously, the wireless device may not transmit an SRS from a first carrier and a PRACH from a second carrier simultaneously. In an example, the first carrier may be different from the second carrier.

In an example, a base station may configure a wireless device with a periodic SRS transmission on at least one symbol (e.g., OFDM symbol). In an example, the base station may configure an SRS resource with a higher layer parameter resourceType set as 'aperiodic'. In an example, the base station may trigger the SRS resource on the at least one symbol. In an example, in response to the SRS resource with the higher layer parameter resourceType set as 'aperiodic' being triggered on the at least one symbol configured with the periodic SRS transmission, the wireless device may transmit the (aperiodic) SRS resource on the (overlapped) at least one symbol. In an example, in response to the SRS resource with the higher layer parameter resourceType set as 'aperiodic' being triggered on the at least one symbol configured with the periodic SRS transmission, the wireless device may not perform the periodic SRS transmission on the at least one symbol. In an example, the not performing the periodic SRS transmission may comprise that the wireless device may not transmit an SRS associated with the periodic SRS transmission on the (overlapped) at least one symbol.

In an example, a base station may configure a wireless device with a semi-persistent SRS transmission on at least one symbol (e.g., OFDM symbol). In an example, the base station may configure an SRS resource with a higher layer parameter resourceType set as 'aperiodic'. In an example, the base station may trigger the SRS resource on the at least one symbol. In an example, in response to the SRS resource with the higher layer parameter resourceType set as 'aperiodic' being triggered on the at least one symbol configured with the semi-persistent SRS transmission, the wireless device may transmit the (aperiodic) SRS resource on the (overlapped) at least one symbol. In an example, in response to the SRS resource with the higher layer parameter resourceType set as 'aperiodic' being triggered on the at least one symbol configured with the semi-persistent SRS transmission, the wireless device may not perform the semi-persistent SRS transmission on the at least one symbol. In an example, the not performing the semi-persistent SRS transmission may comprise that the wireless device may not transmit an SRS associated with the semi-persistent SRS transmission on the (overlapped) at least one symbol.

In an example, a base station may configure a wireless device with a periodic SRS transmission on at least one symbol (e.g., OFDM symbol). In an example, the base station may configure an SRS resource with a higher layer parameter resourceType set as 'semi-persistent'. In an example, the base station may trigger the SRS resource on the at least one symbol. In an example, in response to the SRS resource with the higher layer parameter resourceType set as ' semi-persistent' being triggered on the at least one symbol configured with the periodic SRS transmission, the wireless device may transmit the (semi-persistent) SRS resource on the (overlapped) at least one symbol. In an example, in response to the SRS resource with the higher layer parameter resourceType set as 'semi-persistent' being triggered on the at least one symbol configured with the periodic SRS transmission, the wireless device may not perform the periodic SRS transmission on the at least one symbol. In an example, the not performing the periodic SRS transmission may comprise that the wireless device may not transmit an SRS associated with the periodic SRS transmission on the (overlapped) at least one symbol.

In an example, a wireless device may be configured, by a base station, with one or more serving cells. In an example, the base station may activate one or more second serving cells of the one or more serving cells. In an example, the base station may configure each activated serving cell of the one or more second serving cells with a respective PDCCH monitoring. In an example, the wireless device may monitor a set of PDCCH candidates in one or more CORESETs on an active DL BWP of each activated serving cell configured with the respective PDCCH monitoring. In an example, the wireless device may monitor the set of PDCCH candidates in the one or more CORESETs according to corresponding search space sets. In an example, the monitoring may comprise decoding each PDCCH candidate of the set of PDCCH candidates according to monitored DCI formats.

In an example, a set of PDCCH candidates for a wireless device to monitor may be defined in terms of PDCCH search space sets. In an example, a search space set may be a common search space (CSS) set or a UE specific search space (USS) set.

In an example, one or more PDCCH monitoring occasions may be associated with a SS/PBCH block. In an example, the SS/PBCH block may be quasi-co-located with a CSI-RS. In an example, a TCI-state of an active BWP may comprise the CSI-RS. In an example, the active BWP may comprise a CORESET identified with index being equal to zero (e.g., CORESET zero, or CORESET #0, etc.). In an example, the wireless device may determine the TCI-state by the most recent of: an indication by a MAC-CE activation command or a random-access procedure that is not initiated by a PDCCH order that triggers a non-contention based random access procedure. In an example, for a DCI format with CRC scrambled by a C-RNTI, a wireless device may monitor corresponding PDCCH candidates at the one or more PDCCH monitoring occasions in response to the one or more PDCCH monitoring occasions being associated with the SS/PBCH block.

In an example, a base station may configure a wireless device with one or more DL BWPs in a serving cell. In an example, for a DL BWP of the one or more DL BWPs, the wireless device may be provided by a higher layer signaling with one or more (e.g., 2, 3) control resource sets (CORESETs). For a CORESET of the one or more CORESETs, the base station may provide the wireless device, by a higher layer parameter ControlResourceSet, at least one of: a CORESET index (e.g., provided by higher layer parameter controlResourceSetId), a DMRS scrambling sequence initialization value (e.g., provided by a higher layer parameter pdcch-DMRS-ScramblingID); a number of consecutive symbols (e.g., provided by a higher layer parameter duration), a set of resource blocks (e.g., provided by higher layer parameter frequencyDomainResources), CCE-to-REG mapping parameters (e.g., provided by higher layer parameter cce-REG-MappingType), an antenna port quasi co-location (e.g., from a set of antenna port quasi co-locations provided by a first higher layer parameter tci-StatesPDCCH-ToAddList and a second higher layer parameter tci-StatesPDCCH-ToReleaseList), and an indication for a presence or absence of a TCI (e.g., transmission configuration indication, etc.) field for a DCI format (e.g., DCI format 1_1) transmitted by a PDCCH in the CORESET (e.g., provided by higher layer parameter TCI-PresentInDCI). In an example, the antenna port quasi co-location may indicate a quasi co-location information of one or more DM-RS antenna ports for a PDCCH reception in the CORESET. In an example, the CORESET index may be unique among the one or more DL BWPs of the serving cell. In an example, when the higher layer parameter TCI-PresentInDCI is absent, the wireless device may consider that a TCI field is absent/disabled in the DCI format.

In an example, a first higher layer parameter tci-StatesPDCCH-ToAddList and a second higher layer parameter tci-StatesPDCCH-ToReleaseList may provide a subset of TCI-states defined in pdsch-Config. In an example, the wireless device may use the subset of the TCI-states to provide one or more QCL relationships between one or more RS in a TCI-state of the subset of the TCI-states and one or more DM-RS ports of a PDCCH reception in the CORESET.

In an example, a base station may configure a CORESET for a wireless device. In an example, a CORESET index (e.g., provided by higher layer parameter controlResourceSetId) of the CORESET may be non-zero. In an example, the base station may not provide the wireless device with a configuration of one or more TCI-states, by a first higher layer parameter tci-StatesPDCCH-ToAddList and/or a second higher layer parameter tci-StatesPDCCH-ToReleaseList, for the CORESET. In an example, in response to not being provided with the configuration of the one or more TCI-states for the CORESET, the wireless device may assume that one or more DMRS antenna ports for a PDCCH reception in the CORESET is quasi co-located with an RS (e.g., SS/PBCH block). In an example, the wireless device may identify the RS during an initial access procedure.

In an example, a base station may configure a CORESET for a wireless device. In an example, a CORESET index (e.g., provided by higher layer parameter controlResourceSetId) of the CORESET may be non-zero. In an example, the base station may provide the wireless device with an initial configuration of at least two TCI-states, by a first higher layer parameter tci-StatesPDCCH-ToAddList and/or a second higher layer parameter tci-StatesPDCCH-ToReleaseList, for the CORESET. In an example, the wireless device may receive the initial configuration of the at least two TCI-states from the base station. In an example, the wireless device may not receive a MAC-CE activation command for at least one of the at least two TCI-states for the CORESET. In an example, in response to being provided with the initial configuration for the CORESET and not receiving the MAC-CE activation command for the CORESET, the wireless device may assume that one or more DMRS antenna ports for a PDCCH reception in the CORESET is quasi co-located with an RS (e.g., SS/PBCH block). In an example, the wireless device may identify the RS during an initial access procedure.

In an example, a base station may configure a CORESET for a wireless device. In an example, a CORESET index (e.g., provided by higher layer parameter controlResourceSetId) of the CORESET may be equal to zero. In an example, the wireless device may not receive a MAC-CE activation command for a TCI-state for the CORESET. In response to not receiving the MAC-CE activation command, the wireless device may assume that one or more DMRS antenna ports for a PDCCH reception in the CORESET is quasi co-located with an RS (e.g., SS/PBCH block). In an example, the wireless device may identify the RS during an initial access procedure. In an example, the wireless device may identify the RS from a most recent random-access procedure. In an example, the wireless device may not initiate the most recent random-access procedure in response to receiving a PDCCH order triggering a non-contention based random-access procedure.

In an example, a base station may provide a wireless device with a single TCI-state for a CORESET. In an example, the base station may provide the single TCI-state by a first higher layer parameter tci-StatesPDCCH-ToAddList and/or a second higher layer parameter tci-StatesPDCCH-ToReleaseList. In response to being provided with the single TCI-state for the CORESET, the wireless device may assume that one or more DM-RS antenna ports for a PDCCH reception in the CORESET is quasi co-located with one or more DL RS s configured by the single TCI-state.

In an example, a base station may configure a CORESET for a wireless device. In an example, the base station may provide the wireless device with a configuration of at least two TCI-states, by a first higher layer parameter tci-StatesPDCCH-ToAddList and/or a second higher layer parameter tci-StatesPDCCH-ToReleaseList, for the CORESET. In an example, the wireless device may receive the configuration of the at least two TCI-states from the base station. In an example, the wireless device may receive a MAC-CE activation command for at least one of the at least two TCI-states for the CORESET. In response to the receiving the MAC-CE activation command for the at least one of the at least two TCI-states, the wireless device may assume that one or more DM-RS antenna ports for a PDCCH reception in the CORESET is quasi co-located with one or more DL RSs configured by the at least one of the at least two TCI-states.

In an example, a base station may configure a CORESET for a wireless device. In an example, a CORESET index (e.g., provided by higher layer parameter controlResourceSetId) of the CORESET may be equal to zero. In an example, the base station may provide the wireless device with a configuration of at least two TCI-states for the CORESET. In an example, the wireless device may receive the configuration of the at least two TCI-states from the base station. In an example, the wireless device may receive a MAC-CE activation command for at least one of the at least two TCI-states for the CORESET. In an example, in response to the CORESET index being equal to zero, the wireless device may expect that a QCL type (e.g., QCL-TypeD) of a first RS (e.g., CSI-RS) in the at least one of the at least two TCI-states are provided by a second RS (e.g., SS/PBCH block). In an example, in response to the CORESET index being equal to zero, the wireless device may expect that a QCL type (e.g., QCL-TypeD) of a first RS (e.g., CSI-RS) in the at least one of the at least two TCI states is spatial QCL-ed with a second RS (e.g., SS/PBCH block).

In an example, a wireless device may receive a MAC-CE activation command for at least one of at least two TCI-states for a CORESET. In an example, a PDSCH may provide the MAC-CE activation command. In an example, the wireless device may transmit a HARQ-ACK information for the PDSCH in a slot. In an example, when the wireless device receives the MAC-CE activation command for the at least one of the at least two TCI-states for the CORESET, in response to the transmitting HARQ-ACK information in the slot, the wireless device may apply the MAC-CE activation command X msec (e.g., 3 msec, 5 msec) after the slot. In an example, when the wireless device applies the MAC-CE activation command in a second slot, a first BWP may be active in the second slot. In response to the first BWP being active in the second slot, the first BWP may be an active BWP.

In an example, a base station may configure a wireless device with one or more DL BWPs in a serving cell. In an example, for a DL BWP of the one or more DL BWPs, the wireless device may be provided by higher layers with one or more (e.g., 3, 5, 10) search space sets. In an example, for a search space set of the one or more search space sets, the wireless device may be provided, by a higher layer parameter SearchSpace, at least one of: a search space set index (e.g., provided by higher layer parameter searchSpaceId), an association between the search space set and a CORESET (e.g., provided by a higher layer parameter controlResourceSetId); a PDCCH monitoring periodicity of a first number of slots and a PDCCH monitoring offset of a second number of slots (e.g., provided by a higher layer parameter monitoringSlotPeriodicityAndOffset); a PDCCH monitoring pattern within a slot, indicating first symbol(s) of the CORESET within the slot for PDCCH monitoring, (e.g., provided by a higher layer parameter monitoringSymbolsWithinSlot); a duration of a third number of slots (e.g., provided by a higher layer parameter duration); a number of PDCCH candidates; an indication that the search space set is either a common search space set or a UE-specific search space set (e.g., provided by a higher layer parameter searchSpaceType). In an example, the duration may indicate a number of slots that the search space set may exist.

In an example, a wireless device may not expect two PDCCH monitoring occasions on an active DL BWP, for a same search space set or for different search space sets, in a same CORESET to be separated by a non-zero number of symbols that is smaller than the CORESET duration.

In an example, the wireless device may determine a PDCCH monitoring occasion on an active DL BWP based on the PDCCH monitoring periodicity, the PDCCH monitoring offset, and the PDCCH monitoring pattern within a slot. In an example, for the search space set, the wireless device may determine that a PDCCH monitoring occasion exists in a slot. In an example, the wireless device may monitor at least one PDCCH for the search space set for the duration of third number of slots (consecutive) starting from the slot.

In an example, a wireless device may monitor one or more PDCCH candidates in a UE-specific search space (USS) set on an active DL BWP of a serving cell. In an example, a base station may not configure the wireless device with a carrier indicator field. In response to not being configured with the carrier indicator field, the wireless device may monitor the one or more PDCCH candidates without the carrier indicator field.

In an example, a wireless device may monitor one or more PDCCH candidates in a USS set on an active DL BWP of a serving cell. In an example, a base station may configure the wireless device with a carrier indicator field. In response to being configured with the carrier indicator field, the wireless device may monitor the one or more PDCCH candidates with the carrier indicator field.

In an example, a base station may configure a wireless device to monitor one or more PDCCH candidates with a carrier indicator field in a first cell. In an example, the carrier indicator field may indicate a second cell. In an example, the carrier indicator field may correspond to a second cell. In response to monitoring the one or more PDCCH candidates, in the first cell, with the carrier indicator field indicating the second cell, the wireless device may not expect to monitor the one or more PDCCH candidates on an active DL BWP of the second cell.

In an example, a wireless device may monitor one or more PDCCH candidates on an active DL BWP of a serving cell. In response to the monitoring the one or more PDCCH candidates on the active DL BWP of the serving cell, the wireless device may monitor the one or more PDCCH candidates for the serving cell.

In an example, a wireless device may monitor one or more PDCCH candidates on an active DL BWP of a serving cell. In response to the monitoring the one or more PDCCH candidates on the active DL BWP of the serving cell, the wireless device may monitor the one or more PDCCH candidates at least for the serving cell. In an example, the wireless device may monitor the one or more PDCCH candidates for the serving cell and at least a second serving cell.

In an example, a base station may configure a wireless device with one or more cells. In an example, when a number of the one or more cells is one, the base station may configure the wireless device for a single-cell operation. In an example, when a number of the one or more cells is more than one, the base station may configure the wireless device for an operation with a carrier aggregation in a same frequency band (e.g., intra-band).

In an example, the wireless device may monitor one or more PDCCH candidates in overlapping PDCCH monitoring occasions in a plurality of CORESETs on active DL BWP(s) of the one or more cells. In an example, the plurality of the CORESETs may have a different QCL-TypeD property.

In an example, a first PDCCH monitoring occasion in a first CORESET, of the plurality of CORESETs, of a first cell of the one or more cells may overlap with a second PDCCH monitoring occasion in a second CORESET, of the plurality of CORESETs, of the first cell. In an example, the wireless device may monitor at least one first PDCCH candidate in the first PDCCH monitoring occasion on an active DL BWP, of the active DL BWP(s), of the first cell. In an example, the wireless device may monitor at least one second PDCCH candidate in the second PDCCH monitoring occasion on the active DL BWP, of the active DL BWP(s), of the first cell.

In an example, a first PDCCH monitoring occasion in a first CORESET, of the plurality of CORESETs, of a first cell of the one or more cells may overlap with a second PDCCH monitoring occasion in a second CORESET, of the plurality of CORESETs, of a second cell of the one or more cells. In an example, the wireless device may monitor at least one first PDCCH candidate in the first PDCCH monitoring occasion on a first active DL BWP, of the active DL BWP(s), of the first cell. In an example, the wireless device may monitor at least one second PDCCH candidate in the second PDCCH monitoring occasion on a second active DL BWP, of the active DL BWP(s), of the second cell.

In an example, a first QCL type property (e.g., QCL-TypeD) of the first CORESET may be different from a second QCL type property (e.g., QCL-TypeD) of the second CORESET.

In an example, in response to the monitoring the one or more PDCCH candidates in the overlapping PDCCH monitoring occasions in the plurality of CORESETs and the plurality of the CORESETs having the different QCL-TypeD property, for a CORESET determination rule, the wireless device may determine a selected CORESET, of the plurality of the CORESETs, of a cell of the one or more cells. In an example, in response to the determining, the wireless device may monitor at least one PDCCH candidate, in the overlapping PDCCH monitoring occasions, in the selected CORESET on an active DL BWP of the cell. In an example, the selected CORESET may be associated with a search space set (e.g., association provided by a higher layer parameter controlResourceSetId).

In an example, one or more CORESETs of the plurality of CORESETs may be associated with a common search space (CSS) set. In an example, the one or more CORESETs of the plurality of CORESETs being associated with the CSS set may comprise that at least one search space set of a CORESET (e.g., association between the at least one search space set and the CORESET provided by a higher layer parameter controlResourceSetId) of the one or more CORESETs has at least one PDCCH candidate in the overlapping PDCCH monitoring occasions and/or in a CSS set.

In an example, the first CORESET may be associated with a first CSS set. In an example, the first CORESET may be associated with a first USS set. In an example, the second CORESET may be associated with a second CSS set. In an example, the second CORESET may be associated with a second USS set. In an example, a CORESET (e.g., the first CORESET, the second CORESET) being associated with a CSS set (e.g., first CSS set, second CSS set) may comprise that at least one search space of the CORESET is the CSS set.

In an example, a CORESET (e.g., the first CORESET, the second CORESET) being associated with an USS set (e.g., first USS set, second USS set) may comprise that at least one search space of the CORESET is the USS set.

In an example, when the first CORESET is associated with the first CSS set and the second CORESET is associated with the second CSS set, the one or more CORESETs may comprise the first CORESET and the second CORESET.

In an example, when the one or more CORESETs comprises the first CORESET and the second CORESET, the one or more selected cells may comprise the first cell and the second cell in response to the first CORESET being configured in the first cell and the second CORESET being configured in the second cell.

In an example, when the one or more CORESETs comprises the first CORESET and the second CORESET, the one or more selected cells may comprise the first cell in response to the first CORESET being configured in the first cell and the second CORESET being configured in the first cell. In an example, the at least one CORESET may comprise the first CORESET and the second CORESET. In an example, a first search space set of the first CORESET of the at least one CORESET may be identified by a first search space set specific index (e.g., provided by a higher layer parameter searchSpaceId). In an example, the wireless device may monitor the at least one first PDCCH candidate in the first PDCCH monitoring occasion in the first CORESET associated with the first search space set (e.g., association provided by a higher layer parameter controlResourceSetId). In an example, a second search space set of the second coreset of the at least one CORESET may be identified by a second search space set specific index (e.g., provided by a higher layer parameter searchSpaceId). In an example, the wireless device may monitor the at least one second PDCCH candidate in the second PDCCH monitoring occasion in the second CORESET associated with the second search space set (e.g., association provided by a higher layer parameter controlResourceSetId). In an example, the first search space set specific index may be lower than the second search space set specific index. In response to the first search space set specific index being lower than the second search space set specific index, for a CORESET determination rule, the wireless device may select the first search space set. In an example, in response to the selecting, for the coreset determination rule, the wireless device may monitor the at least one first PDCCH candidate in the first PDCCH monitoring occasion in the first CORESET on the active DL BWP of the first cell. In an example, in response to the selecting, for the coreset determination rule, the wireless device may stop monitoring the at least one second PDCCH candidate in the second PDCCH monitoring occasion in the second CORESET on the active DL BWP of the first cell. In an example, in response to the selecting, the wireless device may drop monitoring the at least one second PDCCH candidate in the second PDCCH monitoring occasion in the second CORESET on the active DL BWP of the first cell.

In an example, the first cell may be identified by a first cell-specific index. In an example, the second cell may be identified by a second cell-specific index. In an example, the first cell-specific index may be lower than the second cell-specific index. In an example, when the one or more selected cells comprises the first cell and the second cell, the wireless device may select the first cell in response to the first cell-specific index being lower than the second cell-specific index.

In an example, when the first CORESET is associated with the first CSS set and the second CORESET is associated with the second USS set, the one or more CORESETs may comprise the first CORESET. In an example, when the one or more CORESETs comprises the first CORESET, the one or more selected cells may comprise the first cell in response to the first CORESET being configured in the first cell.

In an example, when the first CORESET is associated with the first USS set and the second CORESET is associated with the second CSS set, the one or more CORESETs may comprise the second CORESET. In an example, when the one or more CORESETs comprises the second CORE- SET, the one or more selected cells may comprise the first cell in response to the second CORESET being configured in the first cell. In an example, when the one or more CORESETs comprises the second CORESET, the one or more selected cells may comprise the second cell in response to the second CORESET being configured in the second cell.

In an example, the wireless device may determine that the one or more CORESETs are associated with one or more selected cells of the one or more cells. In an example, the base station may configure a first CORESET of the one or more CORESETs in a first cell of the one or more selected cells. In an example, the base station may configure a second CORESET of the one or more CORESETs in the first cell. In an example, the base station may configure a third CORESET of the one or more CORESETs in a second cell of the one or more selected cells. In an example, the first cell and the second cell may be different. In an example, the wireless device may receive, from the base station, one or more configuration parameters. The one or more configuration parameters may indicate cell-specific indices (e.g., provided by a higher layer parameter servCellIndex) for the one or more cells. In an example, each cell of the one or more cells may be identified by a respective one cell-specific index of the cell-specific indices. In an example, a cell-specific index of a cell of the one or more selected cells may be lowest among the cell-specific indices of the one or more selected cells.

In an example, when the wireless device determines that the one or more CORESETs are associated with the one or more selected cells of the one or more cells, for the CORESET determination rule, the wireless device may select the cell in response to the cell-specific index of the cell being lowest among the cell-specific indices of the one or more selected cells.

In an example, the base station may configure at least one CORESET of the one or more CORESETs in the (selected) cell. In an example, at least one search space set of the at least one CORESET may have at least one PDCCH candidate in the overlapping PDCCH monitoring occasions and/ or may be a CSS set.

In an example, the one or more configuration parameters may indicate search space set specific indices (e.g., provided by a higher layer parameter searchSpaceId) for the at least one search space set of the cell. In an example, each search space set of the at least one search space set may be identified by a respective one search space set specific index of the search space set specific indices. In an example, the wireless device may determine that a search space specific index of a search space set of the at least one search space set may be the lowest among the search space set specific indices of the at least one search space set. In response to the determining that the search space specific index of the search space set specific index being the lowest among the search space set specific indices of the at least one search space set, for the CORESET determination rule, the wireless device may select the search space set. In an example, the search space set may be associated with a selected CORESET of the at least one CORESET (e.g., association provided by a higher layer parameter controlResourceSetId).

In an example, when the wireless device monitors the one or more PDCCH candidates in the overlapping PDCCH monitoring occasions in the plurality of CORESETs and the plurality of the CORESETs have the different QCL-TypeD property, the wireless device may monitor at least one PDCCH in the selected CORESET of the plurality of the CORESETs on an active DL BWP of the cell of the one or more cells in response to the selecting the cell and/or the selecting the search space set associated with the selected CORESET. In an example, the wireless device may select the selected CORESET associated with the search space set and the cell for the CORESET determination rule.

In an example, the selected CORESET may have a first QCL-TypeD property. In an example, a second CORESET of the plurality of the CORESETs may have a second QCL-TypeD property. In an example, the selected CORESET and the second CORESET may be different.

In an example, the first QCL-TypeD property and the second QCL-TypeD property may be the same. In an example, the wireless device may monitor at least one second PDCCH candidate (in the overlapping PDCCH monitoring occasions) in the second CORESET of the plurality of the CORESETs in response to the first QCL-TypeD property of the selected CORESET and the second QCL-TypeD property of the second CORESET being the same.

In an example, the first QCL-TypeD property and the second QCL-TypeD property may be different. In an example, the wireless device may stop monitoring at least one second PDCCH candidate (in the overlapping PDCCH monitoring occasions) in the second CORESET of the plurality of the CORESETs in response to the first QCL-TypeD property of the selected CORESET and the second QCL-TypeD property of the second CORESET being different. In an example, the wireless device may drop monitoring at least one second PDCCH candidate (in the overlapping PDCCH monitoring occasions) in the second CORESET of the plurality of the CORESETs in response to the first QCL-TypeD property of the selected CORESET and the second QCL-TypeD property of the second CORESET being different.

In an example, for the CORESET determination rule, a wireless device may consider that a first QCL type (e.g., QCL TypeD) property of a first RS (e.g., SS/PBCH block) is different from a second QCL type (e.g., QCL TypeD) property of a second RS (CSI-RS).

In an example, for the CORESET determination rule, a first RS (e.g., CSI-RS) may be associated (e.g., QCL-ed) with an RS (e.g., SS/PBCH block) in a first cell. In an example, a second RS (e.g., CSI-RS) may be associated (e.g., QCL-ed) with the RS in a second cell. In response to the first RS and the second RS being associated with the RS, the wireless device may consider that a first QCL type (e.g., QCL TypeD) property of the first RS and a second QCL type (e.g., QCL TypeD) property of the second RS are the same.

In an example, the wireless device may determine a number of active TCI-states from the plurality of CORESETs.

In an example, a wireless device may monitor multiple search space sets associated with different CORESETs for one or more cells (e.g., for a single cell operation or for an operation with carrier aggregation in a same frequency band). In an example, at least two monitoring occasions of at least two search space sets of the multiple search space sets may overlap in time (e.g., at least one symbol, at least one slot, subframe, etc.). In an example, the at least two search space sets may be associated with at least two first CORESETs. The at least two first CORESETs may have different QCL-TypeD properties. In an example, for the CORESET determination rule, the wireless device may monitor at least one search space set associated with a selected CORESET in an active DL BWP of a cell. In an example, the at least one search space set may be a CSS set. In an example, a cell-specific index of the cell may be lowest among cell-specific indices of the one or more cells comprising the cell. In an example, at least two second CORESETs of the cell may comprise a CSS set. In response to the at least two second CORESETs of the cell comprising the CSS set, the wireless device may select a selected CORESET of the at least two second CORESETs in response to a search space specific index of a search space set associated with the selected CORESET being the lowest among search space specific indices of search space sets associated with the at least two second CORESETs. In an example, the wireless device may monitor the search space set in the at least two monitoring occasions.

In an example, the wireless device may determine that the at least two first CORESETs may not be associated with a CSS set. In an example, the wireless device may determine that each CORESET of the at least two first CORESETs may not be associated with a CSS set. In an example, for the CORESET determination rule, in response to the determining, the wireless device may monitor at least one search space set associated with a selected CORESET in an active DL BWP of a cell. In an example, the at least one search space set may be a USS set. In an example, a cell-specific index of the cell may be lowest among cell-specific indices of the one or more cells comprising the cell. In an example, at least two second CORESETs of the cell may comprise a USS set. In response to the at least two second CORESETs of the cell comprising the USS set, the wireless device may select a selected CORESET of the at least two second CORESETs in response to a search space specific index of a search space set associated with the selected CORESET being the lowest among search space specific indices of search space sets associated with the at least two second CORESETs. In an example, the wireless device monitors the search space set in the at least two monitoring occasions.

In an example, a base station may indicate, to a wireless device, a TCI-state for a PDCCH reception for a CORESET of a serving cell by sending a TCI-state indication for UE-specific PDCCH MAC-CE. In an example, when a MAC entity of the wireless device receives a TCI-state indication for UE-specific PDCCH MAC-CE on/for a serving cell, the MAC entity may indicate to lower layers (e.g., PHY) the information regarding the TCI-state indication for the UE-specific PDCCH MAC-CE.

In an example, a TCI-state indication for UE-specific PDCCH MAC-CE may be identified by a MAC PDU subheader with LCID. The TCI-state indication for UE-specific PDCCH MAC-CE may have a fixed size of 16 bits comprising one or more fields. In an example, the one or more fields may comprise a serving cell ID, CORESET ID, TCI-state ID and a reserved bit.

In an example, the serving cell ID may indicate the identity of the serving cell for which the TCI-state indication for the UE-specific PDCCH MAC-CE applies. The length of the serving cell ID may be n bits (e.g., n=5 bits).

In an example, the CORESET ID may indicate a control resource set. The control resource set may be identified with a control resource set ID (e.g., ControlResourceSetId). The TCI-state is being indicated to the control resource set ID for which. The length of the CORESET ID may be n3 bits (e.g., n3=4 bits).

In an example, the TCI-state ID may indicate a TCI-state identified by TCI-StateId. The TCI-state may be applicable to the control resource set identified by the CORESET ID. The length of the TCI-state ID may be n4 bits (e.g., n4=6 bits).

An information element ControlResourceSet may be used to configure a time/frequency control resource set (CORESET) in which to search for downlink control information.

An information element TCI-State may associate one or two DL reference signals with a corresponding quasi-colocation (QCL) type. The information element TCI-State may comprise one or more fields including TCI-StateId and QCL-Info. The QCL-Info may comprise one or more second fields. The one or more second fields may comprise serving cell index, BWP ID, a reference signal index (e.g., SSB-index, NZP-CSI-RS-ResourceID), and a QCL Type (e.g., QCL-typeA, QCL-typeB, QCL-typeC, QCL-typeD). In an example, the TCI-StateID may identify a configuration of a TCI-state.

In an example, the serving cell index may indicate a serving cell in which a reference signal indicated by the reference signal index is located in. When the serving cell index is absent in an information element TCI-State, the information element TCI-State may apply to a serving cell in which the information element TCI-State is configured. The reference signal may be located on a second serving cell other than the serving cell in which the information element TCI-State is configured only if the QCL-Type is configured as first type (e.g., TypeD, TypeA, TypeB). In an example, the BWP ID may indicate a downlink BWP of the serving cell in which the reference signal is located in.

An information element SearchSpace may define how/where to search for PDCCH candidates in a search space. The search space may be identified by a searchSpaceId field in the information element SearchSpace. Each search space may be associated with a control resource set (e.g., ControlResourceSet). The control resource set may be identified by a controlResourceSetId field in the information element SearchSpace. The controlResourceSetId field may indicate the control resource set (CORESET) applicable for the SearchSpace.

In an example, a base station may use an information element (IE) CSI-AperiodicTriggerStateList to configure a wireless device with one or more aperiodic trigger states (e.g., 1, 64, 128 aperiodic trigger states). A codepoint of a CSI request field in a DCI may be associated with (or indicate) an aperiodic trigger state of the one or more aperiodic trigger states. In an example, the aperiodic trigger state may comprise one or more report configurations (e.g., 1, 8, 16 report configurations, provided by a higher layer parameter associatedReportConfigInfoList). Based on receiving the DCI with the CSI request field indicating the aperiodic trigger state, the wireless device may perform measurement of CSI-RS and aperiodic reporting according to the one or more report configurations (e.g., in the associatedReportConfigInfoList) for the aperiodic trigger state.

In an example, a report configuration (e.g., provided by a higher layer parameter CSI-AssociatedReportConfigInfo) of the one or more report configurations may be identified/associated with a report configuration index (e.g., provided by a higher layer parameter CSI-ReportConfigId). In an example, the report configuration may comprise one or more CSI-RS resources (e.g., 1, 8, 16 CSI-RS resources). In an example, an aperiodic CSI-RS resource of the one or more CSI-RS resources may be associated with a TCI state (provided by a higher layer parameter qcl-info in IE CSI-AperiodicTriggerStateList) of one or more TCI-State configurations. The TCI state may provide a QCL assumption (e.g., an RS, an RS source, SS/PBCH block, CSI-RS). The TCI state may provide a QCL type (e.g., QCL-TypeA, QCL-TypeD, etc.).

In an example, the wireless device may receive a DCI with a CSI request field from a base station. The wireless device may receive the DCI in a PDCCH. The wireless device may receive the DCI when monitoring the PDCCH. In an example, the DCI with the CSI request field may initiate/indicate/trigger an aperiodic trigger state of the one or more aperiodic trigger states. In an example, a codepoint of the CSI request field in the DCI may indicate the aperiodic trigger state. In an example, the aperiodic trigger state may comprise one or more report configurations (e.g., a list of NZP-CSI-RS-ResourceSet). In an example, a report configuration (e.g., NZP-CSI-RS-ResourceSet) of the one or more report configurations may comprise one or more CSI-RS resources (e.g., aperiodic CSI-RS resources, NZP-CSI-RS-Resources).

In an example, the base station may not configure the report configuration with a higher layer parameter trs-Info. In an example, configuring the report configuration without the higher layer parameter trs-Info may comprise that a first antenna port for a first aperiodic CSI-RS resource of the one or more CSI-RS resources is different from a second antenna port for a second aperiodic CSI-RS resource of the one or more CSI resources. In an example, configuring the report configuration without the higher layer parameter trs-Info may comprise that an antenna port for each aperiodic CSI-RS resource of the one or more CSI-RS resources is different. In an example, the base station may not configure the report configuration with a higher layer parameter repetition. In an example, a scheduling offset between a last symbol of the PDCCH carrying the DCI and a first symbol of the one or more CSI-RS resources in the report configuration may be smaller than a second threshold (e.g., beamSwitchTiming). In an example, the wireless device may report the second threshold. In an example, the second threshold may be a first value (e.g., 14, 28, 48 symbols). In an example, an aperiodic CSI-RS resource of the one or more CSI-RS resources may be associated with a first TCI state of the one or more TCI-State configurations. In an example, the first TCI state may indicate at least one first RS. In an example, the first TCI state may indicate at least one first QCL type. In an example, the aperiodic CSI-RS resource being associated with the first TCI state may comprise that the wireless device receives an aperiodic CSI-RS of the aperiodic CSI-RS resource with the at least one first RS (indicated by the first TCI state) with respect to the at least one first QCL type indicated by the first TCI state.

In an example, the base station may transmit a downlink signal with a second TCI state. In an example, the second TCI state may indicate at least one second RS. In an example, the second TCI state may indicate at least one second QCL type. The wireless device may receive the downlink signal in one or more first symbols. The wireless device may receive an aperiodic CSI-RS for the aperiodic CSI-RS resource in one or more second symbols. In an example, the one or more first symbols and the one or more second symbols may overlap (e.g., fully or partially). In an example, the downlink signal and the aperiodic CSI-RS (or the aperiodic CSI-RS resource) may overlap based on the one or more first symbols and the one or more second symbols overlapping.

In an example, the downlink signal and the aperiodic CSI-RS (or the aperiodic CSI-RS resource) may overlap in a time duration. In an example, the time duration may be at least one symbol. In an example, the time duration may be at least one slot. In an example, the time duration may be at least one subframe. In an example, the time duration may be at least one mini-slot. In an example, the time duration may be the one or more second symbols. In an example, the time duration may be the one or more first symbols.

In an example, the downlink signal may be a PDSCH scheduled with an offset larger than or equal to a first threshold (e.g., Threshold-Sched-Offset, timeDuration-ForQCL). In an example, the downlink signal may be a second aperiodic CSI-RS scheduled with an offset larger than or equal a second threshold (e.g., beamSwitchTiming) when the second threshold is a first value (e.g., 14, 28, 48 symbols). In an example, the downlink signal may be an RS (e.g., periodic CSI-RS, semi-persistent CSI-RS, SS/PBCH block etc.).

In an example, when the scheduling offset between the last symbol of the PDCCH and the first symbol is smaller than the second threshold, based on the downlink signal with the second TCI state and the aperiodic CSI-RS (or the aperiodic CSI-RS resource) overlapping, the wireless device may apply a QCL assumption provided/indicated by the second TCI state when receiving the aperiodic CSI-RS. In an example, the applying the QCL assumption (provided/indicated by the second TCI state) when receiving the aperiodic CSI may comprise that the wireless device receives the aperiodic CSI-RS with the at least one second RS (indicated by the second TCI state) with respect to the at least one second QCL type indicated by the second TCI state.

In an example, a scheduling offset between a last symbol of the PDCCH carrying the DCI and a first symbol of the one or more CSI-RS resources in the report configuration may be equal to or larger than a second threshold (e.g., beamSwitchTiming). In an example, the wireless device may report the second threshold. In an example, the second threshold may be a first value (e.g., 14, 28, 48 symbols). Based on the scheduling offset being equal to or larger than the second threshold, the wireless device may apply a QCL assumption (provided by the first TCI state) for the aperiodic CSI-RS resource of the one or more CSI-RS resources in the report configuration. In an example, the applying the QCL assumption (provided by the first TCI state) for the aperiodic CSI-RS resource may comprise that the wireless device receives the aperiodic CSI-RS of the aperiodic CSI-RS resource with the at least one first RS (indicated by the first TCI state) with respect to the at least one first QCL type indicated by the first TCI state.

In an example, two transmission schemes for uplink may be supported for physical uplink shared channel (PUSCH): codebook based transmission and non-codebook based transmission. A wireless device may be configured with codebook based transmission when the higher layer parameter txConfig in pusch-Config is set to 'codebook'. The wireless device may be configured with non-codebook based transmission when the higher layer parameter txConfig is set to 'nonCodebook'. When the higher layer parameter txConfig is not configured, the wireless device may not expect to be scheduled by DCI format 0_1 or 0_2. When PUSCH is scheduled by DCI format 0_0, the PUSCH transmission may be based on a single antenna port. Except when the higher layer parameter enableDefaultBeamP1ForPUSCH0-0 is set 'enabled', the wireless device may not expect PUSCH scheduled by DCI format 0_0 in a BWP without configured PUCCH resource with PUCCH-SpatialRelationInfo in frequency range 2 in RRC connected mode.

For codebook based transmission, in an example, PUSCH may be scheduled by DCI format 0_0, DCI format 0_1, DCI format 0_2 or semi-statically configured. When this PUSCH is scheduled by DCI format 0_1, DCI format 0_2, or semi-statically configured, the wireless device may determine its PUSCH transmission precoder based on a SRS resource indicator (SRI), a transmit precoding matrix indicator (TPMI) and a transmission rank, where the SRI, the TPMI and the transmission rank may be given by DCI fields of 'SRS resource indicator' and Precoding information and number of layers' for DCI format 0_1 and 0_2 or given by srs-ResourceIndicator and precodingAndNumberOfLayers. In an example, the SRS-ResourceSet(s) applicable for PUSCH scheduled by DCI format 0_1 and DCI format 0_2 may be defined by the entries of the higher layer parameter srs-ResourceSetToAddModList and srs-ResourceSetToAddModList-ForDCIFormat0_2 in SRS-Config, respectively. The TPMI may be used to indicate the precoder to be applied over the layers {0 . . . v-1} and that corresponds to an SRS resource selected by the SRI when multiple SRS resources are configured, or when a single SRS resource is configured TPMI is used to indicate the precoder to be applied over the layers {0 . . . v-1} and that corresponds to the SRS resource. The transmission precoder may be selected from the uplink codebook that has a number of antenna ports equal to higher layer parameter nrofSRS-Ports in SRS-Config. When the wireless device is configured with the higher layer parameter txConfig set to 'codebook', the wireless device may be configured with at least one SRS resource. In an example, the indicated SRI in slot n may be associated with the most recent transmission of an SRS resource identified by the SRI, where the SRS resource is prior to the PDCCH carrying the SRI.

For non-codebook based transmission, in an example, PUSCH may be scheduled by DCI format 0_0, DCI format 0_1, DCI format 0_2 or semi-statically configured. When this PUSCH is scheduled by DCI format 0_1, DCI format 0_2, or semi-statically configured, the wireless device may determine its PUSCH precoder and transmission rank based on an SRI when multiple SRS resources are configured, where the SRI is given by a DCI field of 'SRS resource indicator' in DCI for DCI format 0_1 and DCI format 0_2, or the SRI is given by srs-ResourceIndicator. In an example, the SRS-ResourceSet(s) applicable for PUSCH scheduled by DCI format 0_1 and DCI format 0_2 may be defined by the entries of the higher layer parameter srs-ResourceSetToAddModList and srs-ResourceSetToAddModList-ForDCIFormat0_2 in SRS-Config, respectively. The wireless device may use one or multiple SRS resources for SRS transmission, where, in a SRS resource set, the maximum number of SRS resources which may be configured to the wireless device for simultaneous transmission in the same symbol and the maximum number of SRS resources may the wireless device's capabilities. In an example, the SRS resources transmitted simultaneously may occupy the same RBs. In an example, at least one SRS port for an SRS resource may be configured. In an example, one SRS resource set may be configured with higher layer parameter usage in SRS-ResourceSet set to 'nonCodebook'. The indicated SRI in slot n may be associated with the most recent transmission of SRS resource(s) identified by the SRI, where the SRS transmission is prior to the PDCCH carrying the SRI. The wireless device may perform one-to-one mapping from the indicated SRI(s) to the indicated demodulation RS (DMRS) ports(s) and their corresponding PUSCH layers {0 . . . v-1} given by DCI format 0_1 or by configuredGrant-Config in increasing order.

Figure 20:
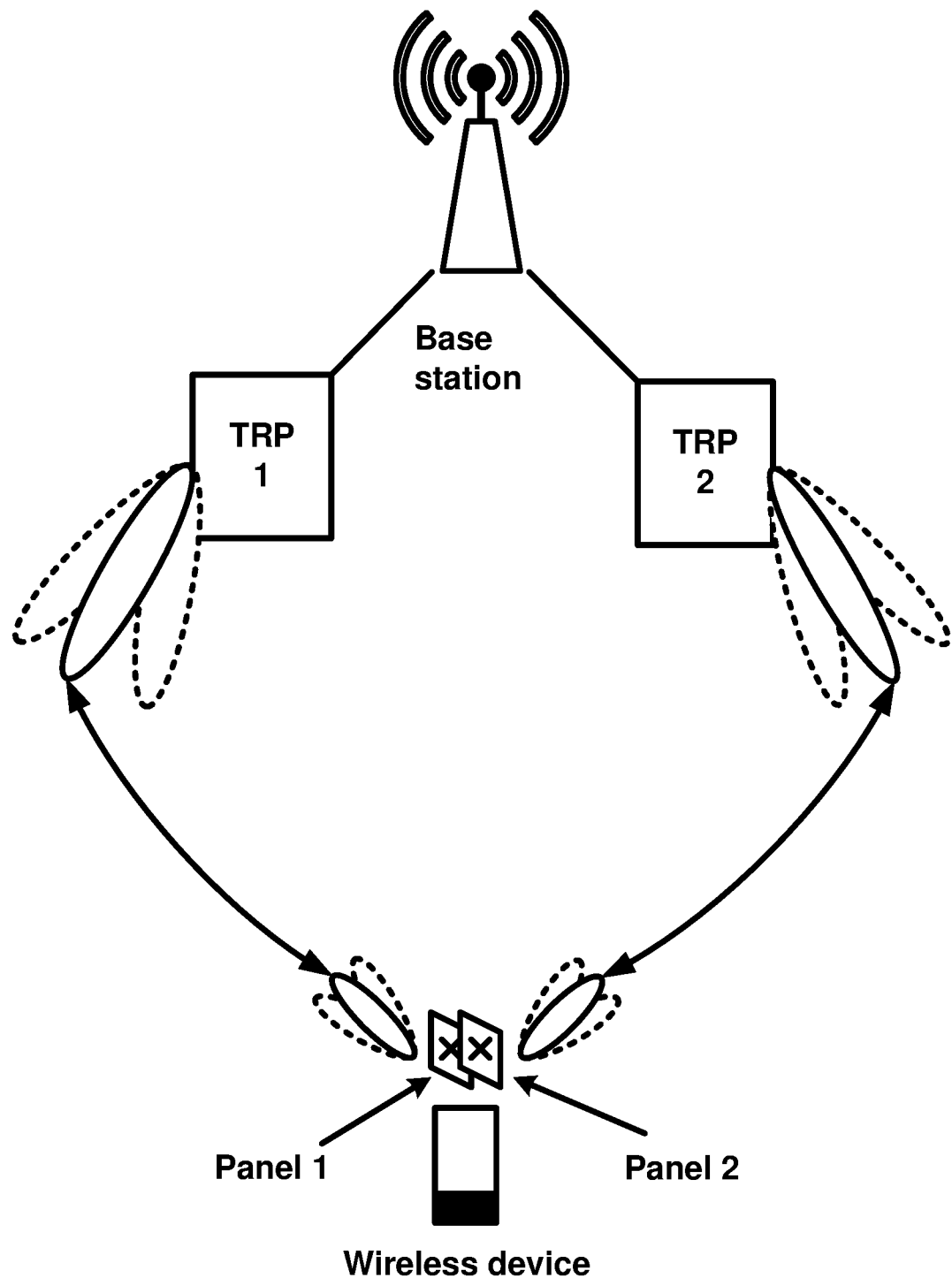
FIG. 20 illustrates a scenario of a multiple transmission and reception point (TRP) and multiple panels as per an aspect of an example embodiment of the present disclosure.

FIG. 20 shows an example of transmission and reception with multiple transmission reception points (TRPs) and/or multiple panels. In an example, a base station may be equipped with more than one TRP (e.g., TRP 1 and TRP 2). A wireless device may be equipped with more than one panel (e.g., Panel 1 and Panel 2). Transmission and reception with multiple TRPs and/or multiple panels may improve system throughput and/or transmission robustness for a wireless communication in a high frequency (e.g., above 6 GHz). For example, a TRP of a plurality of TRPs (or a coreset pool of a plurality of coreset pools) and a panel of a plurality of panels may be associated. For example, the wireless device may receive via the TRP and transmit via the panel that is associated with the TRP when the wireless device communicates with a base station via a TRP. For example, a first TRP of the plurality of TRPs may be associated with a first panel of the plurality of panels based on RRC/MAC-CE/DCI signaling. For example, a TRP with an index may be associated with a panel with the index. For example, a TRP with a coreset pool index may be associated with a panel configured with the coreset pool index. For example, a TRP with a coreset pool index may be associated with a panel with one or more PUCCH resources configured with the coreset pool index.

In an example, a TRP of multiple TRPs of the base station may be identified by at least one of: a TRP identifier (ID), a cell index, or a reference signal index. In an example, a TRP ID of a TRP may comprise a control resource set group (or pool) index (e.g., CORESETPoolIndex) of a control resource set group from which a DCI is transmitted from the base station on a control resource set. In an example, a TRP ID of a TRP may comprise a TRP index indicated in the DCI. In an example, a TRP ID of a TRP may comprise a TCI state group index of a TCI state group. A TCI state group may comprise at least one TCI state with which the wireless device receives the downlink transport blocks (TBs), or with which the base station transmits the downlink TBs.

In an example, a base station may be equipped with multiple TRPs. The base station may transmit to a wireless device one or more RRC messages comprising configuration parameters of a plurality of CORESETs on a cell (or a BWP of the cell). A CORESET of the plurality of CORESETs may be identified with a CORESET index and may be associated with (or configured with) a CORESET pool (or group) index. One or more CORESETs, of the plurality of CORESETs, having a same CORESET pool index may indicate that DCIs received on the one or more CORESETs are transmitted from a same TRP of a plurality of TRPs of the base station. The wireless device may determine receiving beams (or spatial domain filters) for PDCCHs/PDSCHs based on a TCI indication (e.g., DCI) and a CORESET pool index associated with a CORESET for the DCI.

In an example, a wireless device may receive multiple PDCCHs scheduling fully/partially/non-overlapped PDSCHs in time and frequency domain, when the wireless device receives one or more RRC messages (e.g., PDCCH-Config IE) comprising a first CORESET pool index (e.g., CORESETPoolIndex) value and a second CORESET pool index in ControlResourceSet IE. The wireless device may determine the reception of full/partially overlapped PDSCHs in time domain when PDCCHs that schedule two PDSCHs are associated to different ControlResourceSets having different values of CORESETPoolIndex. In an example, a wireless device may assume (or determine) that the ControlResourceSet is assigned with CORESETPoolIndex as 0 for a ControlResourceSet without CORESET-PoolIndex. When the wireless device is scheduled with full/partially/non-overlapped PDSCHs in time and frequency domain, scheduling information for receiving a PDSCH is indicated and carried by the corresponding PDCCH. The wireless device is expected to be scheduled with the same active BWP and the same SCS. In an example, a wireless device can be scheduled with at most two code-words simultaneously when the wireless device is scheduled with full/partially overlapped PDSCHs in time and frequency domain.

In an example, when PDCCHs that schedule two PDSCHs are associated to different ControlResourceSets having different values of CORESETPoolIndex, the wireless device is allowed to the following operations: for any two HARQ process IDs in a given scheduled cell, if the wireless device is scheduled to start receiving a first PDSCH starting in symbol j by a PDCCH associated with a value of CORESETpoolIndex ending in symbol i, the wireless device can be scheduled to receive a PDSCH starting earlier than the end of the first PDSCH with a PDCCH associated with a different value of CORESETpoolIndex that ends later than symbol i; in a given scheduled cell, the wireless device can receive a first PDSCH in slot i, with the corresponding HARQ-ACK assigned to be transmitted_in_slot j, and a second PDSCH associated with a value of CORESETpoolIndex different from that of the first PDSCH starting later than the first PDSCH with its corresponding HARQ-ACK assigned to be transmitted in a slot before slot j.

In an example, if a wireless device configured by higher layer parameter PDCCH-Config that contains two different values of CORESETPoolIndex in ControlResourceSet, for both cases, when tci-PresentInDCI is set to 'enabled' and tci-PresentInDCI is not configured in RRC connected mode, if the offset between the reception of the DL DCI and the corresponding PDSCH is less than the threshold timeDurationForQCL, the wireless device may assume that the DM-RS ports of PDSCH associated with a value of CORESET-PoolIndex of a serving cell are quasi co-located with the RS(s) with respect to the QCL parameter(s) used for PDCCH quasi co-location indication of the CORESET associated with a monitored search space with the lowest CORESET-ID among CORESETs, which are configured with the same value of CORESETPoolIndex as the PDCCH scheduling that PDSCH, in the latest slot in which one or more CORESETs associated with the same value of CORESETPoolIndex as the PDCCH scheduling that PDSCH within the active BWP of the serving cell are monitored by the wireless device. If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint indicates two TCI states, the wireless device may assume that the DM-RS ports of PDSCH of a serving cell are quasi co-located with the RS(s) with respect to the QCL parameter(s) associated with the TCI states corresponding to the lowest codepoint among the TCI codepoints containing two different TCI states.

In an example, a wireless device, when configured with multiple panels, may determine to activate (or select) one of the multiple panels to receive downlink signals/channels transmitted from one of multiple TRPs of the base station. The activation/selection of one of the multiple panels may be based on receiving downlink signaling indicating the activation/selection or be automatically performed based on measuring downlink channel qualities of one or more reference signals transmitted from the base station.

In an example, the wireless device may apply a spatial domain filter to transmit from a panel of the multiple panels to one of the multiple TRPs of the base station, the panel and the spatial domain filter being determined based on at least one of: an UL TCI indication of a DCI, a panel ID in the DCI, a SRI indication of a DCI, a CORESET pool index of a CORESET for receiving the DCI, and the like.

In an example, when receiving a DCI indicating an uplink grant, the wireless device may determine a panel and a transmission beam (or spatial domain transmission filter) on the panel. The panel may be explicitly indicated by a panel ID comprised in the DCI. The panel may be implicitly indicated by an SRS ID (or an SRS group/pool index), a UL TCI pool index of a UL TCI for uplink transmission, and/or a CORESET pool index of a CORESET for receiving the DCI.

In an example, a wireless device may complete a beam failure recovery (BFR) procedure for a primary cell of a first cell group or a primary cell of a second cell group (e.g., PSCell, SPCell) or a secondary cell. The beam failure recovery procedure may be for a cell or a coreset pool of the cell. For example, the wireless device may complete the beam failure recovery procedure by receiving an explicit or implement acknowledgement from a base station. For example, when the wireless may trigger a contention-free random access procedure for the BFR procedure. The wireless device may consider receiving a DCI, based on a first RNTI such as C-RNTI, comprising resource assignment in response to a preamble transmission of the contention-free random access, as an implicit acknowledgement of the BFR (e.g., transmission of one or more candidate beams). For example, when the wireless device may trigger a contention based random access procedure for the BFR procedure, the wireless device may consider receiving a DCI, based on the first RNTI and via a recovery coreset (e.g., identified by recoveryCoresetId) or a recovery search space (e.g., identified by recoverySearchSpaceId), as an implicit acknowledgement of the BFR procedure. In an example, the wireless device may transmit a scheduling request (e.g., a dedicated SR) to initiate the BFR procedure. The wireless device may receive an UL grant, comprising a HARQ process ID, scheduling a PUSCH. The wireless device may transmit a candidate beam via the PUSCH. When the wireless device receives another UL grant, comprising the HARQ process ID with NID bit toggled, the wireless device may consider the BFR procedure is completed.

After the BFR is successfully completed, the wireless device may perform the followings for various coresets and PUCCH resources. For example, after K symbols after completing the BFR (e.g., K=28), the wireless device may transmit a PUCCH based on a PUCCH resource, wherein a spatial domain filter parameter of the PUCCH may be determined based on a last PRACH transmission if the BFR procedure is performed based on a random access procedure. For example, after K symbols after completing the BFR (e.g., K=28), the wireless device may determine a TCI state of a coreset #0 (a coreset with index=0) as a first TCI state used for the recovery coreset if the BFR procedure is performed based on a random access procedure. For example, when the wireless device may have transmitted a candidate beam via a PUSCH (e.g., the BFR is triggered by transmitting a SR), after K symbols after completing the BFR (e.g., K=28), the wireless device may determine a second TCI state of a coreset (e.g., an active BWP of a cell of the BFR), based on the candidate beam. For example, when the wireless device may have transmitted a candidate beam via a PUSCH (e.g., the BFR is triggered by transmitting a SR), after K symbols after completing the BFR (e.g., K=28), the wireless device may determine a second TCI state of a PUCCH resource based on the candidate beam.

Note that coresets and/or PUCCH resources mentioned in above are limited to one or more coresets and/or one or more PUCCH resources configured for active DL/UL BWP of a cell where the BFR occurs for the cell or a candidate beam for the cell has been reported. In an example, a TCI state of a coreset may be determined, after K symbols after completing the BFR, based on a TCI state used for monitoring a RAR or used for a recovery coreset if the BFR has been performed based on a random access procedure, or a second TCI based on a candidate beam. In an example, a TCI state of a PUCCH resource may be determined, after K symbols after completing the BFR, based on a TCI state used for a preamble transmission if the BFR has been performed based on a random access procedure, or a second TCI based on a candidate beam.

In an example, a base station and a wireless device may support a second mode (e.g., second TCI indication mechanism, a second spatial domain filter update mechanism, a second type, a common beam update, beamUpdate-Type2) to update and/or apply a TCI state for a downlink channel or an uplink channel. In a second mode, a TCI state (e.g., a DL TCI, a common DL TCI state, a common DL TCI) may be applied to one or more downlink channels such as PDCCH and PDSCH. A second TCI state (e.g., an UL TCI, a common UL TCI state, a common UL TCI) may be applied to one or more uplink channels such as PUSCH and PUCCH. The TCI state may be same as the second TCI state. Each TCI state may be different per serving cell. A TCI state may be shared over one or more serving cells. For example, a base station may indicate a DL TCI state (e.g., DL common beam, a separate DL TCI state, a joint DL TCI state) for downlink channels/signals such as PDCCH, PDSCH and CSI-RS transmission. The base station may indicate the DL TCI state via a DCI or a MAC CE. The base station may update the DL TCI state via another DCI or another MAC-CE. The base station may indicate a UL TCI state (e.g., UL common beam, a separate UL TCI state, a joint UL TCI state) for uplink channels/signals such as PUCCH, PUSCH and SRS. The base station may indicate the UL TCI via a DCI or a MAC CE. The base station may update the UL TCI state via another DCI or another MAC-CE. For example, the base station may indicate a first DL TCI state for downlink for a first coreset pool and a second DL TCI state for downlink for a second coreset pool, when the wireless device is configured with a plurality of coreset pools. When the wireless device is configured with a single coreset pool or not configured with a coreset pool, the wireless device may apply the DL TCI state for a cell. In an example, the base station may indicate a plurality of DL TCI states for downlink. The base station may indicate a plurality of UL TCI states for uplink. A DL TCI state may be same as a UL TCI state where a common beam may be used for both downlink and uplink.

The base station may transmit one or more RRC messages comprising configuration parameters. The configuration parameters may indicate a set of TCI states for downlink and uplink or a first set of TCI states for downlink and a second set of TCI states for uplink. The base station may configure a joint set of TCI states for downlink and uplink of a cell. The base station may configure separate set of TCI states for downlink of the cell and the uplink of the cell, respectively. For example, the second mode may not be applied to a supplemental uplink of the cell, if the supplemental uplink is configured/associated with the cell.

Figure 21:
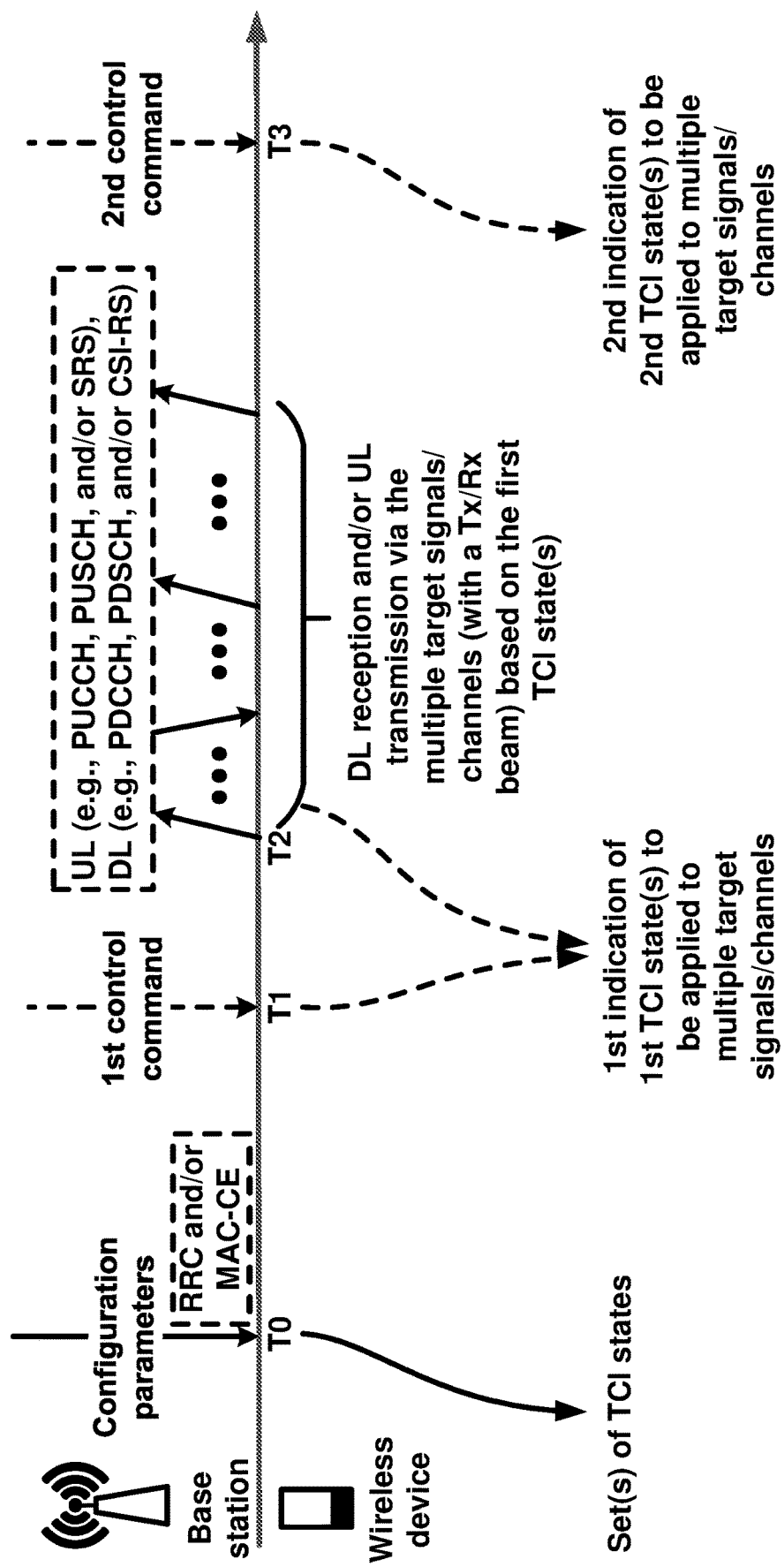
FIG. 21 illustrates a second mode of a TCI state update mechanism as per an aspect of an example embodiment of the present disclosure.

FIG. 21 shows an example of a second mode to update and/or apply a TCI state for downlink of a cell or uplink of the cell. The base station may transmit one or more RRC messages or MAC CE messages to indicate/comprise configuration parameters. The configuration parameters may comprise/indicate at least one set of TCI states. For example, when a single or joint TCI state is applied for downlink of a cell and uplink of the cell jointly/unified manner, the configuration parameters indicate/comprise a set of TCI states for the cell. The set of TCI states may be applied to downlink and uplink of the cell. When a first TCI state of downlink of the cell may be independently indicated or separately indicated or separately configured or separately enabled from a second TCI state of uplink of the cell, the configuration parameters may indicate a first set of TCI states for the downlink and a second set of TCI states for the uplink of the cell, respectively. For a notation, a DL TCI state may refer a TCI state used for receiving downlink signals/channels of a cell when the base station independently indicates TCI states for DL and UL of the cell. Similarly, a UL TCI may refer a TCI state used for transmitting uplink signals/channels of the cell when independent indication is used. When a joint indication between DL and UL of the cell is used (e.g., a common TCI is applied to downlink and uplink), a joint TCI state may refer a TCI state used for both downlink signals/channels of the cell and uplink signals/channels of the cell.

In an example, a TCI state (e.g., a DL TCI state, a UL TCI state or a joint TCI state) may comprise at least one source RS, where the at least one source RS may provide a reference (e.g., a spatial-domain reference, a reference for a QCL type and/or a spatial relation, or a QCL assumption for the wireless device, etc.) for determining a QCL (relationship) and/or a spatial (domain) filter. In an example, the at least one TCI state (e.g., a DL TCI state, a UL TCI state or a joint TCI state) may indicate (e.g., be associated with, or comprise, etc.) at least one TRP ID (e.g., a cell index, a reference signal index, a CORESET group (or pool) index (e.g., CORESETPoolIndex), or a CORESET group (or pool) index of a CORESET group from which the at least one TCI state is indicated/signaled, etc.), where the at least one source RS (e.g., transmitted from a TRP identified by the at least one TRP ID) may provide a reference (e.g., a spatial-domain reference, a reference for a QCL type and/or a spatial relation, or a QCL assumption for the wireless device, etc.) for determining a QCL (relationship) and/or a spatial (domain) filter. For example, a TCI state may be indicated for downlink and/or uplink for a TRP or a panel of a cell. For example, for a cell, a first TCI state may be used for a first TRP/panel and a second TCI state may be used for a second TRP/panel. For example, a TCI may be indicated for a cell regardless of a plurality of coreset pools or a single coreset pool (or multi-TRPs or a single TRP). A single TCI state may be used for a plurality of serving cells with a same coreset pool index. A single TCI state may be used for a plurality of serving ells regardless of coreset pool index. A single TCI state may be use for both downlink and uplink channels/signals. A single TCI may be used only for downlink or uplink operation.

In an example, one or more TCI states (e.g., M TCI states) may be used for downlink signals/channels of a cell. One or more reference signals of the one or more TCI states may provide common QCL information at least for reception (e.g., device-dedicated reception, UE-dedicated reception, etc.) on a PDSCH and one or more CORESETs in a serving cell (e.g., an activated serving-cell (configured with a PDCCH monitoring), or a component carrier (CC), etc.). The common QCL information may refer that a QCL property is shared or commonly used for a plurality of downlink/uplink channels/signals such as PDCCH/PDSCH for downlink and PUSCH/PUCCH for uplink. Similarly, one or more TCI states (e.g., N TCI states) may be used for uplink signals/channels of a cell. One or more TCI states (e.g., M TCI states) may be used for downlink signals/ channels of a TRP of a cell. One or more reference signals of the one or more TCI states may provide common QCL information at least for reception (e.g., device-dedicated reception, UE-dedicated reception, etc.) on a PDSCH and one or more CORESETs in a TRP of a serving cell (e.g., an activated serving-cell (configured with a PDCCH monitoring), or a component carrier (CC), etc.). One or more reference signals of the one or more TCI states may provide common QCL information at least for reception (e.g., device-dedicated reception, UE-dedicated reception, etc.) on a PDSCH and one or more CORESETs in a TRP/panel of a plurality of serving cells (e.g., a plurality of activated serving-cell (configured with a PDCCH monitoring), or a plurality of component carriers (CCs), etc.). Similarly, one or more TCI states (e.g., N TCI states) may be used for uplink signals/channels of a TRP/panel of a cell. One or more TCI states (e.g., N TCI states) may be used for uplink signals/channels of a TRP of a plurality of cells. One or more reference signals of the one or more TCI states may provide common QCL information at least for transmission (e.g., device-dedicated transmission, UE-dedicated transmission, etc.) on a PUSCH and one or more PUCCH resources in a TRP/panel of a plurality of serving cells (e.g., a plurality of activated serving-cell (configured with a PDCCH monitoring), or a plurality of component carriers (CCs), etc.).

In an example, the common QCL information may be applied to at least one CSI-RS resource, e.g., for CSI feedback/reporting, for beam management (configured with a parameter, e.g., repetition), for tracking (configured with a parameter, e.g., trs-Info). In an example, the common QCL information may be applied to determining a PDSCH default beam, e.g., in response to a mode (e.g., the second mode, etc.) for TCI indication (being configured/indicated, etc.) based on the at least one joint TCI. In an example, the wireless device may determine a PDSCH default beam as identical to an indicated (e.g., configured, activated, updated, or selected, etc.) (joint) TCI states, e.g., of the M (joint) TCIs, e.g., in response to a mode (e.g., the second mode, etc.) for TCI indication (being configured/indicated, etc.) based on the at least one TCI state. In an example, the PDSCH default beam may be used for a PDSCH reception based on certain condition(s), e.g., when a time offset between a reception of a DCI scheduling a PDSCH and a reception of the PDSCH is equal to or lower than a threshold (e.g., Threshold-Sched-Offset), when a CORESET delivering a DCI scheduling a PDSCH is not configured with a higher layer parameter (e.g., TCI-PresentInDCI), when a higher layer parameter (e.g., TCI-PresentInDCI) associated with a CORESET delivering a DCI scheduling a PDSCH is not enabled (e.g. not set as "enabled", not turned on, or disabled), when an explicit signaling from the base station for enabling the PDSCH default beam is given, or based on a pre-defined/pre-configured rule, etc.

The PDSCH default beam (e.g., for the second mode for TCI indication), as identical to an indicated (e.g., configured, activated, updated, or selected, etc.) (joint) TCI state, e.g., of the M (joint) TCI states, may be different (e.g., independent, or separately, etc.) from a first PDSCH default beam for the first mode which may be as identical to a second TCI-state or a second QCL assumption applied for a CORESET with a lowest ID (e.g., CORESET-specific index being the lowest) or as identical to a third TCI-state with a lowest ID (e.g., among activated TCI-states in a BWP), e.g., TCI-state ID being the lowest among active TCI-states in a BWP. In an example, a wireless device (e.g., the first wireless device, or the second wireless device, etc.) may receive an indication, e.g., from the base station, etc., of applying a method for determining a PDSCH default beam, where the method may comprise at least one of: a first method for determining a PDSCH default beam, based on the performing the default PDSCH RS selection, etc., e.g., as identical to a second TCI-state or a second QCL assumption applied for a CORESET with a lowest ID (e.g., CORESET-specific index being the lowest) or as identical to a third TCI-state with a lowest ID (e.g., among activated TCI-states in a BWP), e.g., TCI-state ID being the lowest among active TCI-states in a BWP, e.g., as applied based on the first mode for TCI state indication, and a second method for determining a PDSCH default beam as being identical to an indicated (e.g., configured, activated, updated, or selected, etc.) (joint) TCI state, e.g., of the M (joint) TCI states, e.g., as applied based on the second mode for TCI state indication, etc.

In an example, the indication of applying a method for determining a PDSCH default beam, e.g., where the indication may select one method among at least the first method, and the second method, etc., may be received via an RRC message. In an example, the indication of applying a method for determining a PDSCH default beam, e.g., where the indication may select one method among at least the first method, and the second method, etc., may be received via a MAC-CE message (e.g., and/or a dynamic indication via a DCI, etc.). Example embodiments may improve a flexibility and efficiency in a communication network (e.g., comprising at least a base station and a wireless device, etc.) by selectively applying a mode for TCI indication over at least one channel (e.g., a control channel, a data channel, and a shared channel, etc.) for a wireless device, and/or by selectively applying a method for determining a PDSCH default beam, e.g., based on the base station's efficient operational strategy. Example embodiments may reduce an overhead and a latency in control signaling for TCI indication, based on applying a single TCI-state over multiple channels (e.g., a downlink control channel and a downlink shared channel, etc.), e.g., based on the second mode for TCI indication.

In an example, reference signals of N TCI states (e.g., UL-TCIs, or UL-TCI states, etc.), where N is one or an integer greater than zero, may provide a reference for determining common uplink Tx spatial (domain) filter(s) at least for dynamic-grant-based (or configured-grant based) PUSCH and one or more (device-dedicated, e.g., UL-dedicated) PUCCH resources in a CC (e.g., a serving-cell, etc.). In an example, one or more PUCCH resources of a cell may be protected (e.g., restricted, or kept, etc.) from being affected by the reference for determining common uplink Tx spatial (domain) filter(s). In an example, the common uplink Tx spatial (domain) filter(s) may not be applied (e.g., used, etc.) for the one or more PUCCH resources. In an example, the one or more PUCCH resources in the CC may be a pre-defined PUCCH resource (e.g., from the lowest indexed PUCCH resource) in the CC, which may be used for a special purpose, e.g., as a secured fallback (or default) PUCCH resource, e.g., when an ambiguity situation (e.g., due to a re-configuration of a control signaling, etc.) arises between a wireless device (e.g., the first wireless device, or the second wireless device, etc.) and the base station. In an example, the common uplink Tx spatial (domain) filter(s) may be applied to one or more SRS resources in SRS resource set(s), where an SRS resource set of the SRS resource set(s) may be configured for antenna switching, codebook-based uplink, or non-codebook-based uplink, etc. In an example, the common uplink Tx spatial (domain) filter(s) may be applied to at least one SRS resource in an SRS resource set configured for beam management (via a parameter, e.g., usage, set to 'beamManagement', etc.), in response to receiving an explicit signaling from the base station for enabling the applying the common uplink Tx spatial (domain) filter(s) to the at least one SRS resource for beam management, or based on a pre-defined/pre-configured rule, etc.

In FIG. 21, the base station transmits a first control command (e.g., a DCI) indicating one or more first TCI states. For example, the DCI may indicate a first TCI state for downlink channels/signals of a cell, and a second TCI state for uplink channels/signals of the cell. For example, the first command or the DCI may indicate one or more TCI states for downlink/uplink channels/signals of the cell. The one or more TCI states may be jointly/commonly used for downlink/uplink channels/signals of the cell. For example, the first command or the DCI may indicate a TCI state for downlink/uplink channels/signals of the cell. The wireless device receives the first control command at a time T1. At a time T2, the wireless device may update one or more DL TCI states, one or more UL TCI states or one or more joint TCI states for the cell in response to receiving the first control command. For example, T1 and T2 may be same. For example, T2 may occur after processing delay or an offset after T1. The wireless device receives downlink channels/signals (e.g., PDCCH, PDSCH and/or CSI-RS) based on the one or more DL TCI states or the one or more joint TCI states after updating the one or more DL states or the one or more joint TCI states. The wireless device transmits uplink channels/signals (e.g., PUCCH, PUSCH, and/or SRS) based on the one or more DL TCI states or the one or more joint TCI states after updating the one or more UL states or the one or more joint TCI states. The wireless device receives a second control command (e.g., a second DCI) at a time T3. The wireless device updates the one or more DL TCI states, the one or more UL TCI states or the one or more joint TCI states based on the second control command in response to the receiving.

In the specification, a common beam update mechanism may refer a second mode to update TCI state(s) for downlink and/or uplink channels/signals of a cell. The downlink and/or uplink channels/signals may comprise one or more PDCCHs scheduled via one or more coresets, one or more PDSCHs of the cell, or CSI-RS or one or more PUCCH resources, one or more PUSCHs of the cell, or SRS. For example, the one or more coresets may not comprise a coreset #0 or may not comprise one or more second coresets (e.g., coreset #0, a coreset associated with a search space for SIB/RAR/paging, such as Type0/0A/2-PDCCH CSS). For example, the one or more PUCCH resources may not comprise PUCCH resources (e.g., default PUCCH resources) configured/indicated by SIB message(s). For example, CSI-RS may comprise non-zeropower CSI-RS s used for CSI feedback but may not comprise CSI-RS s for a beam failure measurement.

The common beam update mechanism determines at least one DL TCI state (e.g., at least one DL common beam, at least one common beam) of a TRP (e.g., a coreset pool) of a serving cell, where the wireless device may receive downlink signals/channels (e.g., PDCCH, PDSCH and/or CSI-RS) based on the at least one DCI TCI state from the TRP of the serving cell. The at least one DL TCI state may apply to a plurality of channels based on the common beam update mechanism. Similarly, the common beam update mechanism determines at least one UL TCI state (e.g., at least one UL common beam, at least one common beam) of a TRP (e.g., a coreset pool, a panel associated with the TRP, a panel associated with the coreset pool) of a serving cell. An example of the common beam update is shown in FIG. 21.

The at least one DL TCI of the TRP of the serving cell may be called as a DL TCI state (a common DL beam, a DL common beam, a common DL TCI state) of the TRP (or a coreset pool) of the serving cell. The at least one UL TCI of the TRP (or the panel) of the serving cell may be called as an UL TCI state (a UL common beam, a UL common beam, a common UL TCI state) of the TRP (or a coreset pool) of the serving cell.

In an example, a DL TCI state (a DL common beam, a selected DL TCI state, a DL common TCI state) may comprise a reference signal providing a qcl-TypeD properties for receiving downlink control/data channels/signals. The wireless device may apply/use the qcl-TypeD properties of the reference signal that has QCL-ed with a DM-RS or a CSI-RS of a downlink control/data channel/signal. In an example, a DL TCI state may comprise a plurality of reference signals. For example, the plurality of reference signals may comprise a first reference signal for a first TRP, a second reference signal for a second TRP. The plurality of reference signals may be used for a repetition of a control channel or for a repetition of a data channel. For example, a data, based on the DL TCI state, may be transmitted via a TRP switching where a first transmission/repetition of the data may be transmitted via the first TRP based on the first reference signal, and a second transmission/repetition of the data may be transmitted via the second TRP based on the second reference signal. In the specifications, the DL TCI state may refer the one or more TCI states, or the one or more reference signals used for receiving a single DCI via a PDCCH or a plurality of PDCCHs. In the specifications, the DL TCI state may refer the one or more TCI states, or the one or more reference signals used for receiving a transport block via a PDSCH or a plurality of PDSCHs or a PDSCH with multiple layers, In the specifications, the DL TCI state may refer the one or more TCI states, or the one or more reference signals used for receiving a CSI-RS or a plurality of CSI-RS s, In an example, a UL TCI state (e.g., an UL common beam, an selected UL TCI state, an UL common TCI state, UL TCI) may comprise a plurality of reference signals. For example, the plurality of reference signals may comprise a first reference signal for a first panel (or a first TRP), a second reference signal for a second panel (or a second TRP). The plurality of reference signals may be used for a repetition of a control channel or for a repetition of a data channel. For example, a data, based on the UL TCI state, may be transmitted via a panel/TRP switching where a first transmission/repetition of the data may be transmitted via the first panel/TRP based on the first reference signal, and a second transmission/repetition of the data may be transmitted via the second panel/TRP based on the second reference signal. In the specifications, the UL TCI state may refer the one or more TCI states, or the one or more reference signals used for transmitting a single UCI via a PUCCH or a plurality of PUCCHs or a single PUSCH or a plurality of PUSCHs. In the specifications, the UL TCI state may refer the one or more TCI states, or the one or more reference signals used for transmitting a transport block via a PUSCH or a plurality of PUSCHs or a PUSCH with multiple layers, In the specifications, the UL TCI state may refer the one or more TCI states, or the one or more reference signals used for receiving a SRS or a plurality of SRSs, A common beam update mechanism is further categorized as separate common beam update mechanism (or independent common beam update mechanism, separate/independent common beam update mechanism, independent/separate common beam update mechanism beamUpdate-Type2- separate, separate-Type2 beam update, separate Type-2 beam update mechanism) and joint (or unified common beam update mechanism, joint/unified common beam update mechanism, unified/joint common beam update mechanism beamUpdate-Type2-joint, joint-Type2 beam update, joint Type-2 beam update mechanism)) common beam update mechanism. For example, in the separate common beam update mechanism (e.g., separate Type 2 beam update mechanism), the base station may indicate/configure, via RRC signaling, one or more first (or separate) TCI states for DL (e.g., one or more DL common beams, one or more separate DL TCI states, one or more separate DL common beams, a first TCI state pool, a first set of TCI states) and one or more second TCI states for UL (e.g., one or more UL common beams, one or more separate UL TCI states, one or more separate UL common beams, a second TCI state pool, a second set of TCI states) independently/separately in the separate common beam update mechanism. For example, the first TCI state pool may be configured for DL and the second TCP state pool may be independently configured for the UL. For example, a first MAC CE may indicate an activation of one or more first TCI states for DL. A second MAC CE may indicate an activation of one or more second TCI states for UL. The first MAC CE and the second MAC CE may be a single MC CE or separate MAC CEs. For example, a first DCI may indicate a DL TCI state of the one or more first TCI states, wherein the DL TCI is a common beam for DL. For example, a second DCI may indicate a UL TCI state of the one or more second TCI states, wherein the UL TCI is a common beam for UL.

In the joint common beam update, the base station and the wireless device may determine one or more joint TCI states (e.g., one or more joint DL/UL common beams, one or more joint DL/UL TCI states, one or more DL/UL beams, one or more DL/UL TCI states) for DL and UL.

For example, in the joint common beam update mechanism (e.g., joint Type 2 beam update mechanism), the base station may indicate/configure, via RRC signaling, one or more TCI states (e.g., one or more common beams, one or more common beams, a TCI state pool, a set of TCI states) for DL and UL jointly/commonly. For example, a TCI state pool may be shared between DL and UL. For example, a MAC CE may indicate an activation of one or more joint TCI states for DL and UL. For example, a DCI may indicate a joint DL/UL TCI state of the one or more joint TCI states, wherein the joint DL/UL TCI state is applied/indicated for the DL and UL. In the joint common beam update, the base station and the wireless device may determine one or more joint TCI states (e.g., one or more joint DL/UL common beams, one or more joint DL/UL TCI states, one or more DL/UL beams, one or more DL/UL TCI states) for DL and UL.

A first mode (e.g., separate, separate/independent, independent/separate) beam update mechanism may refer to an independent mode to update TCI state for a downlink channel or an uplink channel. Separately indication for each downlink channel and/or uplink channel may be used.

In an example, a base station may transmit one or more RRC messages indicating whether the first mode is applied or the second mode is applied for a beam update (e.g., indication of a separate beam update mechanism or a common beam update mechanism). When the second mode is indicated, the one or more RRC messages may further indicate whether to use a joint common beam update between downlink and uplink or a separate common beam update mechanism for DL and UL separately. In an example, the one or more RRC messages may comprise a parameter to indicate between the joint common beam update mechanism or the separate common beam update mechanism. In an example, a wireless device may determine the joint common beam update mechanism in response to a first set of TCI states (or one or more first TCI states, a first TCI state pool) configured/indicated for downlink (e.g., associated with one or more downlink configuration parameters) being same to a second set of TCI states (or one or more second TCI states, a second TCI state pool) or in response to a single set of TCI states (or a TCI state pool) being configured for DL/UL. In the example, the wireless device may determine the separate common beam update mechanism in response to the first set of TCI states (or one or more first TCI states, the first TCI state pool) configured/indicated for downlink (e.g., associated with one or more downlink configuration parameters) being same to the second set of TCI states (or one or more second TCI states, the second TCI state pool) or in response to independent TCI state pools being configured for DL and UL respectively.

The common beam mechanism, in the specification, may be applied for a coreset pool of a serving cell, or a serving cell, or a coreset pool of a plurality of serving cells (if configured with simultaneous beam update list(s)), and/or a plurality of serving cells (if configured with simultaneous beam update list(s)).

Exposure limits may be imposed, for example by regulation, to limit radio frequency (RF) radiation from a wireless device. In an example, an SAR limit may be imposed for the wireless device in a sub-6 GHz carrier. The transmission in a sub-6 GHz carrier system may be close to isotropic and may have a low path loss. The SAR regulatory metric for exposure may be a volume metric (e.g., expressed as a power per unit volume). A maximum permissible exposure (MPE) limit may be imposed for the wireless device at frequency above 6 GHz. The MPE limit may be a regulatory metric for exposure based on area, for example, a limit defined as a number of power averaged over a defined area and time averaged over a frequency dependent time window in order to prevent a human exposure hazard represented by a tissue temperature change. The higher frequencies above 6 GHz may interact with a person's skin surface while the lower frequencies below 6 GHz may be absorbed in volume. An exposure limitation may be indicated for whole body exposure and/or for localized exposure of human body. Exposure limits of MPE may be based on an average amount of exposure for a defined time window. In an example, static power limits for transmission from the wireless device may ensure that MPE limits are met. However, such static power limits may require substantial back-off in power at the wireless device and may lead to a poor uplink coverage range of the wireless device. A static power back off rule may be based on a distance at which a detector measures an MPE violation. In order to conform with exposure limits while providing an effective coverage range, the wireless device may perform exposure measurements to detect actual exposure conditions. When the wireless device determines a problematic exposure condition, the wireless device may reduce transmission power and/or switch panels (or antenna arrays) in response to detecting an exposure condition violating the MPE limits.

In an example, when receiving a DCI indicating an uplink grant, the wireless device may determine a panel of the wireless device and a transmission beam (or spatial domain transmission filter) on the panel. The panel may be explicitly indicated by a panel ID comprised in the DCI. The panel may be implicitly indicated by an SRS ID (or an SRS group/pool index), a UL TCI pool index of a UL TCI for uplink transmission, and/or a CORESET pool index of a CORESET for receiving the DCI. In an example, when operating on high frequency (e.g., above 6 GHz), the wireless device may use one of multiple panels of the wireless device to communicate with the base station. The wireless device may comply with applicable radio frequency (RF) exposure requirements. The RF exposure requirements may comprise one or more MPE parameters associated with a frequency range. In an example, the one or more MPE parameters associated with a frequency range may comprise a maximum (or allowed) electric field strength value (E) in unit of V/m, a maximum (or allowed) magnetic field strength value (H) in unit of A/m, a maximum (or allowed) power density value (S) in unit of mW/cm2, and/or an averaging time value in unit of minutes. In a frequency of FR2, RF exposure requirement is defined as an allowed power density averaged over 68/f1.05 minutes where f is a value of carrier frequency in unit of GHz. In an example, the averaging period is about 2 minutes for 28 GHz, and 1.45 minutes in 39 GHz.

In an example, a wireless device may sense that there is a human body (or soft objects) in a proximity of a first panel (e.g., panel 1) of the wireless device, and the human body is not in the proximity of a second panel (e.g., panel 2) of the wireless device. The wireless device may sense the proximity of human body by using variety of sensors installed in the wireless device. The wireless device may sense the proximity of human body based on indication of another wireless device or a base station. The wireless device (e.g., by complying with the RF exposure requirements based on the one or more MPE parameters on the operating frequency) may automatically reduce maximum transmission power via the first panel (e.g., Panel 1). Reducing maximum transmission power may result in uplink coverage loss, for example, when the wireless device is in an edge of coverage of the base station. In an example, instead of reducing maximum transmission power via the first panel for complying with the RF exposure requirement, the wireless device may use a second panel (e.g., panel 2) of the wireless device to transmit uplink signals/channels to the base station, for example, when the second panel is not in the proximity of the human body. Transmission via the second panel may relax a transmission power limitation for compliance of RF exposure requirement, for example, without reducing the maximum transmission power of the wireless device.

In an example, the wireless device, by complying with RF exposure requirements in case of proximity detection, may automatically reduce maximum output power for transmitting signals or channels to the base station. Amount of maximum output power reduction, due to complying with the RF exposure requirements, may be referred to as power management maximum power reduction (P-MPR). In an example, the wireless device may apply P-MPRf,c for carrier f of serving cell c for the cases described below: a) ensuring compliance with applicable electromagnetic power density exposure requirements and addressing unwanted emissions/self-defense requirements in case of simultaneous transmissions on multiple RAT(s) for scenarios not in scope of 3GPP RAN specifications; b) ensuring compliance with applicable electromagnetic power density exposure requirements in case of proximity detection is used to address such requirements that require a lower maximum output power. For wireless device conformance testing, the P-MPRf,c may be 0 dB. In an example, a wireless device may reduce maximum output power due to modulation orders, transmit bandwidth configuration, waveform type and narrow allocations. Amount of maximum output power reduction, due to implementing modulation orders, bandwidth, waveform type, and/or the like, may be referred to as maximum power reduction (MPR). In an example, the cause of MPR may be different from the cause of P-MPR.

In an example, the wireless device may be indicated by the base station (via RRC signaling, MAC CE, and/or DCI) with additional emission requirements. Each additional emission requirement may be associated with a unique network signaling (NS) value indicated in RRC signaling by an NR frequency band number of the applicable operating band and an associated value in the field additionalSpectrumEmission. The wireless device, to meet the additional emission requirements, may be allowed for additional power reduction, which may be referred to as additional maximum power reduction (A-MPR). In an example, a wireless device may configure its maximum output power (PCMAX,f,c) for carrier f of a serving cell c based on a P-MPR, a MPR, a A-MPR, a power value of a power class of the wireless device, and/or a maximum Effective Isotropic Radiated Power (EIRPmax) of the wireless device. PCMAX,f,c may be defined as that available to the reference point of a given transmitter branch that corresponds to a reference point of a higher-layer filtered RSRP measurement. The wireless device may set PCMAX,f,c for carrier f of a serving cell c such that corresponding measured peak EIRP PUMAX,f,c is within the following bounds PPowerclass—MAX(MAX (MPRf,c, A-MPRf,c)+ΔMBP,n, P-MPRf,c)—MAX{T (MAX(MPRf,c, A-MPRf,c)), T(PMPRf,c)}≤PUMAX,f, c≤EIRPmax, while the corresponding measured total radiated power PTMAX,f,c is bounded by PTMAX,f,c-≤TRPmax. In an example, PPowerclass may be a power value corresponding to a power class of the wireless device, EIRPmax may be applicable maximum EIRP, MPRf,c may be MPR applicable for modulation orders, bandwidth, waveform types, and/or the like, related to frequency f on cell c, A-MPRf,c may be additional maximum power reduction indicated by the base station, ΔMBP,n may be a peak EIRP relaxation and TRPmax may be maximum total radiated power for the power class of the wireless device.

In an example, in additional to power reduction mechanism (e.g., MPR, A-MPR and/or P-MPR), the wireless device may transmit one or more RRC messages indicating a UE capability parameter (e.g., maxUplinkDutyCycle-FR2) to facilitate electromagnetic power density exposure requirements. If a field of wireless device capability maxUplinkDutyCycle-FR2 is present and the percentage of uplink symbols transmitted within any 1 second evaluation period is larger than maxUplinkDutyCycle-FR2, the wireless device follows the uplink scheduling and may apply P-MPRf,c. If the field of wireless device capability maxUplinkDutyCycle-FR2 is absent, the compliance to electromagnetic power density exposure requirements may be ensured by means of scaling down the power density or by other means. In an example, P-MPR may be greater than MPR or A-MPR in high frequency. Reducing maximum output power by P-MPR to comply with RF exposure requirements may decrease uplink coverage, although downlink coverage is not impacted by reducing maximum output power for uplink transmission. Mismatch of downlink coverage and uplink coverage, due to complying with MPE requirement, may occur.

In an example, a base station and a wireless device may determine a DL TCI state for downlink of a coreset pool of a cell and a UL TCI state for uplink of the coreset pool of the cell based on an independent common beam update mechanism. For example, the base station may enable the independent common beam update mechanism when the wireless device may experience MPE issue. The base station may determine the UL TCI state based on feedback (e.g., P-MPRf,) by the wireless device to address MPE issue.

A random access procedure (e.g., a 4-step RACH, four-step random access procedure, 4-step random access procedure) may comprise four steps for preamble transmission (Msg 1), random access response reception (RAR/Msg 2), uplink data transmission with a wireless device identity (Msg 3), and contention resolution (Msg 4). A random access procedure may comprise only two steps, e.g., a 2-step RACH. In a 2-step random access procedure, the wireless device may transmit a preamble sequence and a data signal in one transmission (MsgA; the first step). In response to detecting a MsgA, the base station may respond to the wireless device via a MsgB. The MsgB may comprise the detected preamble index, the wireless device identity, and a timing advance. A 2-step RACH procedure my result in reduced delay for RACH transmission and/or reduced signaling overhead, for both licensed and unlicensed bands.

A 2-step RA procedure may comprise an uplink (UL) transmission of a 2-step MsgA. The uplink transmission that may comprise a random access preamble (RAP) transmission and one or more transport blocks transmission. In response to the uplink transmission (e.g., the preamble and msg A), the wireless device may transmit a downlink (DL) transmission of a random access response and/or a 2-step MsgB. The downlink transmission may comprise a response, e.g., random access response (RAR), corresponding to the uplink transmission. The downlink transmission may comprise contention resolution information. Additionally, the base station may transmit a fallback RAR comprising an UL grant. In response to the UL grant, the wireless device may transmit a PUSCH. The base station may transmit a PDSCH for contention resolution in response to receiving the PUSCH.

A random access procedure (e.g., 4-step or 2-step) may be a contention-based random access procedure or a contention-free random-access procedure. In the contention-based random access procedure, a wireless device may determine a preamble, which may collide with preamble(s) from one or more other wireless devices. In response to receiving the preamble based on the contention-based random access procedure, a base station may transmit a random access response without knowing an identify of the wireless device of the preamble. The wireless device may transmit a Msg 1 (for 2-step) or a Msg 3 (for 4-step) to resolve potential collision or inform the identity of the wireless device. The base station may transmit a Msg B (for 2-step) or Msg 4 (for 4-step) to confirm the identify or acknowledge the identify or resolve the collision. The base station may indicate a preamble for the content-free random access procedure. The base station may identify an identify of the wireless device based on the preamble. In the contention-free random access procedure, the wireless device may not transmit Msg 1 or Msg 3. After receiving a RAR from the base station, the contention-free random access procedure may be completed.

In an example, a wireless device may perform measurements on signal qualities of one or more SS/PBCH blocks (SSBs) of a cell. The wireless device may determine a candidate beam or may determine a SS/PBCH block that the wireless device may initiate an initial access to the cell. The initial access procedure may trigger a 4-step random access procedure (e.g., Type-1 L1 random access procedure) or a 2-step random access procedure (e.g., Type-2 L1 random access procedure). A base station may transmit system information block(s) (SIB(s)) comprising configuration parameters. The configuration parameters may comprise/indicate random access resources/configurations. The wireless device may determine a plurality of random access occasions based on the random access resources/configurations, where each random access occasion may correspond to one or more SS/PBCH blocks. For example, SS/PBCH block indexes may be mapped to random access occasions may be sorted first in increasing order of preamble indexes, second in increasing order of frequency resource, third in increasing order of time resource indexes, and fourth in increasing order of indexes of preamble (PRACH) slots. The wireless device may determine a random access occasion based on the determined SS/PBCH block. The base station may acquire an index of the SS/PBCH block based on the time/frequency resources (e.g., the random access occasion, frequency resource) of the preamble transmitted by the wireless device. The wireless device may determine a spatial domain filter parameter of the preamble based on the SS/PBCH block. For example, the spatial domain filter parameter of the preamble may be same to a first spatial domain filter parameter that corresponds to a spatial RX parameter to receive the SS/PBCH block. The wireless device may determine a spatial domain filter parameter of the preamble based on UE capability/implementation. In the 2-step random access procedure, In an example, a wireless device may determine a second spatial domain filter parameter of a Msg 3 of a 4-step random access procedure based on a first spatial domain filter parameter of a preamble of the 4-step random access procedure. The second spatial domain filter parameter may be same or different from the first spatial domain filter parameter. The wireless device may transmit a PUCCH corresponding to a Msg 4 of the 4-step random access procedure. The wireless device may determine a third spatial domain filter parameter of the PUCCH based on the first domain spatial domain filter parameter or the second spatial domain filter parameter.

In an example, a wireless device may determine a second spatial domain filter parameter of a Msg A of a 2-step random access procedure based on a first spatial domain filter parameter of a preamble of the 2-step random access procedure. The second spatial domain filter parameter may be same to the first spatial domain filter parameter. The wireless device may transmit a PUCCH corresponding to a Msg B of the 2-step random access procedure. The wireless device may determine a third spatial domain filter parameter of the PUCCH based on the first domain spatial domain filter parameter or the second spatial domain filter parameter. The wireless device may determine the third spatial domain filter parameter of the PUCCH based on a spatial domain filter parameter of a last transmitted PUSCH in a cell. The 2-step random access may be performed in the cell.

In an example, a wireless device may be enabled/configured with a first mode for a TCI state determination where an individual TCI state may be dynamically and/or semi-statically indicated via DCI, MAC CE and/or RRC signaling for a downlink signal or an uplink signal. The wireless device may receive one or more RRC messages indicating configuration parameters. The configuration parameters may comprise/indicate a SRS resource set. The SRS resource set may comprise one or more SRS resources and a pathloss reference signal (PL-RS). The wireless device may determine a transmission power of a SRS based on a SRS resource of the one or more SRS resources based on the PL-RS configured for the SRS resource set.

In an example, the configuration parameters may comprise a first SRS resource set for a beam management and a second SRS resource set for a codebook. The first SRS resource set may comprise a first PL-RS. The second SRS resource set may comprise a second PL-RS. The first PL-RS may be one of a first SSB and a first CSI-RS. The second PL-RS may be one of a second SSB and a second CSI-RS. The first PL-RS may be different from the second PL-RS. The wireless device may determine a first transmission power for a SRS resource of the first SRS resource set based on the first PL-RS. The wireless device may determine a second transmission power for a second SRS resource of the second SRS resource set based on the second PL-RS.

In an example, a wireless device may be enabled/configured with a second mode (e.g., second TCI indication mechanism, a second spatial domain filter update mechanism, a second type, a common beam update, beamUpdateType2) to update and/or apply a TCI state for a downlink channel and/or an uplink channel. In a second mode, a TCI state may be applied to one or more downlink channels such as PDCCH and PDSCH. A second TCI state (e.g., an UL TCI, a common UL TCI state, a common UL TCI, a UL common TCI state, a UL common beam) may be applied to one or more uplink channels such as PUSCH, PUCCH and SRS. The TCI state may be same as the second TCI state.

In an example, the second TCI state may be applied to transmissions, of an uplink carrier, via PUSCH and one or more PUCCH resources of the uplink carrier and SRS transmissions via one or more SRS resources of the uplink carrier. For example, a SRS resource set of the one or more SRS resources may be configured for a usage as codebook, non-codebook, or antennaswitching. For example, the wireless device may not apply the second TCI state for a second SRS resource set configured with a second usage of beamManagement. For example, one or more third TCI states or one or more spatial domain filter parameters (e.g., SRS-spatialRelationInfos) may be configured for the second SRS resource set, where the wireless device may determine spatial domain filter parameter of a SRS resource, of the second SRS resource set, based on the one or more third TCI states or the one or more spatial domain filter parameters.

In an example, a wireless device may be configured with a set of TCI states. Each of the set of TCI states may be associated with or configured with a pathloss reference RS (e.g., PL-RS). The wireless device may determine a transmission power of an uplink signal based on a first PL-RS associated with or configured with a first TCI state of the set of TCI states. The first TCI state may be used for determining a spatial domain filter parameter for the uplink signal. The first TCI may be an uplink common beam of an uplink carrier/cell where the uplink signal is transmitted via.

For example, an uplink TCI state (e.g., UL TCI, an uplink common beam, an uplink TCI state) of the uplink carrier/cell may be updated/determined based on a second TCI indication mechanism. For example, the uplink TCI state may be applied for a plurality of uplink channels via the uplink carrier/cell. The uplink TCI state of the uplink carrier/cell may be updated via a DCI. For example, the wireless device may receive one or more MAC CE activating one or more TCI states of the set of TCI states. The wireless device may activate the one or more TCI states of the set of TCI states in response to the one or more MAC CE. The wireless device may receive a DCI activating the uplink TCI state of the one or more TCI states. The wireless device may determine the uplink TCI states as the UL TCI (e.g., a common beam).

In existing technologies, a TCI state may be associated with a PL-RS. For example, a first TCI state may be associate with or configured with a first PL-RS. A second TCI state may be associated with a second PL-RS. For example, when an UL TCI of an uplink cell/carrier changes from the first TCI state to the second TCI state, a pathloss reference of the uplink carrier/cell may change from the first PL-RS to the second PL-RS. This may lead frequent change of a pathloss reference RS with updating an uplink common beam of the uplink carrier/cell.

In existing technologies, a pathloss reference RS may be assumed to be configured for a TCI state. For example, when a wireless device is configured with 128 TCI states, this may lead 128 pathloss reference RSs or 128 indexes of the pathloss RSs. This may lead high signaling overhead.

In an example, a wireless device may determine a pathloss reference signal of an uplink carrier/cell independently from an UL TCI of the uplink carrier/cell. The wireless device may receive one or more RRC messages indicating a set of PL-RSs. The wireless device may receive one or more MAC CEs activating one or more PL-RSs of the set of PL-RSs. For example, the one or more MAC CEs may activate up to K (e.g., K=4) PL-RSs of the set of PL-RSs. The wireless device may receive one or more second MAC CEs or one or more DCIs associating/mapping/corresponding a PL-RS of the one or more PL-RSs to an UL TCI of an uplink carrier/cell. For example, the UL TCI may be an uplink common beam of the uplink carrier/cell. For example, The PL-RS may be indicated via a DCI. The DCI may comprise a first field indicating the UL TCI and a second field indicating the PL-RS. The DCI may comprise one of the first field or the second field. For example, the PL-RS may be indicated via a MAC CE. The MAC CE may comprise/indicate the PL-RS and the UL TCI. For example, the MAC CE may comprise one or more pairs of {an active TCI state, a PL-RS}.

In an example, a base station may configure/associate a pathloss reference RS to a TCI state for the TCI state that has been activated. For example, the base station may activate the TCI state via one or more MAC CEs. The base station may indicate the pathloss RS for the TCI state via the one or more MAC CEs.

The wireless device may determine a default PL-RS before applying the PL-RS associated with the UL-TCI. For example, the wireless device may apply the default PL-RS until a time when the wireless device updates/applies the UL TCI and/or updates/applies the PL-RS of the UL TCI. For example, the wireless device may determine the default PL-RS that is a lowest (or highest) indexed PL-RS among the set of PL-RSs. For example, the wireless device may determine the default PL-RS that is a lowest (or highest) indexed PL-RS of the one or more PL-RSs.

Example embodiments may reduce signaling overhead. Example embodiments may provide faster adaptation of pathloss reference signals. Example embodiments may provide independent management of a pathloss reference signal for an uplink carrier/cell.

In an example, the wireless device may activate the one or more PL-RSs of the set of PL-RSs based on the one or more MAC CEs activating the one or more PL-RSs of the set of PL-RSs. The wireless device may support up to M (e.g., M) PL-RSs to be monitored/measured for a cell. A number of the one or more MAC CEs may be equal to or smaller than M. For example, the wireless device may have one or more current activate PL-RSs when the wireless device receives the one or more MAC CEs. The wireless device may deactivate the one or more current activated PL-RSs and activate the one or more PL-RSs in response to the one or more MAC CEs. The wireless device may assume the number of the one or more PL-RSs being equal to or smaller than M. The wireless device may determine first M PL-RSs, based on an order, of the one or more PL-RSs when the number of one or more PL-RSs is greater than M. For example, the order may be determined based on an index of a PL-RS of the one or more PL-RSs. For example, the order may be determined based on a position of the PL-RS of the one or more PL-RSs in the one or more MAC CEs (e.g., a first PL-RS placed in before a second PL-RS in a MAC CE has higher order/priority). For example, the order may be determined based on a RS type of the PL-RS of the one or more PL-RSs (e.g., a SSB has a higher order than a CSI-RS). For example, the order may be determined based on a cell index of the PL-RS of the one or more PL-RSs (e.g., a serving cell index of a first PL-RS equal to an index of the cell has higher order/priority than a second PL-RS having a cell index different from the index of the cell).

Example embodiments may reduce ambiguity between a base station and a wireless device in determining a transmission power. Example embodiments may provide a mechanism to determine a PL-RS with an update of a UL TCI of an uplink carrier/cell with a low signaling overhead.

Unless otherwise noted, a UL TCI in the specification may refer a common uplink beam for a coreset pool/panel of an uplink carrier/cell.

In existing technologies, a wireless device may receive, from a base station, an association between one or more TCI states and one or more PL-RSs. The one or more TCI states may comprise one or more uplink TCI states and/or one or more joint TCI states. Before an activation command for an uplink TCI state is received, the wireless device may have an uplink signal to transmit to the base station. However, since no uplink TCI state is activated yet, the wireless device may be unable to determine which PL-RS to use in order to, e.g., calculate the transmission power for the uplink signal.

According to example embodiments of the present disclosure, the wireless device may use an SSB as a PL-RS for determining the transmission power of the uplink signal before the activation command is received. The SSB may be an SSB used for a most-recent random access procedure. The PL-RS may be referred to as a default PL-RS. The wireless device may use the SSB after an association (e.g., a mapping between one or more TCI states and one or more PL-RSs) is received (e.g., via RRC signaling) and before an activation command is received for one or more uplink TCI states (e.g., via a MAC CE).

Example embodiments of the present disclosure may enhance the transmission and reception of the uplink signal before an uplink TCI state is activated by using the SSB as a PL-RS (e.g., a default PL-RS) and aligning the operations of the wireless device and the base station before the activation command is received. If the operations of the wireless device and base station are not aligned, the wireless device may transmit the uplink signal based on a transmission power that the base station is not expecting, which may cause the base station to not detect, or receive, the uplink signal and/or may cause the base station to perform additional processing in order to detect, or receive, the uplink signal. The wireless device may select a PL-RS that results in a transmit power determination that is too low to successfully reach the base station. On other hand, the wireless device may choose a PL-RS that causes the wireless device to consume excess power if an unnecessary amount of power is used to transmit the uplink signal based on the selected PL-RS.

In an example, a wireless device may receive one or more RRC messages indicating configuration parameters. The configuration parameters may comprise a set of TCI states. A TCI state of the set of TCI states may comprise/indicate an index of the TCI state (e.g., tci-StateId) and one or more reference signals of the TCI state (e.g., qcl-Type1 and/or qcl-Type2). The TCI state may comprise a pathloss reference RS (e.g., a PL-RS) or an index of the pathloss reference RS.

FIG. 22 illustrates an example set of parameters of a TCI state as per an aspect of an example embodiment of the present disclosure. Parameters of the TCI state may comprise an index of the TCI state (tci-StateId), a first QCL type (qcl-Type1) and a second QCL type (qcl-Type2). The qcl-Type2 may be present or may not be present. The parameters may comprise a pathloss reference RS (pathlossReferenceRS). The parameters may comprise an index of the pathloss reference RS instead of the pathloss reference RS. The pathloss reference RS may be present or may not be present (e.g., optional parameter).

A qcl-Type1 may be based on a QCL-Info. The QCL-Info may comprise a cell index where a reference signal is transmitted. The cell index may be optional. For example, when the cell index is not present, the wireless device may assume the reference signal is transmitted via a cell where the TCI state is configured. The QCL-Info may comprise a BWP index (bwp-Id). The BWP index may be optional. When the BWP index is not present, the wireless device may assume an active BWP of the cell for applying the TCI state. The QCL-Info may comprise the reference signal (referenceSignal). The reference signal may be a CSI-RS (csi-rs) or SSB (ssb). The QCL-Info may comprise a qcl-Type. The qcl-Type may be one of typeA, typeB, typeC and typeD. For example, typeD may represent one or more QCL properties related to spatial domain filter parameter(s).

In an example, the configuration parameters may comprise/indicate a set of TCI states. A TCI state of the set of TCI states may or may not comprise a pathloss reference RS (a pathlossReferenceRS, a PL-RS). The wireless device may receive one or more MAC CEs activating one or more TCI states of the set of TCI states. The wireless device may receive an uplink TCI state of the one or more TCI states for an UL TCI of the uplink carrier/cell. The uplink TCI state may be a common uplink beam of the uplink carrier/cell. The wireless device may determine a spatial domain filter parameter for one or more uplink signals/channels, via the uplink carrier/cell, based on the UL TCI or the uplink TCI state. For example, the uplink signals/channels comprise data transmission via PUSCH, uplink control information via PUCCH, and/or an SRS transmission (e.g., an SRS transmission for a codebook, an SRS transmission for an antenna switching).

In an example, the uplink TCI state may not comprise a pathloss reference RS (a PL-RS). The base station may transmit one or more second MAC CEs and/or one or more second DCIs indicating a mapping between the uplink TCI state and the PL-RS. The wireless device may determine a default PL-RS and use the default PL-RS until the wireless device applies/updates the PL-RS based on the one or more second MAC CEs and/or the one or more second DCIs.

In an example, the wireless device may determine a first PL-RS configured with or associated with a current active UL TCI (e.g., a first TCI state) as the default PL-RS. For example, the wireless device may receive a DCI indicating the uplink TCI state as an UL TCI for the uplink carrier/cell. The wireless device may update the UL TCI from the first TCI state to the uplink TCI state. The first PL-RS may be associated with or configured with the first TCI state. For example, the first TCI state may comprise the first PL-RS. For example, the first TCI state may comprise an index of the first PL-RS. For example, the wireless device may have received one or more MAC CEs and/or one or more DCIs indicating an association between the first PL-RS and the first TCI state.

In response to the uplink TCI state not comprising the PL-RS, the wireless device may determine that the first PL-RS being associated with the uplink TCI state. The first PL-RS may be determined as the default PL-RS. When a TCI state not comprising a PL-RS, the wireless device may determine the TCI state being associated with the default PL-RS or the wireless device may use the default PL-RS for uplink signals/channels based on the TCI state.

In an example, the wireless device may determine a lowest (or a highest) indexed PL-RS among one or more PL-RSs as the default PL-RS. For example, the wireless device may determine the lowest (or the highest) indexed PL-RS based on an index of each PL-RS of the one or more PL-RSs. The wireless device may determine a PL-RS with a lowest index among indexes of the one or more PL-RSs. A PL-RS of the one or more PL-RSs may comprise an index value and the wireless device may determine a lowest index value (e.g., 0) and determine a PL-RS with the lowest index value.

For example, the one or more PL-RSs comprise PL-RS(s) activated via MAC CE(s) and/or DCI(s). For example, the one or more PL-RSs comprise PL-RS(s) configured via RRC signaling. The wireless device may activate the default PL-RS when the default PL-RS has not been activated. For example, the base station may activate the one or more PL-RSs of a set of PL-RSs configured for the wireless device for the uplink carrier/cell. For example, the wireless device may determine the one or more PL-RSs based on one or more second MAC CEs/DCIs activating/updating association between each of the one or more PL-RSs and each of one or more activated TCI states. For example, the one or more second MAC CEs/DCIs may indicate an activation of a TCI state (e.g., one of the one or more activated TCI states) that is associated with or configured with a PL-RS. The PL-RS may be one of the one or more PL-RSs.

For example, the wireless device may determine a PL-RS associated with a lowest (or a highest) indexed TCI state of the set of TCI states. The wireless device may determine a TCI state of the set of TCI states, where an index of the TCI state is smallest or lowest (or largest or highest) among indexes of the set of TCI states. For example, the index of the TCI state may be predetermined value (e.g., zero). For example, the wireless device may determine the lowest (or the highest) indexed TCI state based on an index of each TCI state of the set of TCI states. The wireless device may determine a TCI state with a lowest index among indexes of the set of TCI states.

The wireless device may determine the PL-RS that is configured for the lowest (or the highest) indexed TCI state. A TCI state of the set of TCI states may comprise an index value and the wireless device may determine a lowest index value (e.g., 0) and determine a TCI state with the lowest index value.

The wireless device may determine that the PL-RS is associated with the lowest (or the highest) indexed TCI state in response to the lowest (or the highest) indexed TCI state comprising the PL-RS or comprising an index of the PL-RS. The wireless device may determine that the PL-RS is associated with the lowest (or the highest) indexed TCI state based on one or more MAC CE/DCI signaling indicating a mapping/linking between the PL-RS and the lowest (or highest) indexed TCI state. The one or more MAC CE/DCI may activate or update the PL-RS for the lowest (or highest) indexed TCI state.

For example, the set of TCI states are configured for the wireless device via RRC signaling. The uplink TCI state may be one TCI state of the set of TCI states. For example, the wireless device may determine a second PL-RS associated with a lowest (or a highest) indexed TCI state of one or more activated TCI states. The wireless device may receive one or more MAC CEs activating the one or more TCI states of the set of TCI states. The wireless device may determine the lowest (or highest) indexed TCI state among the set of TCI states or the one or more activated TCI states, where the TCI state comprises a PL-RS or an index of the PL-RS.

In the specification, the wireless device may determine a lowest indexed PL-RS of a set of PL-RSs such that an index of the PL-RS is smallest among indexes of the set of PL-RSs. In some example, the lowest index may be predetermined (e.g., 0 or 1). In the specification, the wireless device may determine a lowest indexed TCI state of a set of TCI states such that an index of the TCI state is smallest among indexes of the set of TCI states. In some example, the lowest index may be predetermined (e.g., 0 or 1).

For example, when the set of TCI states comprise a first TCI state with a first index and a second TCI state with a second index and a second PL-RS, the wireless device may determine the second TCI state that comprises the second PL-RS. For example, the second index may be larger than the first index. The wireless device may determine a lowest (or a highest) indexed TCI state with associated/configured with a PL-RS for determining the default PL-RS.

In an example, the wireless device may determine a SSB that the wireless device may use to read a MIB as the default PL-RS in response to the UL TCI (or the uplink TCI state) not comprising or not being associated with a PL-RS. For example, the wireless device may determine the SSB that the wireless device may use to determine a spatial domain filter parameter of a preamble that the wireless device has transmitted via a most recent random access procedure. For example, the wireless device may determine the SSB that the wireless device may use to read a most recent MIB. This may be same or may be different from a second SSB that is used to determine a spatial domain filter parameter of a preamble in a most recent random access procedure.

In an example, the wireless device may determine a PL-RS activated for an SRS resource set, of the uplink carrier/cell, via a MAC CE as the default PL-RS. For example, the MAC CE may be a most recent MAC CE updating a second PL-RS for a second SRS resource set of the uplink cell/carrier. The wireless device may determine that the second PL-RS is the default PL-RS. For example, when the most recent MAC CE update PL-RS(s) for a plurality of SRS resource sets, the wireless device may determine a PL-RS associated/configured with a lowest (or a highest) indexed SRS resource set of the plurality of SRS resource sets.

For example, the wireless device may determine the lowest (or the highest) indexed SRS resource set based on an index of each SRS resource set of the plurality of SRS resource sets. The wireless device may determine an SRS resource set with a lowest index among indexes of the plurality of SRS resource sets. An SRS resource set of the plurality of SRS resource sets may comprise an index value and the wireless device may determine a lowest index value (e.g., 0) and determine an SRS resource set with the lowest index value. The wireless device may determine that the PL-RS is associated with the lowest (or the highest) indexed SRS resource set in response to the lowest (or the highest) indexed SRS resource set comprising the PL-RS or comprising an index of the PL-RS. For example, the wireless device may determine the lowest (or the highest) indexed SRS resource set on an index of each SRS resource set of the plurality of SRS resource sets. An SRS resource set of the plurality of SRS resource sets may comprise an index value and the wireless device may determine a lowest index value (e.g., 0) and determine a SRS resource set with the lowest index value.

The wireless device may determine that the PL-RS is associated with the lowest (or the highest) indexed SRS resource set based on one or more MAC CE/DCI signaling indicating a mapping/linking between the PL-RS and the lowest (or highest) indexed SRS resource set. The one or more MAC CE/DCI may activate or update the PL-RS for the lowest (or highest) indexed SRS resource set.

In an example, the wireless device may determine a PL-RS configured/associated for an SRS resource set of the uplink carrier/cell. When the wireless device may have a plurality of SRS resource sets, being associated with a plurality of PL-RSs, of the uplink carrier/cell, the wireless device may determine a lowest (or a highest) indexed SRS resource set based on an index of an SRS resource set.

Figure 23:
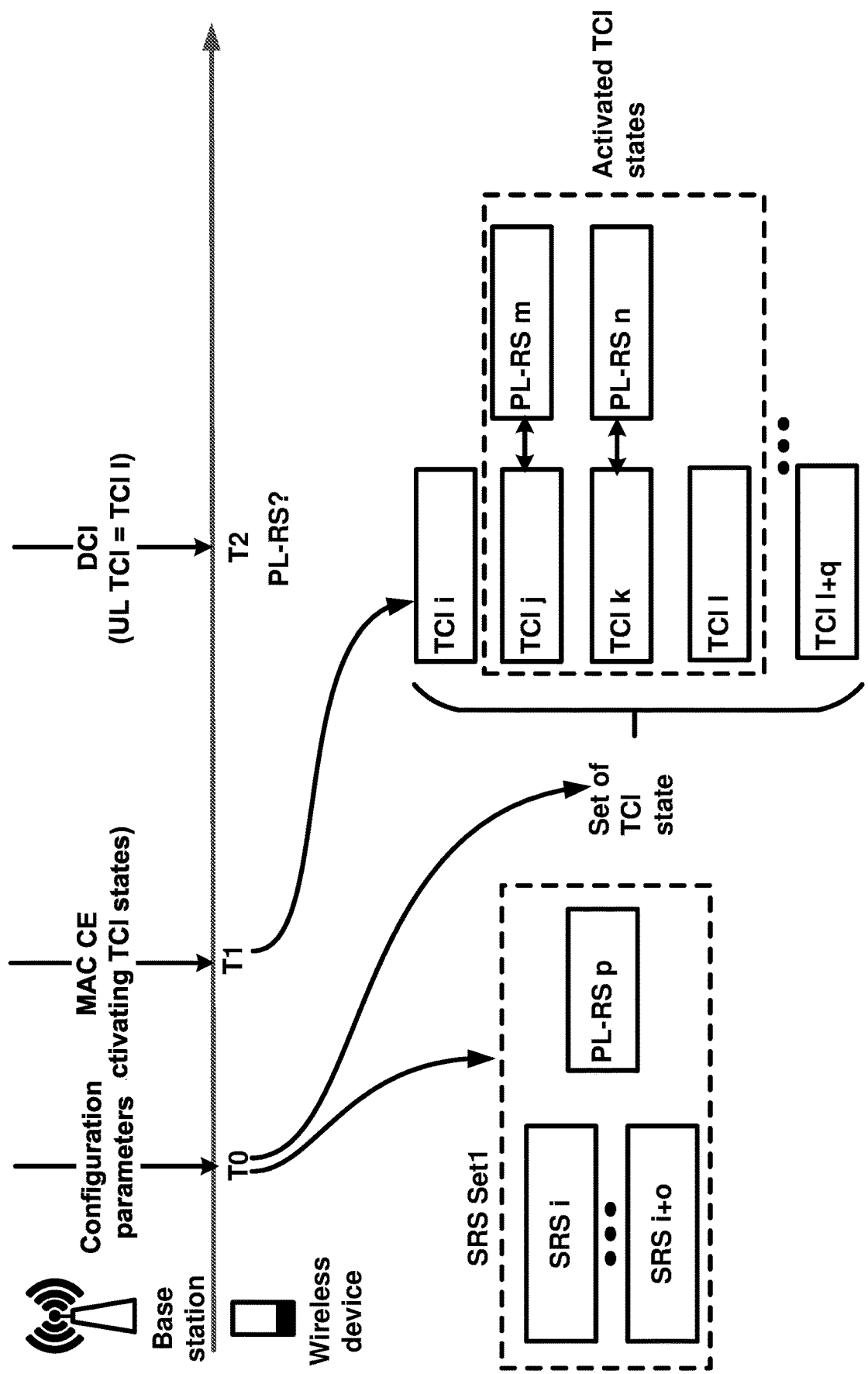
FIG. 23 illustrates a scenario to determine a default PL-RS as per an aspect of an example embodiment of the present disclosure.

FIG. 23 illustrates an example scenario to determine a default PL-RS as per an aspect of an example embodiment of the present disclosure.

The base station may transmit one or more RRC messages comprising configuration parameters at a first time (T0). The configuration parameters may comprise one or more sets of TCI states for an uplink carrier/cell. For example, a set of TCI states of the one or more sets of the TCI states may correspond to a coreset pool of the uplink carrier/cell or a panel of the uplink carrier/cell. When the uplink carrier/cell is configured with a plurality of coreset pools or panels, the wireless device may be configured with a plurality of sets of TCI states.

Each set of TCI states (e.g., set of TCI state shown in FIG. 23) may comprise a plurality of TCI states. For example, a first TCI state with index i, a second TCI state with index j, a third TCI state with index k, a fourth TCI state with index l, a fifth TCI state with index l+q and so on. For example, the second TCI state (TCI j) is associated with or configured with a first PL-RS (PL-RS m). The third TCI state (TCI k) is associated with or configured with a second PL-RS (PL-RS n). Other TCI states may not have associated or configured PL-RS(s).

The configuration parameters may comprise parameters of an SRS resource set (SRS set 1). The parameters may comprise one or more SRS resources (e.g., SRS resource with index i, . . . SRS resource with index i+o) and a pathloss reference RS (e.g., PL-RS p).

The wireless device may determine an initial UL TCI or a default UL TCI based on the set of TCI states. The wireless device may use the initial UL TCI or the default UL TCI until the wireless device may have applied or activated the one or more activated TCI states. For example, the wireless device may determine a lowest indexed TCI state of the set of TCI state as the initial UL TCI or the default UL TCI. For example, the first TCI state of the set of TCI states, based on a smallest index of i compared to other TCI state(s), may be determined as the initial UL TCI or the default UL TCI.

In an example, the first TCI may not comprise a pathloss reference RS or may not be associated with a pathloss reference RS. In FIG. 23, the first TCI may not have a referred PL-RS. The wireless device may determine a default PL-RS in response to the UL TCI not comprising a PL-RS. For example, the wireless device may determine a default SRS PL-RS for an SRS transmission via an SRS resource of an SRS resource set with a usage of beam management in response to the SRS resource set not comprising a PL-RS. For example, the default SRS PL-RS for the SRS transmission may be same as the default PL-RS. For example, the default SRS PL-RS may be determined independently from the default PL-RS based on one or more rules of determining the default PL-RS according to embodiments of the specification.

The wireless device may determine the default PL-RS between the first time and a second time+P (e.g., T1+P) based on one or more rules. For example, when the UL TCI (e.g., the first TCI state) is associated with or configured with a PL-RS, the default PL-RS may be the PL-RS. The wireless device may use an associated or configured with PL-RS of the UL TCI for the pathloss of uplink signals/channels based on the UL TCI. Otherwise, the wireless device may determine a PL-RS associated with or configured with a lowest indexed TCI states of the set of TCI states, where the lowest indexed TCI comprises a PL-RS. In FIG. 23, a lowest indexed TCI state with a PL-RS is the second TCI state (e.g., TCI j). The wireless device may determine the first PL-RS (PL-RS m) as the default PL-RS based on the second TCI state being a lowest indexed TCI state among TCI stat(s) with associated or configured with PL-RS(s). The wireless device may determine a highest indexed TCI with a PL-RS for the default PL-RS. For example, the third TCI state (TCI k) may be used to determine the default PL-RS (e.g., PL-RS n).

For example, the one or more rules may comprise that the wireless device determines the default PL-RS based on a third PL-RS configured for the first SRS resource set. For example, the wireless device may use a PL-RS configured for an SRS resource set with a usage of a beam management (or other usage). For example, the wireless device may use the third PL-RS (PL-RS p) as the default PL-RS based on this case.

For example, the wireless device may determine the default PL-RS based on a lowest indexed PL-RS among configured PL-RSs for the uplink carrier/cell. In FIG. 23, the first PL-RS with an index m, the second PL-RS with an index n and the third PL-RS with an index p are configured. The wireless device may determine the first PL-RS as the default PL-RS based on the lowest index m among m, n and p.

For example, the wireless device may determine the default PL-RS based on a lowest indexed PL-RS among activated PL-RSs for the uplink carrier/cell. In FIG. 23, at the time T0, only the third PL-RS is assumed to be active. The wireless device may determine the third PL-RS as the default PL-RS between T0 and T1+P. The wireless device may determine the first PL-RS as the default PL-RS between T1+P and T2+Q as the first PL-RS and the second PL-RS are assumed to be active between T1+P and T2+Q.

For example, the wireless device may determine the default PL-RS based on a SSB used for reading/accessing a MIB in most recent time. The wireless device may determine the default PL-RS based on a SSB or a CSI-RS accessed/used/assumed in a most recent random access procedure or most recent preamble transmission or a most recent RAR reception or a most recent Msg 4/MsgB repetition or a most recent SSB/CSI-RS indicated via a Msg 3/MsgA.

The base station may transmit a MAC CE activating one or more TCI states of the set of TCI states at the second time (e.g., T1). The wireless device may activate the one or more TCI states of the set of TCI states. The one or more TCI states comprise the second TCI state, the third TCI state and the fourth TCI state. The wireless device may apply/activate the one or more TCI states after P since the wireless device receives the MAC CE. For example, the wireless device applies/activates the one or more TCI states at time T1+P. For example, P is sum of a offset, between T1 and a time when the wireless device transmits a HARQ-ACK feedback corresponding to the MAC CE, and 3*a slot duration based on a numerology of an active uplink BWP of the uplink carrier/cell.

The wireless device may determine or update the default UL TCI in response to activating or updating the one or more TCI states. For example, the wireless device may use or apply the updated default UL TCI between T1+P to a third time+Q (e.g., T2+Q). For example, the wireless device may determine a lowest indexed TCI state of the one or more TCI states as the default UL TCI. In FIG. 23, the second TCI state (TCI j) may be determined for the updated default UL TCI. The wireless device may update a current UL TCI from the first TCI state to the second TCI state at the time of T1+P (e.g., at activating the one or more TCI states). The wireless device may determine or update the default PL-RS in response to updating the current UL TCI.

For example, when the second TCI state has a configured or associated PL-RS (e.g., the first PL-RS, PL-RS m), the wireless device may update the default PL-RS to the first PL-RS. In the example, the wireless device may continue to use the first PL-RS as the default PL-RS when the default PL-RS between the time T0 and the T1+P1 was the first PL-RS. For example, when the default PL-RS between the time T0 and the T1+P 1 was the second PL-RS, the wireless device may switch the default PL-RS to the first PL-RS. For example, P1 is a processing time for updating a PL-RS or activating a PL-RS. P1 may be same to the P or may be different from P.

In an example, the wireless device may determine up to K (e.g., K=4) PL-RSs of one or more configured PL-RSs. For example, at the first time, the wireless device may determine PL-RS p, PL-RS m and PL-RS n are activated as a total number of configured PL-RS being less than K. When a number of configured PL-RSs are exceeding K, the wireless device may determine K PL-RSs based on indexes of the configured PL-RSs.

In an example, the wireless device may activate the first PL-RS at the second time (e.g., at receiving the MAC CE). The wireless device may start to use the first PL-RS no later than the second time+P1. The wireless device may be allowed to switch from the second PL-RS to the first PL-RS between the second time and the second time+P1.

The wireless device may activate one or more second PL-RSs associated or configured with the one or more TCI states at the second time or upon receiving the MAC CE. For example, in FIG. 23, the wireless device may activate the first PL-RS and the second PL-RS at the time T1. The wireless device may start to use the first PL-RS and/or the second PL-RS no later than T1+P1.

For example, the wireless device may inform a capability for P1 (processing time for updating a PL-RS or activating a PL-RS). The base station may configure the P1 based on the capability of the wireless device. The capability for P1 may be independently indicated from a second capability for P (processing time for activating a TCI state based on a MAC CE). The capability of P1 may be same as the second capability.

The wireless device may determine to update the default PL-RS based on one or more rules. For example, the one or more rules to determine the default PL-RS between time T0 and T1+P may be also used to update the default PL-RS. For example, the wireless device may determine a PL-RS of the UL TCI as the default PL-RS in response to the UL TCI comprising the PL-RS. Otherwise, the wireless device may not update the default PL-RS. The wireless device may continue using a current default PL-RS or a current PL-RS for the UL TCI without updating. For example, when the second TCI state does not comprise the first PL-RS, the wireless device may continue using the default PL-RS, between T0 and T1+P (e.g., the PL-RS p, or PL-RS n), at activating the one or more TCI states. The wireless device may continue the default PL-RS between T0 and T2+Q.

The wireless device may receive a DCI activating or updating the UL TCI. For example, the wireless device receives the DCI at the third time (T2) indicating the fourth TCI state (TCI 1) as the UL TCI. The wireless device may update the UL TCI from the second TCI state to the fourth TCI state in response to receiving the DCI. The wireless device may update the UL TCI at T2+Q where Q is a delay for updating the UL TCI. For example, Q may be determined as an offset between T2 and a delay d. For example, Q may be determined as an offset between T2+k1 and the delay d. k1 may represent a scheduling offset between T2 and a time to transmit a HARQ-ACK feedback corresponding to the DCI.

The wireless device may determine to update the default PL-RS in response to updating the UL TCI. The wireless device may determine a new default PL-RS based on the one or more rules for determining the default PL-RS between T0 and T1+P and/or between T1+P and T2+Q.

For example, the fourth TCI state does not comprise a PL-RS. The wireless device may determine a lowest indexed TCI state of the one or more TCI states for the default PL-RS. For example, the wireless device may determine the second TCI state and determine the first PL-RS (PL-RS m) as the default PL-RS between T2+Q and a next update of the UL TCI. The wireless device may determine the new default PL-RS based on a lowest indexed TCI state, a lowest indexed PL-RS, a lowest indexed activated PL-RS, a most recent SSB for acquiring MIB, or a most recent random access procedure or one or more pathloss reference RS s of one or more SRS resource sets.

In the specification, the default PL-RS may refer a PL-RS associated with a common uplink beam (UL TCI) of a coreset pool/panel of an uplink carrier/cell.

Example embodiments may enable to determine a PL-RS corresponding to a common beam of an uplink carrier/cell.

In an example, a wireless device may receive a first MAC CE updating a pathloss reference RS for an SRS resource set.

Figure 24A:
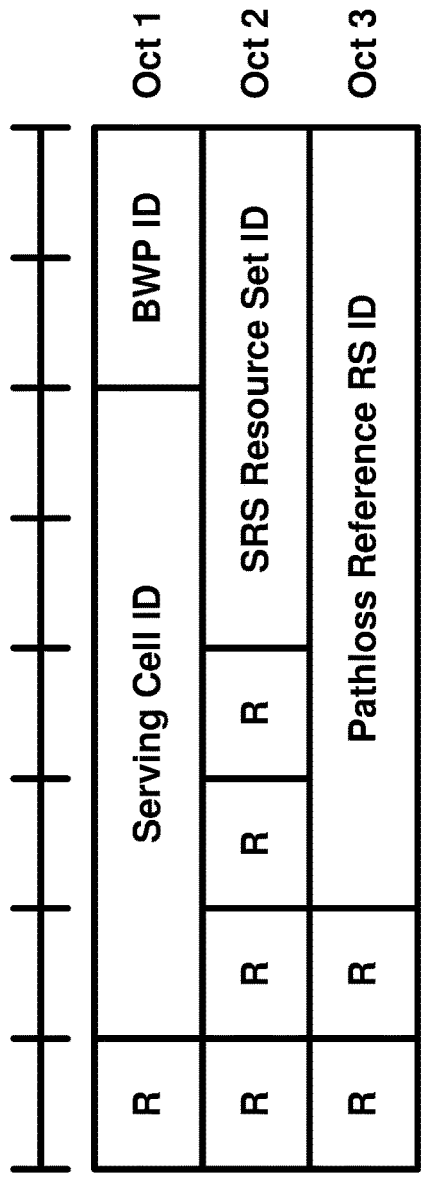
FIG. 24A illustrates a format of a MAC CE updating a pathloss reference RS for an SRS resource set as per an aspect of an example embodiment of the present disclosure.

In an example, a wireless device may receive one or more MAC CEs updating or indicating or activating a pathloss reference for an SRS resource set. FIG. 24A illustrates an example format of a MAC CE updating a pathloss reference RS for an SRS resource set as per an aspect of an example embodiment of the present disclosure.

For example, the MAC CE (e.g., SRS pathloss reference RS update MAC CE) may be identified by a MAC subheader with a LCID (e.g., code point 247, index 311). The MAC CE may have a predefined bit size (e.g., 24 bits). The MAC CE comprise a serving cell index (Serving Cell ID). The serving cell index may indicate an identify of a serving cell that comprises an SRS resource set.

The MAC CE comprises a BWP index (BWP ID) that comprises the SRS resource set. The MAC CE may comprise an SRS resource set index SRS resource Set ID) that is an index of the SRS resource set. The MAC CE may comprise an index of a pathloss reference RS (pathloss reference RS ID) that is an index of a pathloss reference signal (PL-RS) activated for the SRS resource set. The MAC CE may comprise one or more reserved bits (Rs) where a reserved bit is indicated with a predetermined value (e.g., 0).

In an example, a wireless device may receive a MAC CE updating a PL-RS of an SRS resource set in response to a usage of the SRS resource set being a beam management. The wireless device may not expect to receive a second MAC CE updating a second PL-RS of a second SRS resource set in response to the second usage of the second RSR resource set being different from the beam management. The wireless device may not expect to receive the second MAC CE for the second SRS resource set in response to the second usage of the second RSR resource set being different from the beam management and the wireless device being enabled or configured with the second TCI indication mechanism.

Figure 24B:
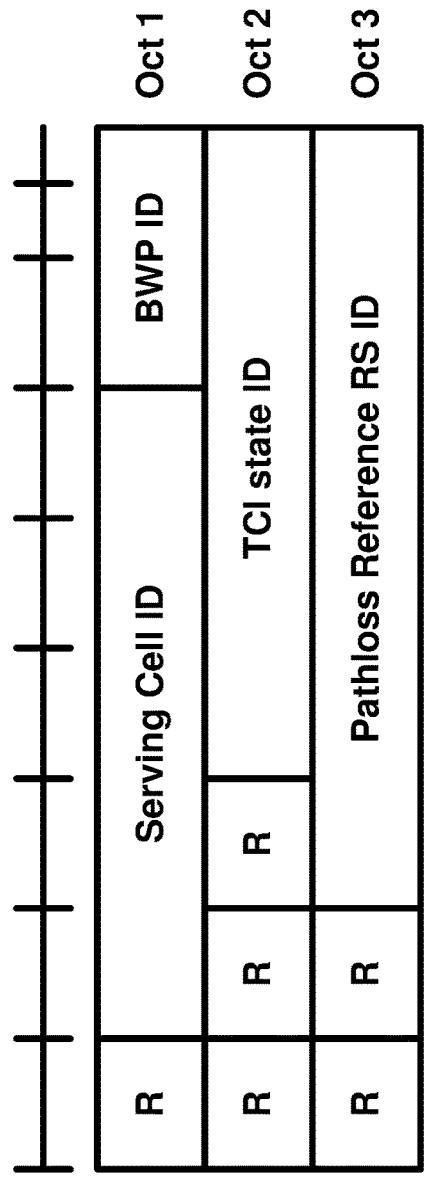
FIG. 24B illustrates a format of a MAC CE updating a pathloss reference RS for a TCI state as per an aspect of an example embodiment of the present disclosure.

In example, a wireless device may receive a TCI Pathloss Reference RS update MAC CE (e.g., TCI-PL-RS MAC CE). FIG. 24B illustrates an example format of a MAC CE updating a pathloss reference RS for a TCI state as per an aspect of an example embodiment of the present disclosure.

For example, the TCI-PL-RS MAC CE (e.g., TCI pathloss reference RS update MAC CE) may be identified by a MAC subheader with a LCID (e.g., code point 247, index 400). The MAC CE may have a predefined bit size (e.g., 24 bits). The MAC CE comprise a serving cell index (Serving Cell ID). The serving cell index may indicate an identify of a serving cell that comprises a TCI state. For example, when a TCI state may be configured for a cell group of a simultaneous TCI state update or a cell group of a simultaneous common beam update cell (e.g., simultaneous common beam update cell list), the TCI-PL-RS-MAC CE may be applied to one or more cells of the simultaneous common beam update cell list or the cell group of the simultaneous TCI state update or the cell group of the simultaneous common beam update cell.

For example, when the serving cell may belong to a cell group of a simultaneous TCI state update or a cell group of a simultaneous common beam update cell (e.g., simultaneous common beam update cell list), the TCI-PL-RS-MAC CE may be applied to one or more cells of the simultaneous common beam update cell list or the cell group of the simultaneous TCI state update or the cell group of the simultaneous common beam update cell.

The MAC CE comprises a BWP index (BWP ID) that comprises the TCI state. The BWP index may not be present when a simultaneous common beam update cell list is configured. The wireless device may determine or update a UL TCI and/or a DL TCI for one or more cells of the simultaneous common beam update cell list.

The MAC CE may comprise a TCI state index (TCI state ID) is an index of the TCI state. The MAC CE may comprise an index of a pathloss reference RS (pathloss reference RS ID) that is an index of a pathloss reference signal (PL-RS) activated for the TCI state. The MAC CE may comprise one or more reserved bits (Rs) where a reserved bit is indicated with a predetermined value (e.g., 0).

For example, a wireless device may be configured with one or more SRS resources of an SRS resource set. The SRS resource set may be enabled/activated with a usage of a beam management. The wireless device may receive a TCI-PL-RS MAC CE updating a PL-RS of a TCI state. For example, the TCI state may be associated with an SRS resource of the one or more SRS resources. In response to receiving the TCI-PL-RS MAC CE, the wireless device may update association of one or more TCI states of the one or more SRS resources to the PL-RS.

For example, one or more TCI states, for determining a PL-RS for a SRS resource set, may represent one or more activated TCI states based on one or more MAC CEs and/or DCI signaling. For example, one or more PL-RSs, for determining a PL-RS for the SRS resource set, may represent one or more activated PL-RSs based on one or more second MAC CEs and/or second DCI signaling.

The wireless device may determine a default PL-RS in response to a UL TCI not comprising a PL-RS or an index of the PL-RS and the UL TCI not being associated with a second PL-RS via one or more MAC CEs. For example, the one or more MAC CEs may be based on FIG. 24B. The TCI state ID of the one or more MAC CEs indicating an index of the UL TCI.

In an example, a wireless device may receive a MAC CE or a DCI activating a PL-RS associated with a TCI state. For example, the wireless device may receive one or more MAC CEs activating one or more PL-RSs for one or more activated TCI states of an uplink cell/carrier. For example, the one or more MAC CEs may comprise a list of {a TCI state, a PL-RS}, where the TCI state may be one of the one or more activated TCI states of the uplink cell/carrier. The wireless device may determine one or more PL-RSs based on the one or more MAC CEs that each of the one or more PL-RSs is associated with at least one activated TCI state of the one or more activated TCI states.

The wireless device may assume that a number of the one or more PL-RSs being lower than or equal to a capability of the wireless device. For example, the capability of the wireless device for a number of PL-RSs may be four (4).

For example, when the number of the one or more PL-RSs being higher than the capability of the wireless device, the wireless device may determine first K (e.g., K=the capability of the wireless device) PL-RSs from the one or more PL-RSs. For example, the wireless device may determine first K lowest indexed PL-RSs from the one or more PL-RSs. For example, the wireless device may order the one or more PL-RSs based on an index of each PL-RS of the one or more PL-RSs. Then the wireless device may select first K or earliest K or lowest indexed K PL-RSs from first entry or first PL-RS of the ordered one or more PL-RSs.

In an example, a wireless device may determine one or more first PL-RSs that are associated or configured with one or more activated TCI states for an UL TCI of an uplink carrier/cell. In FIG. 23, the one or more first PL-RSs may comprise the first PL-RS (PL-RS m) and the second PL-RS (PL-RS n). The wireless device may determine one or more second PL-RSs that are associated with or configured with one or more SRS resource sets. In FIG. 23, the one or more second PL-RSs may comprise the third PL-RS (PL-RS p).

In an example, the wireless device may determine a first capability to determine to activate the one or more first PL-RSs. The wireless device may determine a second capability to determine to activate the one or more second PL-RSs. For example, the first capability may be four (4). For example, the second capability may be two (2).

In an example, the wireless device may determine a capability to determine to activate the one or more first PL-RSs and the one or more second PL-RSs. For example, the capability may be four (4). The wireless device may determine to activate a PL-RS of an SRS resource set regardless of the capability. The wireless device may prioritize the PL-RS of the SRS resource set when a number of a sum of the one or more first PL-RSs and the one or more second PL-RSs exceeds the capability of the wireless device. For example, the wireless device may determine a second number of the one or more second PL-RSs, where the second number is a number of the one or more second PL-RSs. The wireless device may determine a first number for the one or more first PL-RSs, where the first number is the capability—the second number (e.g., the capability is subtracted by the second number).

The wireless device may determine the first number of PL-RSs from the one or more first PL-RSs based on indexes of the one or more first PL-RSs.

In an example, the base station may configure a first number for the one or more first PL-RSs. The base station may configure a second number for the one or more second PL-RS s. For example, a sum of the first number and the second number may be smaller than or equal to a capability of a wireless device. For example, the base station may not configure the second number or the first number. The wireless device may determine the second number in response to the configured first number (e.g., the second number=K–the first number). The wireless device may determine the first number in response to the configured second number (e.g., the first number=K–the second number).

In an example, a wireless device may determine at least one active PL-RS for an UL TCI of a coreset pool/panel of an uplink cell/carrier. The wireless device may determine an associated PL-RS to the UL TCI as an active PL-RS. The wireless device may determine one or more second PL-RSs associated with one or more SRS resource sets with higher priority than one or more first PL-RSs associated with one or more activated TCI states (other than the UL TCI) for the coreset pool/panel of the uplink carrier/cell.

For example, in FIG. 23, the wireless device may determine to activate the first PL-RS that is a default PL-RS of an UL TCI at a second time (T1) with a highest priority. The wireless device may activate the first PL-RS or may consider the first PL-RS as an active PL-RS. The first PL-RS is counted as an active PL-RS. Then the wireless device may determine to activate the third PL-RS as second active PL-RS as the one or more second PL-RS associated or configured with the one or more SRS resource sets are prioritized. The wireless device may determine whether the first PL-RS and the third PL-RS meets a capability of the wireless device.

When the wireless device may have remaining budget for a number of active PL-RSs, the wireless device may d determine to activate one or more first PL-RSs associated with one or more active TCI states other than the UL TCI (e.g., TCI I, TCI k, TCI 1 in FIG. 23 at time T1+P). The wireless device may determine to activate the second PL-RS.

For example, when the capability of the wireless device is equal to two (2), the wireless device may determine not to activate the second PL-RS.

Figure 25:
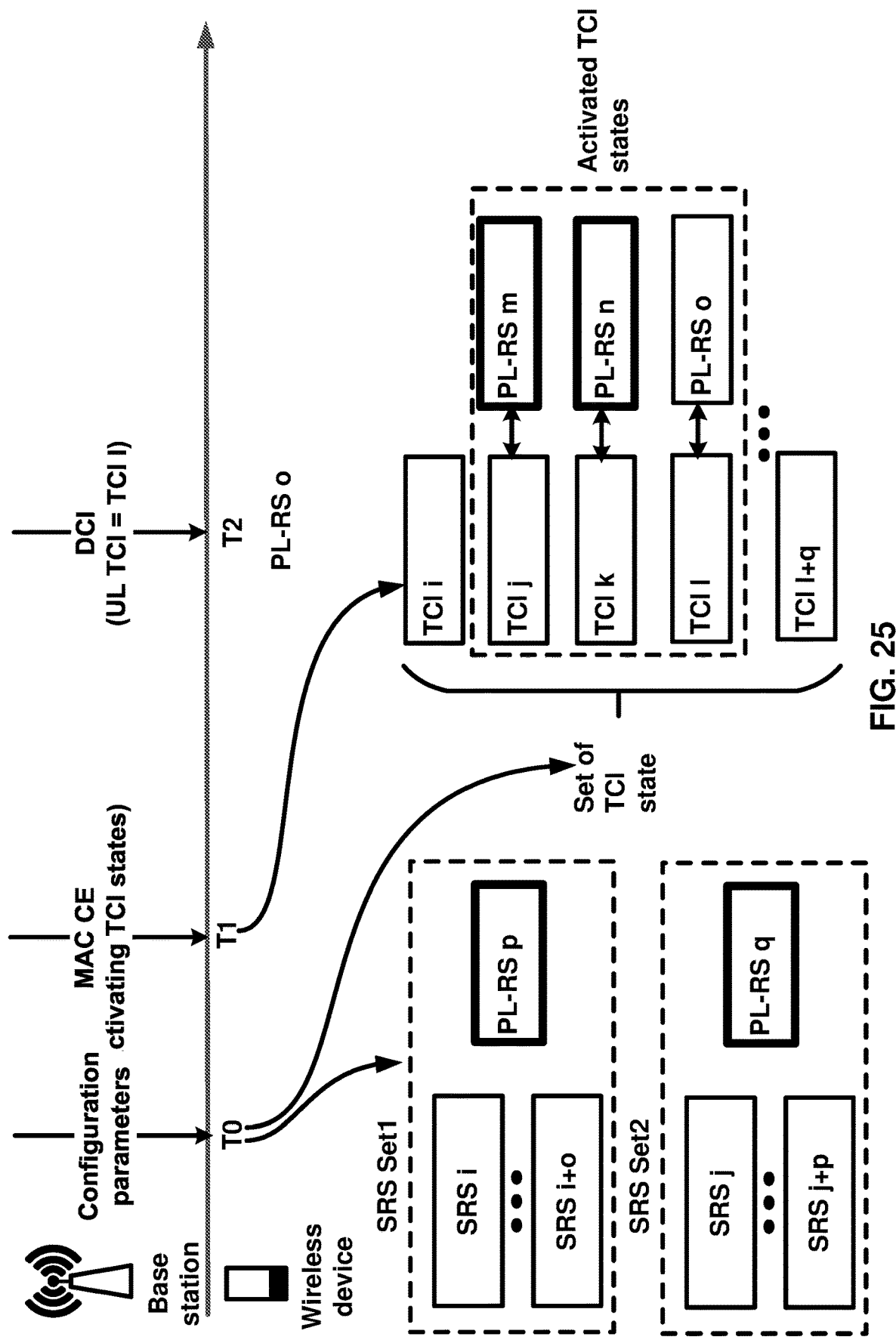
FIG. 25 illustrates a scenario of pathloss reference RSs activation as per an aspect of an example embodiment of the present disclosure.
Figure 26:
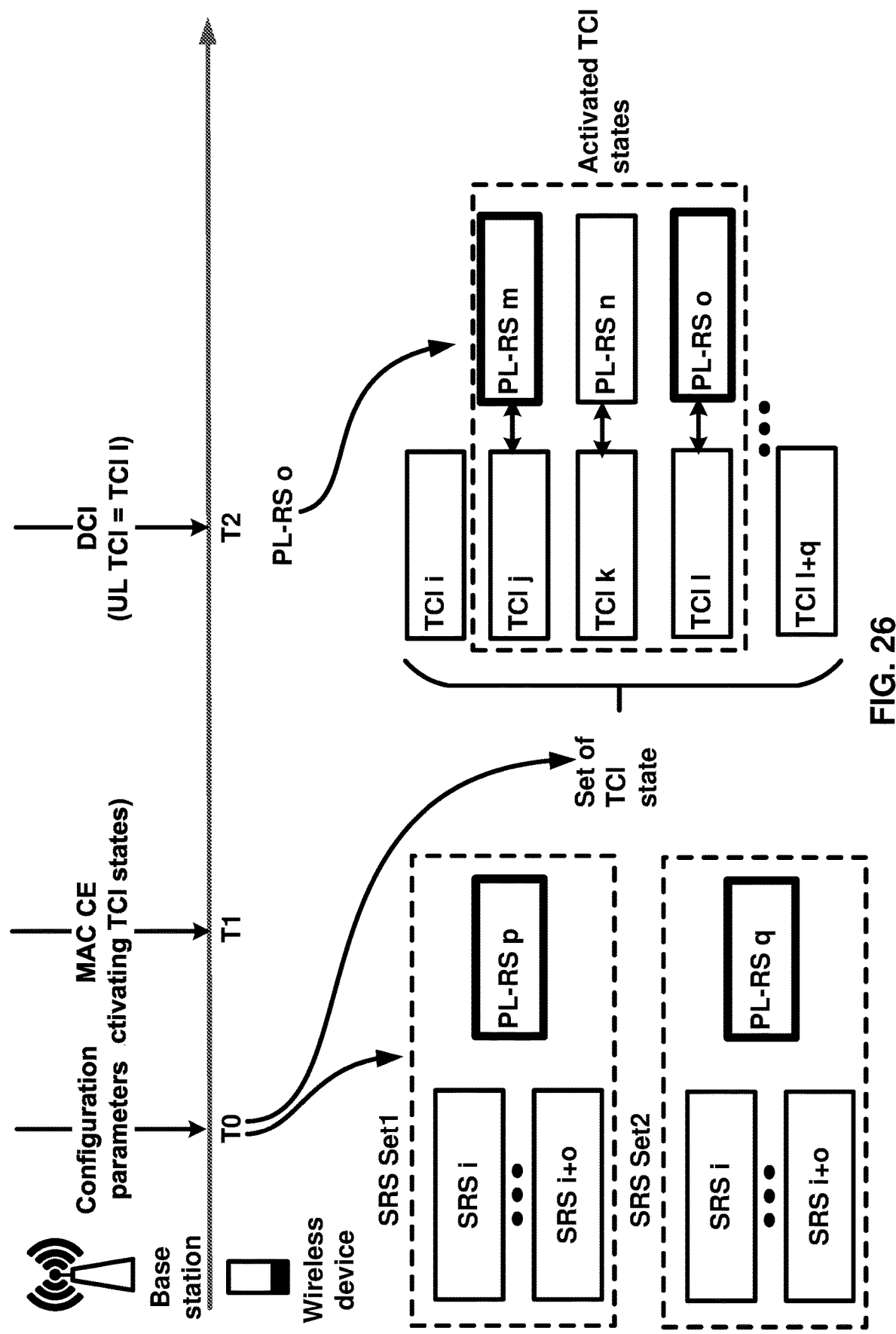
FIG. 26 illustrates a scenario of pathloss reference RSs activation as per an aspect of an example embodiment of the present disclosure.

FIG. 25-26 shows an example of determining one or more active PL-RSs based on an update of an UL TCI of a coreset pool of an uplink carrier/cell. For example, FIG. 25-26 illustrate an example scenario that is similar to FIG. 23 except that the wireless device is also configured with a second SRS resource set for the coreset pool of the uplink carrier/cell at the first time (T0). The second SRS resource set comprises a fifth PL-RS (PL-RS q).

In FIG. 25, the wireless device may determine a second TCI state (e.g., TCI j) as the UL TCI of the coreset pool of the uplink carrier/cell based on a lowest index of the second TCI state at the time T1+P. The wireless device may determine a first PL-RS (PL-RS m) configured with or associated with the second TCI state as an active PL-RS. The wireless device may determine a transmission power of an uplink signal with the UL TCI based on the first PL-RS. The wireless device may determine the first PL-RS as a default PL-RS. The wireless device may determine the first PL-RS as first active PL-RS. The wireless device may determine a fourth PL-RS (PL-RS p) and the fifth PL-RS (PL-RS q) as active PL-RSs. The wireless device may prioritize one or more second PL-RSs associated with one or more SRS resource sets than one or more first PL-RSs associated with or configured with one or more activated TCI states.

The wireless device may determine a second PL-RS (PL-RS n) as last active PL-RS based on a capability of the wireless device. For example, the capability of the wireless device is four (4). The wireless device may determine the second PL-RS as fourth active PL-RS based on ordering and the capability of the wireless device.

In FIG. 26, the wireless device receives a DCI indicating to update the UL TCI to a fourth TCI state (TCI 1). The fourth TCI state may be configured with or associated with a third PL-RS (PL-RS o). The wireless device may update the default PL-RS by the third PL-RS in response to updating the UL TCI.

The wireless device may determine to activate the third PL-RS with a highest priority. The wireless device may determine to keep activated the fourth PL-RS (PL-RS p) and the fifth PL-RS (PL-RS q). The wireless device may determine to keep activated the first PL-RS (PL-RS m) based on a lowest index. The wireless device may deactivate the second PL-RS (PL-RS n) as a number of active PL-RSs being equal to the capability of the wireless device. The wireless device may determine one or more PL-RSs of a set of PL-RSs based on indexes of the one or more TCI states or based on indexes of the set of PL-RSs. The set of PL-RSs comprise a PL-RS associated with any of the one or more TCI states. The one or more PL-RSs refer a PL-RS activated and being associated with a TCI state of the one or more TCI states.

The wireless device may maintain, for a coreset pool/panel of an uplink carrier/cell, activated PL-RSs based on ordering of (1) a PL-RS associated with or configured with an UL TCI, for example, the PL-RS may be a default PL-RS; (2) one or more second PL-RSs configured with or associated with or activated for one or more SRS resource sets. For example, one or more MAC CEs may activate the one or more second PL-RSs; (3) one or more first PL-RSs configured with or associated with or activated for one or more activated TCI states. For example, one or more MAC CEs may activate the one or more activated TCI states.

For example, in FIG. 25, based on the one or more rules, PL-RS m, PL-RS p, PL-RS q and PL-RS n are activated. In FIG. 26, PL-RS o, PL-RS p, PL-RS q and PL-RS m are activated.

Example embodiments may reduce a complexity of a wireless device by keeping a number of activated PL-RS.

In an example, a wireless device may determine a default PL-RS of a coreset pool/panel of an uplink carrier/cell based on a SSB accessed for reading a MIB (in a most recent time) or a second SSB accessed during a most recent random access procedure at least until the wireless device is configured with a set of TCI states or until the wireless device is configured with a set of PL-RSs or a PL-RS.

For example, in FIG. 26, the wireless device may determine a default PL-RS before the first time (T0) based on the SSB for reading the MIB or the second SSB accessed/used during the most recent random access procedure (e.g., the second SSB is qcl-ed with a preamble of the random access procedure or qcl-ed with a RAR coreset (e.g., Type1-PDCCH CSS set configured by ra-SearchSpace in PDCCH-ConfigCommon for a DCI format with CRC scrambled by a RA-RNTI, a MsgB-RNTI, or a TC-RNTI on the primary cell) or qcl-ed with a coreset to receive a Msg 4/MsgB or qcl-ed with a third SSB/CSI-RS indicated by a Msg 3/msgA or qcl-ed with a PUCCH for HARQ-ACK feedback corresponding to Msg 4/MsgB, and so on).

The wireless device may determine a default PL-RS after T0 based on the one or more rules addressed in this specification.

The wireless device may determine a default PL-RS after T1 based on the one or more rules addressed in this specification.

The wireless device may determine a default PL-RS after T2, in response to an UL TCI not comprising a PL-RS, based on the one or more rules addressed in this specification.

The default PL-RS may be used to determine a transmission power for an uplink signal via the coreset pool/panel of the uplink carrier/cell based on the UL TCI. The UL TCI may be determined based on one or more TCI rules (e.g., a lowest indexed TCI of a set of TCI states between T0 and T1+P, a lowest indexed TCI of one or more activated TCI state between T1+P and T2+Q, an indicated TCI state after T2+Q).

The wireless device may determine a default SRS PL-RS of an SRS resource set, of the coreset pool/panel of the uplink carrier/cell, before the first time (T0) based on the SSB for reading the MIB or the second SSB accessed/used during the most recent random access procedure.

The wireless device may determine a default SRS PL-RS of the SRS resource set after T0 based on the one or more rules addressed in this specification, in response to a SRS resource set not comprising a PL-RS.

The wireless device may determine a default SRS PL-RS after T1 based on the one or more rules addressed in this specification, in response to the SRS resource set not being associated with a PL-RS. For example, one or more MAC CE may not activate a PL-RS for the one or more activated TCI states.

The wireless device may determine a default SRS PL-RS after T2, in response to the SRS resource set not being associated with a PL-RS, based on the one or more rules addressed in this specification. For example, one or more DCIs may not activate a PL-RS for the one or more activated TCI states. In an example, the default SRS PL-RS may be same as the default PL-RS. In an example, the default SRS PL-RS may be same as a PL-RS associated with a current UL-TCI of the coreset pool of the uplink carrier/cell.

The default SRS PL-RS may be used to determine a transmission power for an uplink signal via an SRS resource of the SRS resource set based on a TCI state. For example, the TCI state may be associated/configured with the SRS resource. For example, the SRS resource set is configured with a usage of a beam management.

Example embodiments may allow a wireless device to update a PL-RS based on different cases.

In an example, a wireless device may receive a DCI indicating a TCI state for an UL TCI of a coreset pool/panel of an uplink carrier/cell. The wireless device may update the UL TCI to the TCI state. The TCI state may be activated as a current UL TCI of the coreset pool/panel of the uplink carrier/cell. When there is a single coreset pool for the uplink carrier/cell, the UL TCI is a common uplink beam for the uplink carrier/cell.

The wireless device may determine a PL-RS associated with or configured with the TCI state as a new PL-RS for one or more uplink signals/channels based on the UL TCI. For example, when the new PL-RS is one of one or more activated PL-RSs, the wireless device may use the new PL-RS in response to receiving the DCI. For example, when the new PL-RS is one of the one or more activated PL-RSs, the wireless device may use the new PL-RS no later than or after T+d where T is a time when the wireless device receives the DCI and d is a latency to apply/update the TCI state for the UL TCI state. The one or more activated PL-RSs may comprise PL-RS(s) that the wireless device maintains for pathloss estimation for uplink signals/channels. The wireless device may determine the one or more activated PL-RSs based on the pathloss estimation. The wireless device may determine the one or more activated PL-RSs based on one or more MAC CEs indicating activations of the one or more PL-RSs. The wireless device may determine one or more second PL-RSs configured by a RRC signaling as the one or more activated PL-RSs in response to the number of the one or more second PL-RSs being smaller than or equal to a capability of the wireless device (e.g., four). For example, d is k1+offset where k1 is a gap between T and a second time when the wireless device transmits a HARQ-ACK feedback corresponding to the DCI. Offset may refer a processing delay for updating/applying the indicated TCI state for the UL TCI. For example, d is the processing time (e.g., the offset).

For example, the wireless device may use the new PL-RS no later than or after T+d+k*slots/subframes/milli-seconds based on a numerology of the uplink carrier/cell. k may be a constant number (e.g., 3). For example, d may be determined based on the processing time and/or a HARQ-ACK timing (e.g., k1). For example, the wireless device may use the new PL-RS no later than T+d+k1*slots/subframes/milli-seconds where k1 is configured with the new PL-RS. For example, a RRC may indicate parameters of the new PL-RS. The parameters may comprise a value of k1 that is a processing time for the new PL-RS. For a first PL-RS and a second PL-RS, different values of k1 may be configured (e.g., a first k1 for the first PL-RS, a second k1 for the second PL-RS). This may be applied when the new PL-RS may not be one of the one or more activated PL-RSs (e.g., the one or more activated PL-RSs does not comprise the new PL-RS).

For example, the wireless device may use the new PL-RS no later than or after T+d+(k3 milli-seconds+k2*periodicity) where k3 may be a predetermined value (e.g., five) and k2 is a second predetermined value (e.g., 5) and periodicity is a periodicity of the new PL-RS transmission. For example, the wireless device may determine a slot where the wireless device may start to use the new PL-RS no later than or after T_slot+d_in_slot+(k3 milli-seconds+k2*periodicity)/slot duration (when the one or more activated PL-RSs does not comprise the new PL-RS) or T_slot+d_in_slot+(k*slots/subframes/milli-seconds)/slot. For example, T_slot is a first slot when the wireless device receives the DCI. d_in_slot is a number of slots of the latency to apply/update the TCI state for the UL TCI state.

In an example, the new PL-RS may not be one of the one or more activated PL-RSs. The wireless device may determine the new PL-RS as invalid PL-RS in response to the one or more activated PL-RSs not comprising the new PL-RS. In an example, the wireless device may activate the new PL-RS. In that case, the wireless device may use the new PL-RS no later than T+d+k*slots/subframes/milli-seconds based on a numerology of the uplink carrier/cell.

The wireless device may deactivate one of the one or more activated PL-RSs in response to activating the new PL-RS when a number of union/sum of the new PL-RS and the one or more activated PL-RS exceeding a capability of the wireless device (e.g., >=4).

In an example, a wireless device may determine a pathloss reference signal of an uplink carrier/cell independently from an UL TCI of the uplink carrier/cell. The wireless device may receive one or more RRC messages indicating a set of PL-RSs. The wireless device may receive one or more MAC CEs activating one or more PL-RSs of the set of PL-RS s. For example, the one or more MAC CEs may activate up to K (e.g., K=4) PL-RSs of the set of PL-RSs. The wireless device may receive one or more second MAC CEs or one or more DCIs associating/mapping/corresponding a new PL-RS of the one or more PL-RSs to an UL TCI of an uplink carrier/cell. For example, the UL TCI may be an uplink common beam of the uplink carrier/cell. For example, the new PL-RS may be indicated via a DCI. The DCI may comprise a first field indicating the UL TCI and a second field indicating the PL-RS. The DCI may comprise one of the first field or the second field. For example, the PL-RS may be indicated via a MAC CE. The MAC CE may comprise/indicate the PL-RS and the UL TCI. For example, the MAC CE may comprise one or more pairs of {an active TCI state, a PL-RS}.

For example, the wireless device may use the new PL-RS no later than T+d+k*slots/subframes/milli-seconds based on a numerology of the uplink carrier/cell. k may be a constant number (e.g., 3). For example, d may be determined based on the processing time and/or a HARQ-ACK timing (e.g., k1).

In an example, the new PL-RS may not be one of the one or more PL-RSs activated by the one or more MAC CEs. The wireless device may determine the new PL-RS as invalid PL-RS in response to the one or more activated PL-RSs not comprising the new PL-RS. In an example, the wireless device may activate the new PL-RS. In that case, the wireless device may use the new PL-RS no later than T+d+k*slots/subframes/milli-seconds based on a numerology of the uplink carrier/cell.

In an example, a base station may configure/associate a pathloss reference RS to a TCI state for the TCI state that has been activated. For example, the base station may activate the TCI state via one or more MAC CEs. The base station may indicate the pathloss RS for the TCI state via the one or more MAC CEs.

The wireless device may determine a default PL-RS before applying the PL-RS associated with the UL-TCI. For example, the wireless device may apply the default PL-RS until a time when the wireless device updates/applies the UL TCI and/or updates/applies the PL-RS of the UL TCI. For example, the wireless device may determine the default PL-RS that is a lowest indexed PL-RS among the set of PL-RSs. For example, the wireless device may determine the default PL-RS that is a lowest indexed PL-RS of the one or more PL-RSs.

Example embodiments may reduce a complexity of the wireless device.

In an example, a wireless device may determine a default PL-RS for a coreset pool/panel of an uplink carrier/cell. The wireless device may determine a transmission power of an uplink signal based on the default PL-RS, where the uplink signal is transmitted via the coreset pool/panel of the uplink carrier/cell. For example, when the wireless device is not configured with any coreset pool for the uplink cell/carrier, the wireless device may assume a first coreset pool for the uplink cell/carrier. For example, when the wireless device is equipped with or configured with a single panel, the panel of the uplink carrier/cell is determined for the default PL-RS.

When the wireless device is configured with a plurality of coreset pools or a plurality of panels for the uplink cell/carrier, the wireless device may determine a respective default PL-RS for each of the plurality of coreset pools or each of the plurality of panels for the uplink cell/carrier.

The wireless device may determine the default PL-RS based on a UL TCI. The UL TCI may be a common uplink beam, a UL TCI state, a uplink common beam, a DL/UL common beam, and/or a common beam. The UL TCI may be used for one or more uplink signals/channels via the coreset pool/panel of the uplink cell/carrier. The wireless device may determine spatial domain filter parameters for the one or more uplink signals/channels based on the UL TCI. The uplink signals/channels may comprise data via PUSCH, control via PUCCH and/or SRS transmissions.

The wireless device may use the default PL-RS for determining transmission power(s) of one or more SRS transmissions via one or more SRS resources of an SRS resource set. For example, the SRS resource set may be configured with a usage of a beam management. For example, the SRS resource may be configured with a usage of a codebook or a non-codebook or an antenna switching. The wireless device may transmit the one or more SRS transmissions via the coreset pool/panel of the uplink cell/carrier.

The wireless device may receive one or more RRC messages, MAC-CEs, and/or DCIs indicating the default PL-RS. For example, the base station may configure the default PL-RS for the coreset pool/panel of the uplink carrier/cell.

For example, the base station may activate the default PL-RS via a MAC-CE indicating an association of the default PL-RS to the UL TCI. For example, the base station may activate the default PL-RS via a MAC CE.

For example, the base station may activate the default PL-RS via a DCI indicating the UL TCI and the default PL-RS. For example, the base station may activate/update the default PL-RS by a new PL-RS via a second DCI indicating the new PL-RS.

The wireless device may maintain a single active PL-RS for the coreset pool/panel of the uplink cell/carrier.

Example embodiments may reduce a complexity of a wireless device.

Figure 27:
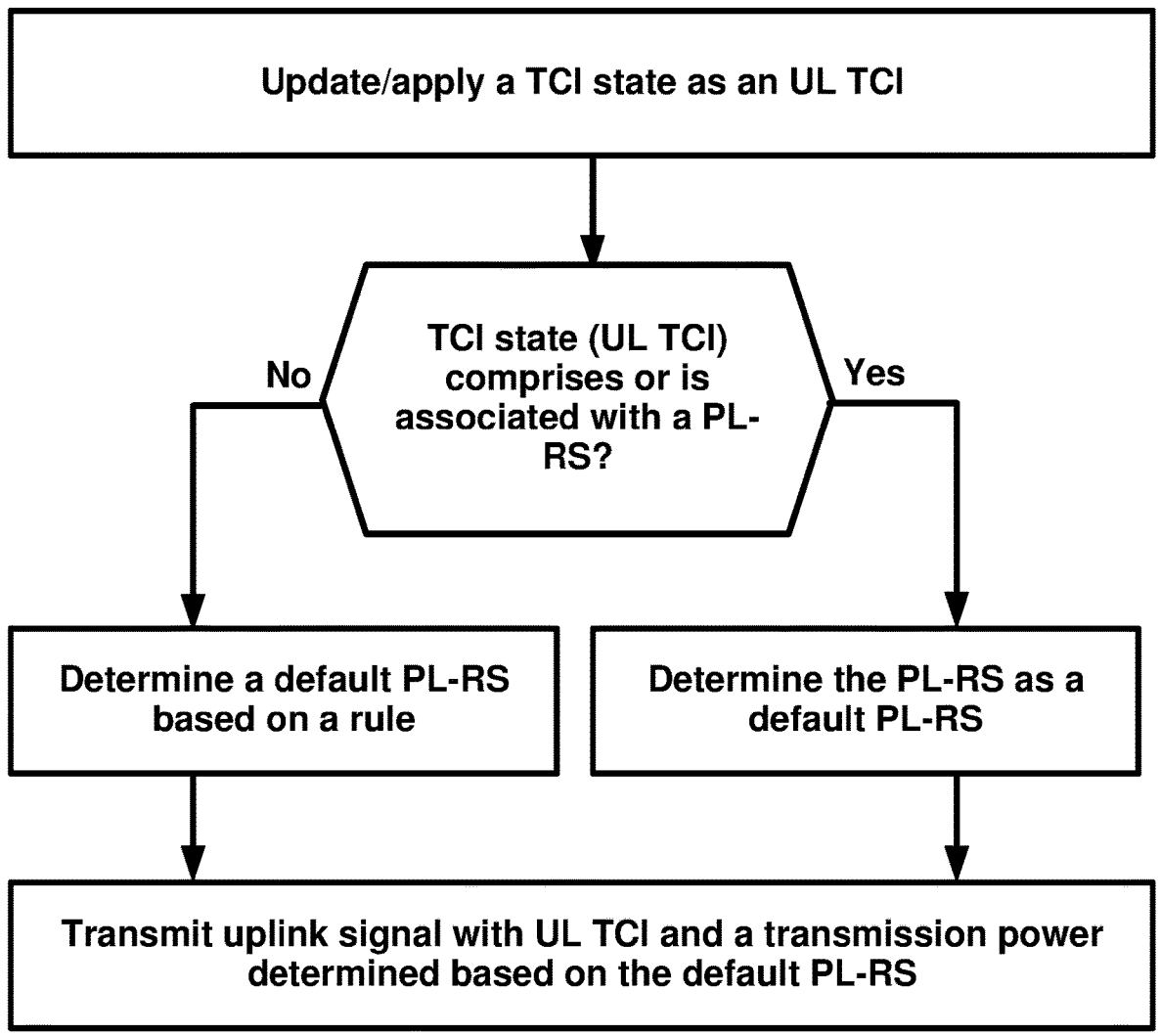
FIG. 27 illustrates a flow diagram as per an aspect of an example embodiment of the present disclosure.

FIG. 27 illustrates a flow diagram as per an aspect of an example embodiment of the present disclosure. The flow diagram may illustrate a procedure to determine or update a pathloss reference RS (PL-RS) of a coreset pool/panel of an uplink carrier/cell, when a wireless device is configured with or enabled with a second TCI indication mechanism (e.g., a common beam update mechanism). For example, when a joint DL/UL TCI indication mechanism is used (e.g., a common beam is shared between downlink of a cell and uplink carrier of the cell), an UL TCI (e.g., an uplink common beam) and a DL TCI (e.g., a downlink common beam) are same. For example, when an independent DL/UL TCI indication mechanism is used (e.g., an uplink common beam and a downlink common beam may be separately/independently updated/indicated for an uplink carrier of a cell and a downlink carrier of the cell), an UL TCI of the uplink carrier may be different from an DL TCI of the downlink carrier.

The wireless device may determine or update or apply an UL TCI by a TCI state. For example, the wireless device may determine the UL TCI in response to receiving one or more RRC messages indicating a set of TCI states for a coreset pool/panel of the uplink carrier/cell. For example, the coreset pool/panel may be assumed as a first coreset pool/panel in response to the uplink carrier/cell being configured with a single coreset pool or a single panel or not being configured with any coreset pool.

The TCI state may be a lowest indexed TCI state of the set of TCI states. The wireless device may determine the TCI state based on one or more first rules to determine a default UL TCI. For example, the default UL TCI may refer a TCI state that defines the UL TCI based on the one or more first rules. The base station may update the UL TCI based on one or more MAC CEs and/or one or more DCIs.

In an example, the wireless device may determine a default UL TCI or an UL TCI based on the set of TCI states in response to receiving the one or more RRC messages based on the one or more first rules. For example, one of the one or more firsts rule is to select a second TCI state of the set of TCI states, wherein the second TCI is a lowest indexed TCI state of one or more third TCI states of the set of TCI states, where each of the one or more third TCI states is associated with or configured with a respective PL-RS. For example, another of the one or more first rules is to select a third TCI state of the set of TCI states, where the third TCI is a lowest indexed TCI state of the set of TCI states.

The wireless device may receive one or more MAC CEs activating one or more TCI states of the set of TCI states. The wireless device may activate the one or more TCI states in response to the one or more MAC CEs. The wireless device may determine a second TCI state of the one or more TCI states, where the second TCI is a lowest indexed TCI state of the one or more TCI states. For example, the wireless device may determine a third TCI state of one or more second TCI states of the one or more TCI states, where each of the one or more second TCI states is associated/linked with or configured with a respective PL-RS and the third TCI state is a lowest indexed TCI state of the one or more second TCI states.

Various and different examples of the one or more first rules are not precluded.

The wireless device may receive a DCI indicating the TCI state as the UL TCI. The wireless device may update the UL TCI by the TCI state based on the DCI.

The wireless device may determine whether the TCI state, which is used/defined for the UL TCI, is associated with a PL-RS or comprises the PL-RS. For example, the TCI state is associated with the PL-RS in response to parameters of the TCI state comprising the PL-RS or comprising an index of the PL-RS. For example, the TCI state is associated with the PL-RS in response to receiving one or more second MAC CEs indicating a mapping between the PL-RS and the TCI state. For example, the TCI state is associated with the PL-RS in response to receiving one or more DCIs indicating a mapping between the PL-RS and the TCI state.

In response to the determining that the TCI state comprising the PL-RS or the TCI state being associated with the PL-RS, the wireless device may determine a default PL-RS based on the TCI state. For example, the wireless device may determine the PL-RS as the default PL-RS. For example, the wireless device may use the PL-RS for one or more uplink signals/channels based on the UL TCI of the TCI state.

In response to determining that the TCI state not comprising the PL-RS nor the TCI state not being associated with the PL-RS, the wireless device may determine the default PL-RS based on a rule.

For example, the wireless device may determine a lowest indexed TCI state of one or more first TCI states of the set of TCI states. Each of the one or more first TCI states comprises or is associated with a respective PL-RS. The wireless device may determine a second PL-RS, which is associated with or configured for the lowest indexed TCI state, as the default PL-RS.

For example, the wireless device may determine a lowest indexed TCI state of one or more second TCI states of the one or more TCI states, where each of the one or more second TCI states comprises or is associated with a respective PL-RS. The wireless device may determine a second PL-RS, which is associated with or configured for the lowest indexed TCI state, as the default PL-RS.

For example, the wireless device may determine a second PL-RS, of a SRS resource set of the coreset pool/panel of the uplink cell/carrier, as the default PL-RS. For example, when the wireless device may be configured with a plurality of SRS resource sets for the coreset pool/panel of the uplink cell/carrier, the wireless device may determine a lowest indexed SRS resource sets of the plurality of SRS resource sets. The SRS resource set may comprise an index of the second PL-RS or the comprise the second PL-RS.

For example, the wireless device may determine a SSB as the default PL-RS, where the wireless device uses the SSB to access a MIB in a most recent time.

For example, the wireless device may determine a SSB as the default PL-RS, where the wireless device may be based on the SSB for a most recent random access procedure.

The wireless device may determine a transmission power of an uplink signal, via the coreset pool/panel of the uplink cell/carrier, based on the default PL-RS. The wireless device may transmit the uplink signal with the UL TCI and the transmission power.

The PL-RS may be one of SSB or CSI-RS. The TCI state may comprise or be associated with the PL-RS in response to a reference signal (e.g., based on a qcl-TypeD) of the TCI state being either a SSB or a CSI-RS.

The TCI state may not comprise or may not be associated with the PL-RS in response to the reference signal of the TCI state being an SRS.

In an example, a wireless device may assume or may expect to be configured with a PL-RS for a TCI state, wherein a reference signal of the TCI state being an SRS. The reference signal is for a qcl-TypeD of the TCI state.

Example embodiments may allow to determine a default PL-RS when a UL TCI may not have an associated with a PL-RS.

Figure 28:
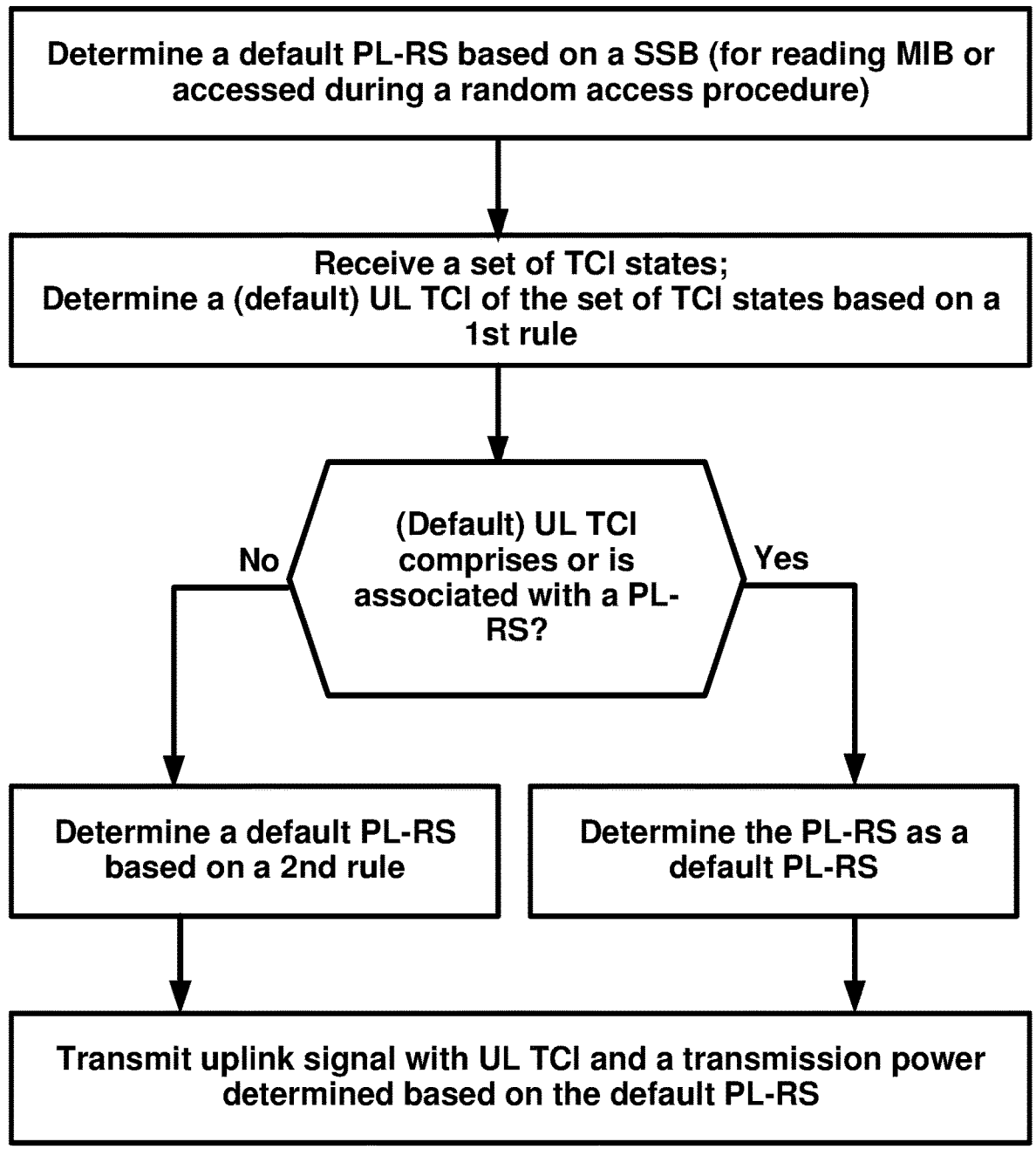
FIG. 28 illustrates a flow diagram as per an aspect of an example embodiment of the present disclosure.

FIG. 28 illustrates a flow diagram as per an aspect of an example embodiment of the present disclosure. The wireless device may receive, at a first time, one or more RRC messages indicating a set of TCI states for a coreset pool/panel of an uplink carrier/cell. Before configured with the set of the TCI states, the wireless device may determine a SSB accessed during an initial access as a common uplink beam or an UL TCI of the coreset pool/panel of the uplink carrier/cell.

The wireless device may determine a default PL-RS, before the first time, based on a first SSB. The wireless device may determine transmission power(s) of one or more uplink signals, before the first time, based on the default PL-RS based on the first SSB.

For example, the first SSB may be a SSB that the wireless device has accessed or used for reading a MIB in a most recent time. For example, the first SSB may be a SSB that the wireless device has accessed or used during a most recent random access procedure. For example, the SSB is a SSB for determining a preamble of the most recent random access procedure. For example, the SSB is a SSB for determining spatial domain filter parameter for a Msg 3/MsgA. For example, the SSB is a SSB of a coreset for receiving a RAR during the most recent road access procedure. For example, the SSB is a SSB of a second coreset for receiving a Msg 4/MsgB during the most recent random access procedure.

After receiving the set of TCI states, the wireless device may determine or update the UL TCI state based on the set of TCI states and/or the first SSB.

The wireless device may update or determine the default PL-RS based on the UL TCI.

The wireless device may determine whether a TCI state, which is used/defined for the UL TCI, is associated with a PL-RS or comprises the PL-RS. For example, the TCI state is associated with the PL-RS in response to parameters of the TCI state comprising the PL-RS or comprising an index of the PL-RS. For example, the TCI state is associated with the PL-RS in response to receiving one or more second MAC CEs indicating a mapping between the PL-RS and the TCI state. For example, the TCI state is associated with the PL-RS in response to receiving one or more DCIs indicating a mapping between the PL-RS and the TCI state.

In response to the determining that the TCI state comprising the PL-RS or the TCI state being associated with the PL-RS, the wireless device may determine a default PL-RS based on the TCI state. For example, the wireless device may determine the PL-RS as the default PL-RS. For example, the wireless device may use the PL-RS for one or more uplink signals/channels based on the UL TCI of the TCI state.

In response to determining that the TCI state not comprising the PL-RS nor the TCI state not being associated with the PL-RS, the wireless device may determine the default PL-RS based on a rule mentioned in the specification.

Example embodiments may determine a default PL-RS when a UL TCI has not been established or configured or indicated.

Figure 29:
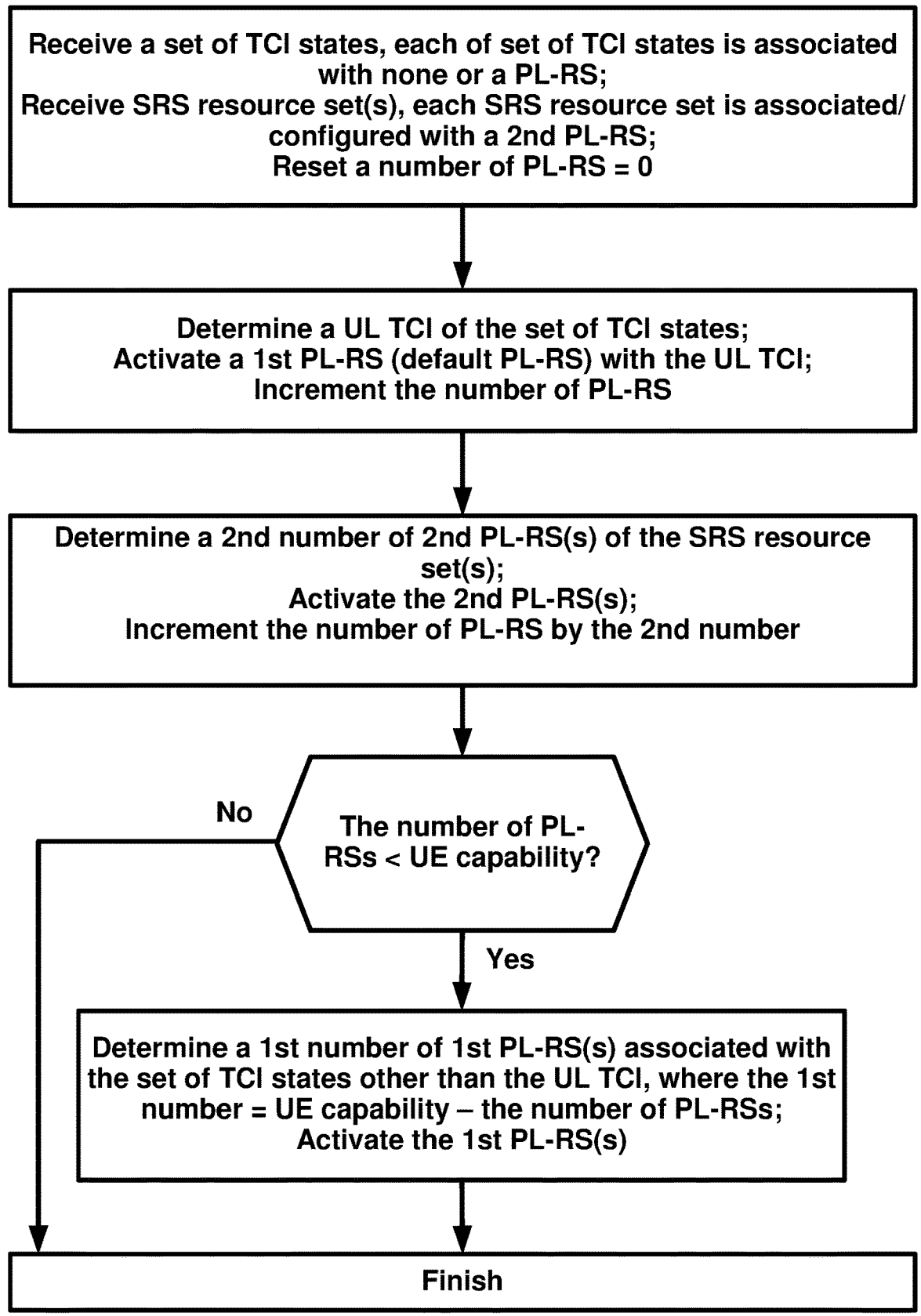
FIG. 29 illustrates a flow diagram as per an aspect of an example embodiment of the present disclosure.

FIG. 29 illustrates a flow diagram as per an aspect of an example embodiment of the present disclosure.

The wireless device may receive a set of TCI states. For example, each of the set of TCI states may be associated with or configured with at most one pathloss reference signal (PL-RS). Some of the set of TCI states may not be associated with any PL-RS. The wireless device may determine a TCI state of the set of TCI states as an UL TCI. The wireless device may receive one or more MAC CEs activating one or more TCI states of the set of TCI states. The wireless device may update or determine a second TCI state of the one or more TCI states as the UL TCI.

The wireless device may determine a first PL-RS as a default PL-RS of the UL TCI based on a rule addressed in the specification. For example, the first PL-RS is a PL-RS configured for or associated with the UL TCI. For example, the first PL-RS is a PL-RS determined based on the rule.

The wireless device may activate the first PL-RS. The wireless device may set a number of activated PL-RS to one.

The wireless device may determine one or more second PL-RSs of one or more SRS resource sets of the coreset pool/panel of the uplink cell/carrier. The wireless device may activate the one or more second PL-RSs. The wireless device may increment the number of activated PL-RSs by a number of the one or more second PL-RSs.

When the number of the activated PL-RSs is less than a capability of the wireless device, the wireless device may determine a first number of PL-RSs associated with the one or more TCI states. For example, the first number may be derived based on the capability of the wireless device subtracted by the number of activated PL-RSs. The wireless device may activate the one or more first PL-RSs. The wireless device may determine the one or more first PL-RSs based on a second rule in the specification.

The wireless device may determine to activate one or more PL-RSs based on a priority A PL-RS of a default PL-RS or configured for or associated with an UL TCI has a highest priority. One or more PL-RSs configured for one or more SRS resource sets has a second highest priority. One or more second PL-RSs configured for or associated with one or more activated TCI states has a next priority.

Example embodiments may reduce a complexity of a wireless device.

In an example, a wireless device may determine an uplink transmission configuration indicator (TCI) state (UL TCI) of an uplink carrier. Based on the UL TCI of the uplink carrier, the wireless device may determine spatial domain filter parameters of uplink signals via a plurality of uplink channels and the uplink carrier. The wireless device may determine a pathloss reference signal (PL-RS) based on a first PL-RS of the uplink TCI state, in response to the first PL-RS being associated with the uplink TCI state of the UL TCI.

The wireless device may determine the PL-RS based on a second PL-RS of a second TCI state in response to the uplink TCI state not being associated with any PL-RS. The wireless device may determine a transmission power, of an uplink signal of the uplink signals, based on the PL-RS. The wireless device may transmit the uplink signal, via the uplink carrier, with the transmission power and the UL TCI.

According to an example embodiment, the wireless device may receive one or more radio resource control (RRC) messages for the uplink carrier. The one or more RRC messages may indicate a set of TCI states comprising the uplink TCI state and the second TCI state. The index of the second TCI state may be a lowest among one or more TCI states of the set of TCI states. For example, each of the one or more TCI states may be associated with a respective PL-RS.

According to an example embodiment, the wireless device may receive one or more medium access control control element (MAC CE) messages. The one or more MAC CE messages may indicate an activation of one or more active TCI states of the set of TCI states. The one or more active TCI states may comprise the uplink TCI state and the second TCI state. An index of the second TCI may be a lowest among one or more second TCI states of the one or more active TCI states. Each of the one or more second TCI states may be associated with a respective PL-RS.

According to an example embodiment, the wireless device may determine the UL TCI based on a lowest indexed TCI state of the set of TCI states in response to the receiving the one or more RRC messages. The wireless device may update or determine the UL TCI based on a lowest indexed TCI state of the one or more active TCI states in response to the receiving the one or more MAC CE messages. The wireless device may receive a downlink control information (DCI) indicating a third TCI state, of the one or more active TCI state, as the UL TCI. The wireless device may update the UL TCI by/based on the third TCI state in response to the receiving the DCI.

According to an example embodiment, a PL-RS is either a SSB or a CSI-RS.

According to an example embodiment, the wireless device may determine that the first PL-RS may be associated with the uplink TCI state in response to the uplink TCI state comprises an index of the first PL-RS. The wireless device may determine that the first PL-RS may be associated with the uplink TCI state in response to the uplink TCI state comprising the first PL-RS. The wireless device may determine that the first PL-RS may be associated with the uplink TCI state in response to receiving one or more second MAC CEs and/or DCIs indicating a mapping between the uplink TCI state and the first PL-RS. The wireless device may determine that the first PL-RS may be associated with the uplink TCI state in response to a reference signal of the uplink TCI state being a first SSB or a first CSI-RS. The wireless device may determine that the first PL-RS may be associated with the uplink TCI state in response to the uplink TCI state being a second SSB or a second CSI-RS. For example, the uplink TCI state may be associated with the first PL-RS in response to the first PL-RS being associated with the uplink TCI state. For example, the uplink TCI state may not be associated with the first PL-Rs in response to the reference signal of the uplink TCI state is a sounding reference signal (SRS). The uplink TCI state may not be associated with the first PL-Rs in response to the first PL-RS not being associated with the uplink TCI state.

According to an example embodiment, the wireless device may determine that the second PL-RS may be associated with the second TCI state in response to the second TCI state comprises an index of the second PL-RS. The wireless device may determine that the second PL-RS may be associated with the second TCI state in response to the second TCI state comprising the second PL-RS. The wireless device may determine that the second PL-RS may be associated with the second TCI state in response to receiving one or more second MAC CEs and/or DCIs indicating a mapping between the second TCI state and the second PL-RS. The wireless device may determine that the second PL-RS may be associated with the second TCI state in response to a reference signal of the second TCI state being a first SSB or a first CSI-RS. The wireless device may determine that the second PL-RS may be associated with the second TCI state in response to the second TCI state being a second SSB or a second CSI-RS. For example, the second TCI state may be associated with the second PL-RS in response to the second PL-RS being associated with the second TCI state. For example, the second TCI state may not be associated with the second PL-Rs in response to the reference signal of the uplink TCI state is a sounding reference signal (SRS). The second TCI state may not be associated with the second PL-Rs in response to the second PL-RS not being associated with the second TCI state.

According to an example embodiment, the second TCI state may be a TCI state of an SRS resource of a SRS resource set. The second TCI may be a synchronization signal and physical broadcast channel block (SSB) that is used for accessing a master information block in a most recent time.

In an example, a wireless device may receive one or more radio resource control (RRC) messages. The one or more RRC messages may indicate a set of transmission configuration indicator (TCI) states of a cell at a first time. The set of TCI states may comprise an uplink TCI state and a second TCI state. Before the first time, the wireless device may determine a default pathloss reference signal (PL-RS) based on a synchronization signal and physical broadcast channel block (SSB) of the cell. The wireless device may transmit one or more uplink signal with transmission powers determined based on the default PL-RS at least until the first time. After the first time, the wireless device may update the default PL-RS based on a first PL-RS associated with the uplink TCI state in response to the uplink TCI state being associated with the first PL-RS. The wireless device may update the default PL-RS based on a second PL-RS associated with the second TCI state in response to the uplink TCI state not being associated with the first PL-RS. The wireless device may transmit one or more second uplink signals with second transmission powers determined based on the default PL-RS after the first time.

According to an example embodiment, a PL-RS is either a SSB or a CSI-RS.

According to an example embodiment, the wireless device may determine that the first PL-RS may be associated with the uplink TCI state in response to the uplink TCI state comprises an index of the first PL-RS. The wireless device may determine that the first PL-RS may be associated with the uplink TCI state in response to the uplink TCI state comprising the first PL-RS. The wireless device may determine that the first PL-RS may be associated with the uplink TCI state in response to receiving one or more second MAC CEs and/or DCIs indicating a mapping between the uplink TCI state and the first PL-RS. The wireless device may determine that the first PL-RS may be associated with the uplink TCI state in response to a reference signal of the uplink TCI state being a first SSB or a first CSI-RS. The wireless device may determine that the first PL-RS may be associated with the uplink TCI state in response to the uplink TCI state being a second SSB or a second CSI-RS. For example, the uplink TCI state may be associated with the first PL-RS in response to the first PL-RS being associated with the uplink TCI state. For example, the uplink TCI state may not be associated with the first PL-Rs in response to the reference signal of the uplink TCI state is a sounding reference signal (SRS). The uplink TCI state may not be associated with the first PL-Rs in response to the first PL-RS not being associated with the uplink TCI state.

According to an example embodiment, the wireless device may determine that the second PL-RS may be associated with the second TCI state in response to the second TCI state comprises an index of the second PL-RS. The wireless device may determine that the second PL-RS may be associated with the second TCI state in response to the second TCI state comprising the second PL-RS. The wireless device may determine that the second PL-RS may be associated with the second TCI state in response to receiving one or more second MAC CEs and/or DCIs indicating a mapping between the second TCI state and the second PL-RS. The wireless device may determine that the second PL-RS may be associated with the second TCI state in response to a reference signal of the second TCI state being a first SSB or a first CSI-RS. The wireless device may determine that the second PL-RS may be associated with the second TCI state in response to the second TCI state being a second SSB or a second CSI-RS. For example, the second TCI state may be associated with the second PL-RS in response to the second PL-RS being associated with the second TCI state. For example, the second TCI state may not be associated with the second PL-Rs in response to the reference signal of the uplink TCI state is a sounding reference signal (SRS). The second TCI state may not be associated with the second PL-Rs in response to the second PL-RS not being associated with the second TCI state.

According to an example embodiment, the second TCI state may be a TCI state of an SRS resource of a SRS resource set. The second TCI may be a synchronization signal and physical broadcast channel block (SSB) that is used for accessing a master information block in a most recent time.

According to an example embodiment, the SSB may be a fourth SSB that wireless device uses for reading a master information block. The SSB may be a fifth SSB that the wireless device uses for a most recent random access procedure. The wireless device may determine an UL TCI of the cell based on the SSB before the first time. The wireless device may update the UL TCI of the cell based on the uplink TCI state. The wireless device may determine the uplink TCI state of the set of TCI states. For example, an index of the uplink TCI state may be a lowest among the set of TCI states. The wireless device may determine the second TCI state of one or more TCI states of the set of TCI states. For example, each of the one or more TCI states may be associated with a respective PL-RS.

In an example, a wireless device may receive one or more radio resource control (RRC) messages. The one or more RRC messages may indicate a set of transmission configuration indicator (TCI) states of a cell. The set of TCI states may comprise an uplink TCI state. The one or more RRC messages may indicate one or more sounding reference signal (SRS) resource sets. For example, each SRS resource set may comprise a respective pathloss reference signal (PL-RS). The wireless device may receive a medium access control i element (MAC CE) indicating an activation of one or more TCI states of the set of TCI states. For example, the one or more TCI states may comprise the uplink TCI state. The wireless device may determine the uplink TCI state as a UL TCI of the cell. The wireless device activates a first PL-RS for the UL TCI. For example, the first PL-RS is a default PL-RS of the UL TCI. The wireless device may activate one or more first PL-RSs of the one or more SRS resource sets. The wireless device may activate one or more second PL-RSs associated with the one or more TCI states based on a capability of the wireless device supporting a number of active PL-RSs; and a first number of the one or more first PL-RSs.

According to an example embodiment, the capability of the wireless device may be four (4). The wireless device may determine a second number based on the capability of the wireless device and the first number. For example, the second number may be derived as the capability of the wireless device subtracted by the first number and one. A number of the one or more second PL-RSs may be the second number.

According to an example embodiment, the wireless device may determine the one or more second PL-RSs of one or more PL-RSs associated with the one or more TCI states based on one or more indexes of the one or more TCI states. The wireless device may determine the one or more second PL-RSs of one or more PL-RSs associated with the one or more TCI states based on one or more indexes of the one or more second PL-RSs. The wireless device may select lowest indexed TCI states, as one or more third PL-RSs associated with the lowest indexed TCI states as the one or more second PL-RSs, of the one or more TCI states until the number of the one or more second PL-RSs equals to the second number. The wireless device may select lowest indexed PL-RSs, as the one or more second PL-RSs, of the one or more PL-RSs until the number of the one or more second PL-RSs equals to the second number.

In an example, a wireless device may determine an uplink transmission configuration indicator (TCI) state (UL TCI) of an uplink carrier. The wireless device may determine, based on the UL TCI, spatial domain filter parameters of uplink signals via a plurality of uplink channels and the uplink carrier. The wireless device may determine a pathloss reference signal (PL-RS) based on a first PL-RS associated with the uplink TCI state in response to the uplink TCI state comprising a first reference signal (RS) and a second PL-RS associated with a second TCI state in response to the uplink TCI state comprising a second RS. The wireless device may determine a transmission power of an uplink signal, of the uplink signals, based on the PL-RS. The wireless device may transmit the uplink signal via the uplink carrier with the transmission power.

According to an example embodiment, the first RS may be a SSB or a channel state information (CSI) reference signal (RS) (CSI-RS). The second RS may be a sounding reference signal (SRS).

For example, the wireless device may activate the first PL-RS with a highest priority among the first PL-RS, the one or more first PL-RSs, and the one or more second PL-RSs. The wireless device may activate the one or more first PL-RSs with a next highest priority among the first PL-RS, the one or more first PL-RSs, and the one or more second PL-RSs. The wireless device may activate the one or more second PL-RSs with a lowest priority among the first PL-RS, the one or more first PL-RSs, and the one or more second PL-RSs. The wireless device may determine that one or more second PL-RSs are associated with the one or more TCI states based on a second PL-RS of the one or more second PL-RSs is associated with a TCI state of the one or more TCI states.

In an example, a wireless device may receive a downlink control information (DCI), for a cell at a first time. The DCI may comprise a first field indicating a transmission configuration indicator (TCI) state for an UL TCI and a second field indicating a pathloss reference signal (PL-RS) for the UL TCI. The wireless device may determine a processing time for the PL-RS based on a first processing time in response to one or more active PL-RSs comprising the PL-RS; and a second processing time in response to the one or more active PL-RSs not comprising the PL-RS. The wireless device may determine a transmission power of an uplink signal based on the PL-RS no later than the processing time since the first time. The wireless device may transmit the uplink signal via the cell.

According to an example embodiment, the wireless device may receive a medium access control control element (MAC CE) indicating activation of the one or more active PL-RS s. The wireless device may receive a second MAC CE indicating activation of one or more TCI states comprising the UL TCI. The wireless device may determine the one or more active PL-RSs based on the one or more TCI states. The UL TCI may be a common uplink beam for the cell. For example, the wireless device may apply the UL TCI for a plurality of uplink channels. The plurality of uplink channels may comprise at least two of a physical uplink shared channel (PUSCH), a physical uplink control channel (PUCCH) and a sounding reference signal. The first processing time may be larger than the second processing time.

According to an example embodiment, the first processing time may be k*slots/subframes/milli-seconds+k1, where k is a predetermined value and k1 is a scheduling offset between the first time and a second time when the wireless device transmits a hybrid automatic repeat request acknowledgement (HARQ-ACK) feedback corresponding to the DCI. The first processing time may be k*slots/subframes/milli-seconds.

According to an example embodiment, the second processing time is k1. For example, the second processing time is zero.

A slot may be determined based on a numerology of the cell.

What is claimed is:

1. A wireless device comprising:
one or more processors; and
memory storing instructions that, when executed by the one or more processors, cause the wireless device to:
receive one or more configuration parameters indicating a plurality of transmission configuration indicator (TCI) states for uplink transmissions;
transmit, for a random access procedure, a physical uplink shared channel (PUSCH) transmission with a transmission parameter;
receive a medium access control control element (MAC CE) indicating activation of more than one TCI state of the plurality of TCI states;
receive a downlink control information (DCI) indicating a TCI state from the more than one TCI state; and
transmit, before application of the TCI state indicated by the DCI, one or more uplink signals with the transmission parameter used during the random access procedure.

2. The wireless device of claim 1, wherein the transmission parameter is based on a default uplink TCI state.

3. The wireless device of claim 2, wherein the default uplink TCI state is associated with a synchronization signal block (SSB).

4. The wireless device of claim 3, wherein the one or more configuration parameters further comprise an association between the default uplink TCI state and the SSB.

5. The wireless device of claim 3, wherein the SSB is used as a default pathloss reference signal (PL-RS).

6. The wireless device of claim 1, wherein the instructions further cause the wireless device to activate the more than one TCI state at a time period after receiving the MAC CE.

7. The wireless device of claim 1, wherein the instructions further cause the wireless device to transmit one or more second uplink signals based on a second transmission parameter associated with the TCI state.

8. The wireless device of claim 1, wherein the instructions further cause the wireless device to transmit the PUSCH transmission in response to a random access response (RAR) message of the random access procedure.

9. The wireless device of claim 8, wherein the PUSCH transmission is scheduled by an uplink grant of the RAR message.

10. The wireless device of claim 1, wherein the random access procedure is a most recent random access procedure.

11. A base station comprising:
one or more processors; and
memory storing instructions that, when executed by the one or more processors, cause the base station to:
transmit one or more configuration parameters indicating a plurality of transmission configuration indicator (TCI) states for uplink transmissions;
receive, for a random access procedure, a physical uplink shared channel (PUSCH) transmission with a transmission parameter;
transmit a medium access control control element (MAC CE) indicating activation of more than one TCI state of the plurality of TCI states;
transmit a downlink control information (DCI) indicating a TCI state from the more than one TCI state; and
receive, before application of the TCI state indicated by the DCI, one or more uplink signals with the transmission parameter used during the random access procedure.

12. The base station of claim 11, wherein the transmission parameter is based on a default uplink TCI state.

13. The base station of claim 12, wherein the default uplink TCI state is associated with a synchronization signal block (SSB).

14. The base station of claim 13, wherein the one or more configuration parameters further comprise an association between the default uplink TCI state and the SSB.

15. The base station of claim 13, wherein the SSB is used as a default pathloss reference signal (PL-RS).

16. The base station of claim 11, wherein the instructions further cause the base station to indicate, via the MAC CE, activation of the more than one TCI state at a time period after receiving the MAC CE.

17. The base station of claim 11, wherein the instructions further cause the base station to receive one or more second uplink signals based on a second transmission parameter associated with the TCI state.

18. The base station of claim 11, wherein the instructions further cause the base station to transmit the PUSCH transmission in response to a random access response (RAR) message of the random access procedure.

19. The base station of claim 18, wherein the PUSCH transmission is scheduled by an uplink grant of the RAR message.

20. A non-transitory computer-readable storage medium comprising instructions that, when executed by one or more processors of a wireless device, cause the wireless device to:
receive one or more configuration parameters indicating a plurality of transmission configuration indicator (TCI) states for uplink transmissions;
transmit, for a random access procedure, a physical uplink shared channel (PUSCH) transmission with a transmission parameter;
receive a medium access control control element (MAC CE) indicating activation of more than one TCI state of the plurality of TCI states;
receive a downlink control information (DCI) indicating a TCI state from the more than one TCI state; and
transmit, before application of the TCI state indicated by the DCI, one or more uplink signals with the transmission parameter used during the random access procedure.

* * * * *